United States Patent
Nepomuceno

(10) Patent No.: US 10,726,736 B2
(45) Date of Patent: *Jul. 28, 2020

(54) ONLINE SYSTEM FOR TRAINING NOVICE DRIVERS AND RATING INSURANCE PRODUCTS

(71) Applicant: State Farm Mutual Automobile Insurance Company, Bloomington, IL (US)

(72) Inventor: John Adrian Nepomuceno, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 365 days.

This patent is subject to a terminal disclaimer.

(21) Appl. No.: 15/461,704

(22) Filed: Mar. 17, 2017

(65) Prior Publication Data

US 2017/0193842 A1 Jul. 6, 2017

Related U.S. Application Data

(63) Continuation of application No. 14/589,486, filed on Jan. 5, 2015, now Pat. No. 9,601,027, which is a
(Continued)

(51) Int. Cl.
*G06Q 40/00* (2012.01)
*G09B 9/052* (2006.01)
(Continued)

(52) U.S. Cl.
CPC ............. *G09B 9/052* (2013.01); *A63G 31/16* (2013.01); *G06Q 30/0208* (2013.01);
(Continued)

(58) Field of Classification Search
CPC .... G06Q 40/08; G06Q 30/02; G06Q 30/0208; G06Q 30/0271; G06Q 50/20;
(Continued)

(56) References Cited

U.S. PATENT DOCUMENTS 4,129,883 A * 12/1978 Stubben .................. A63F 13/00
348/124
5,277,584 A * 1/1994 DeGroat ................ G09B 9/052
434/29

(Continued)

OTHER PUBLICATIONS

Wang, Y., Zhang, W., & Salvendy, G. (2010). Effects of a simulation-based training intervention on novice drivers' hazard handling performance. Traffic Injury Prevention, 11(1), 16. Retrieved from http://dialog.proquest.com/professional/docview/704992476?accountid=131444 on Dec. 23, 2019 (Year: 2010).*

(Continued)

*Primary Examiner* — Kito R Robinson
(74) *Attorney, Agent, or Firm* — Faegre Drinker Biddle & Reath LLP

(57) ABSTRACT

A method for training drivers to detect hazards is described comprising: presenting on a display a visual presentation of a continuous drive through an environment comprising a hazard module that (a) presents a scenario that comprises at least one hazard, and (b) defines anticipatory viewing locations corresponding to each particular driving situation; detecting user viewing locations within the visual presentation; evaluating the user viewing locations to analyze user anticipation of hazards, including comparing user viewing locations with predefined anticipatory viewing locations corresponding to a driving situation; determining a hazard detection proficiency of the user based upon the analysis of user anticipation of not currently-displayed hazards; documenting locations and driving conditions of actual drives; comparing the determined hazard detection proficiency to
(Continued)

the documented locations and driving conditions of actual drives; and using the result to improve a proficiency of the hazard module.

17 Claims, 59 Drawing Sheets

Related U.S. Application Data continuation of application No. 13/413,554, filed on Mar. 6, 2012, now Pat. No. 8,930,227.

(51) Int. Cl.

| | |
|---|---|
| G09B 9/04 | (2006.01) |
| G09B 19/14 | (2006.01) |
| G06Q 40/08 | (2012.01) |
| G09B 9/05 | (2006.01) |
| G09B 19/16 | (2006.01) |
| A63G 31/16 | (2006.01) |
| G06Q 30/02 | (2012.01) |
| G09B 9/02 | (2006.01) |
| G06Q 50/20 | (2012.01) |

(52) U.S. Cl.
CPC .............. *G06Q 40/08* (2013.01); *G09B 9/04* (2013.01); *G09B 9/05* (2013.01); *G09B 19/14* (2013.01); *G09B 19/167* (2013.01); *G06Q 30/02* (2013.01); *G06Q 30/0271* (2013.01); *G06Q 50/20* (2013.01); *G09B 9/02* (2013.01)

(58) Field of Classification Search
CPC ...... G09B 9/052; G09B 19/14; G09B 19/167; G09B 9/02; G09B 9/04; G09B 9/05
See application file for complete search history.

(56) References Cited

U.S. PATENT DOCUMENTS

| | | | | |
|---|---|---|---|---|
| 5,618,179 | A * | 4/1997 | Copperman | A63F 13/005 434/69 |
| 5,888,074 | A * | 3/1999 | Staplin | G09B 9/052 340/576 |
| 5,919,046 | A * | 7/1999 | Hull | G09B 9/05 340/576 |
| 6,053,737 | A * | 4/2000 | Babbitt | G09B 9/08 434/29 |
| 6,227,862 | B1 * | 5/2001 | Harkness | G09B 9/05 434/238 |
| 6,270,349 | B1 * | 8/2001 | Ng | G09B 9/05 434/62 |
| 6,679,702 | B1 * | 1/2004 | Rau | G09B 9/02 340/435 |
| 6,989,754 | B2 * | 1/2006 | Kisacanin | B60R 21/01538 340/576 |
| 7,057,501 | B1 * | 6/2006 | Davis | B60Q 1/46 340/435 |
| 7,363,261 | B2 * | 4/2008 | Whitehead, Jr. | G06Q 10/0833 705/30 |
| 7,460,940 | B2 * | 12/2008 | Larsson | G06F 3/012 701/49 |
| 7,480,631 | B1 * | 1/2009 | Merced | G06Q 20/3674 235/380 |
| 7,529,698 | B2 * | 5/2009 | Joao | G06Q 20/04 705/30 |
| 7,573,401 | B2 * | 8/2009 | Wabeke | G08G 1/095 340/904 |
| 7,695,282 | B2 * | 4/2010 | Lanktree | G09B 19/167 434/236 |
| 7,765,058 | B2 * | 7/2010 | Doering | B60R 16/0236 340/425.5 |
| 7,769,499 | B2 * | 8/2010 | McQuade | G07C 5/008 701/1 |
| 7,839,292 | B2 * | 11/2010 | Wang | B60W 30/095 340/441 |
| 8,016,595 | B2 * | 9/2011 | Aoki | A63F 13/10 434/61 |
| 8,384,534 | B2 * | 2/2013 | James | B60Q 9/008 340/439 |
| 8,597,027 | B2 * | 12/2013 | Staplin | G09B 19/167 434/65 |
| 8,781,170 | B2 * | 7/2014 | Mathieu | G01C 21/365 382/104 |
| 8,876,535 | B2 * | 11/2014 | Fields | G09B 5/00 434/64 |
| 8,930,227 | B2 | 1/2015 | Nepomuceno | 705/4 |
| 9,002,720 | B2 | 4/2015 | Nepomuceno | 705/4 |
| 9,384,674 | B2 * | 7/2016 | Nepomuceno | G09B 9/052 |
| 2002/0111725 | A1 * | 8/2002 | Burge | G06Q 40/08 701/31.4 |
| 2002/0146667 | A1 * | 10/2002 | Dowdell | G09B 7/02 434/62 |
| 2003/0153846 | A1 * | 8/2003 | Marple-Horvat | A61B 5/163 600/587 |
| 2004/0153362 | A1 * | 8/2004 | Bauer | G06Q 40/02 705/4 |
| 2004/0193347 | A1 * | 9/2004 | Harumoto | B60R 21/0132 701/45 |
| 2004/0239509 | A1 * | 12/2004 | Kisacanin | A61B 5/163 340/575 |
| 2005/0042578 | A1 * | 2/2005 | Ammon | G09B 9/04 434/62 |
| 2006/0040239 | A1 * | 2/2006 | Cummins | G09B 9/05 434/62 |
| 2007/0008151 | A1 * | 1/2007 | Victor | A61B 5/18 340/573.1 |
| 2007/0015117 | A1 * | 1/2007 | Freund | G09B 19/167 434/65 |
| 2007/0166676 | A1 * | 7/2007 | Bird | G09B 7/04 434/236 |
| 2007/0210902 | A1 * | 9/2007 | Stewart | B60Q 1/484 340/435 |
| 2007/0239322 | A1 * | 10/2007 | McQuade | G07C 5/008 701/1 |
| 2007/0294073 | A1 * | 12/2007 | Okamoto | B60K 35/00 703/20 |
| 2008/0082372 | A1 * | 4/2008 | Burch | G06Q 40/08 705/4 |
| 2008/0120175 | A1 * | 5/2008 | Doering | B60R 16/0236 705/14.67 |
| 2008/0200224 | A1 * | 8/2008 | Parks | G10H 1/368 463/7 |
| 2008/0254417 | A1 * | 10/2008 | Mohamed | G09B 9/04 434/69 |
| 2008/0255722 | A1 * | 10/2008 | McClellan | B60R 25/102 701/31.4 |
| 2009/0040054 | A1 * | 2/2009 | Wang | B60W 30/095 340/576 |
| 2009/0051567 | A1 * | 2/2009 | Wabeke | G08G 1/095 340/907 |
| 2009/0181349 | A1 * | 7/2009 | Harkness | G09B 9/04 434/69 |
| 2010/0063850 | A1 * | 3/2010 | Daniel | G06Q 40/00 705/4 |
| 2010/0143872 | A1 * | 6/2010 | Lankteee | G09B 19/167 434/65 |
| 2010/0245064 | A1 * | 9/2010 | Fleishman | G07C 5/008 340/425.5 |
| 2011/0123961 | A1 * | 5/2011 | Staplin | G09B 9/052 434/64 |
| 2011/0169625 | A1 * | 7/2011 | James | B60Q 9/008 340/439 |
| 2011/0213628 | A1 * | 9/2011 | Peak | G06Q 40/08 705/4 |
| 2011/0307188 | A1 * | 12/2011 | Peng | G06Q 10/0639 702/33 |

(56) References Cited

U.S. PATENT DOCUMENTS

| | | | | |
|---|---|---|---|---|
| 2012/0135382 A1* | 5/2012 | Winston | ............... | G09B 9/04 434/65 |
| 2012/0268262 A1* | 10/2012 | Popovic | ............... | B60Q 9/008 340/438 |
| 2012/0295230 A1* | 11/2012 | Esposito | ............... | G09B 9/04 434/69 |
| 2013/0060583 A1* | 3/2013 | Collins | ............... | G06Q 40/08 705/4 |
| 2013/0330691 A1* | 12/2013 | Midathala | ............... | A61B 5/18 434/62 |
| 2014/0039749 A1* | 2/2014 | Jelbert | ............... | B60W 40/09 701/32.1 |

OTHER PUBLICATIONS

Ting, W., Liao Ke-bing, Wei, Z., & Su, W. (2011). Application of driving simulation system on testing driver's reaction to road hazards. Journal of System Simulation, 23(6), 1251-5, 1277. Retrieved from http://dialog.proquest.com/professional/docview/1009730964?accountid=131444 on Dec. 23, 2019 (Year: 2011).*

Walters, B. (2001). Who's who in training & simulation. Armada International, 25(2), 51. Retrieved from http://dialog.proquest.com/professional/docview/675182549?accountid=131444 on Dec. 23, 2019 (Year: 2001).*

Decina, L.E. et al., "Feasibility of New Simulation Technology to Train Novice Drivers," URL: http://dialog.proquest.com/professional/docview/805732712?accountid=142257, 2 pages, 1996.

Loss, Phillip J., "To the Contrary: Young Drivers Lack Training," The Herald, 3 pages, Sep. 22, 2001.

Ibold, K., "Road Warriors: Students Buckle Up as a Daytona Military Simulation Company Sets its Sights on Driver's Ed Training," Florida Trend, 45(1), 34(1), URL: http://dialog.proquest.com/professional/docview/678919284?accountid=142257, 2 pages, 2002.

"How to Make your Teenage Driver Less Expensive and Safer for the Summer; PEMCO Insurance says doing Homework on Insurance Discounts and Encouraging Responsible Driving can Pay Off," Business Wire, URL: http://dialog.proquest.com/professional/docview/666597788?accountid=142257, 3 pages, Apr. 30, 2003.

Sifrit, Kathy J., "The Effects of Aging and Congnitive Decrements on Simulated Driving Performance," Wichita State University, ProQuest Dissertations and Theses, 105 pages, Dec. 2005.

"Virtual Driver Interactive Debuts the Virtual Defensive Driver Course at RIMS 2006 Honolulu Conference; Dew Driver Training System Combines National Safety Council's Defensive Driving Course 6/8 with Interactive Simulation Training," Business Wire, URL: http://dialog.proquest.com/professional/docview/676802418?accountid=1422, 2 pages, Apr. 24, 2006.

Vettraino, J.P., "Driver Training in First Grade? All Indicators Tell Us We Need to Start Young," AutoWeek, vol. 57, No. 46, URL: http://dialog.proquest.com/professional/docview/674767054?accountid=142257, 3 pages, 2007.

Romoser, Matthew Ryan Elam, "Improving the Road Scanning Behavior of Older Drivers Through the Use of Situation-Based Learning Strategies," Dissertation, University of Massachusetts Amherst, Industrial Engineering and Operations Research, URL: http://search.proquest.com/docview/304577116?accountid=14753, 24 pages, Sep. 2008.

Horswill, M.S. et al., "Improving Older Drivers' Hazard Perception Ability," Psychology and Aging, vol. 25, No. 2, URL: http://dx.doi.org/10.1037/a0017306, 2 pages, 2010.

Milloy, Shaunna Leigh, "Effects of Experience on Hazard Perception of Novice Teenage Drivers," Masters Thesis, University of Calgary, Department of Psychology, URL: http://search.proquest.com/docview/847569749?accountid=14753, 24 pages, Sep. 2010.

Fischer, Donald L., "From Changing Behaviors to Reducing Crashes, Novel Advances in Teen Driver Education Around the World," University of Massachussetts—Amherst, Department of Mechanical & Industrial Engineering, PowerPoint Presentation, 57 pages, May 3, 2011.

"WTI Lands Grant to Study Hazard Perception," Targeted News Service, ProQuest, 3 pages, Dec. 8, 2011.

Chen, Na, "Understanding and Improving Novice Drivers' Hazard Perception Skills," Dissertation, Northeastern University, Department of Mechanical and Industrial Engineering, URL: http://search.proquest.com/docview/1015664885?accountid=14753, 24 pages, Apr. 25, 2012.

U.S. Non-Final Office Action, U.S. Appl. No. 14/676,491, 19 pages, dated Aug. 27, 2015.

U.S. Final Office Action, U.S. Appl. No. 14/676,491, 17 pages, dated Feb. 5, 2016.

Taylor, G., "Putting Teens on a New Road: [2 Edition]," Waikoto Times, URL: http://search.proquest.com/docview/313313276?accountid=14753, 5 pages, Mar. 3, 2016.

U.S. Notice of Allowance, U.S. Appl. No. 13/958,549, 22 pages, dated Mar. 10, 2016.

U.S. Advisory Action, U.S. Appl. No. 14/676,491, 3 pages, dated Apr. 6, 2016.

U.S. Non-Final Office Action, U.S. Appl. No. 14/589,486, 28 pages, dated Sep. 21, 2016.

U.S. Notice of Allowance, U.S. Appl. No. 14/676,491, 26 pages, dated Oct. 12, 2016.

U.S. Notice of Allowance, U.S. Appl. No. 14/589,486, 19 pages, dated Nov. 9, 2016.

Canadian Office Action, Application No. 2808754, 6 pages, dated Nov. 29, 2018.

U.S. Non-Final Office Action, U.S. Appl. No. 15/443,067, 27 pages, dated Mar. 29, 2019.

U.S. Final Office Action, U.S. Appl. No. 15/443,067, 23 pages, dated Aug. 8, 2019.

* cited by examiner

FIG. 13A

PRODUCT NAME HERE

HOME | DRIVES | REVIEW | LOGOUT

WELCOME BACK JOHN, 1301

SUMMARY
TOTAL PRACTICE 50 DRIVES

RATINGS & Practice Drives
Parking Lot — 3
Residential — 1
Intermediate Roads — 0
Commercial Roads
Highway
Additional Challenges What would you like to do? 1302

Start a Practice Drive
Lorem ipsum dolor sit amet, consectetur adipiscing elit. Etiam euismod egestas sagittis.

Review my Past Drives
Lorem ipsum dolor sit amet, consectetur adipiscing elit. Etiam euismod egestas sagittis.

View Instructions
Fusce lacinia, orci non vulputate imperdiet, dui sem egestas tortor, eget porttitor ante est venenatis ante. Proin non elit non tellus molestie ultriceies.

Change Settings
Fusce lacinia, orci non vulputate imperdiet, dui sem egestas tortor, eget porttitor ante est venenatis ante. Proin non elit non tellus molestie ultriceies.

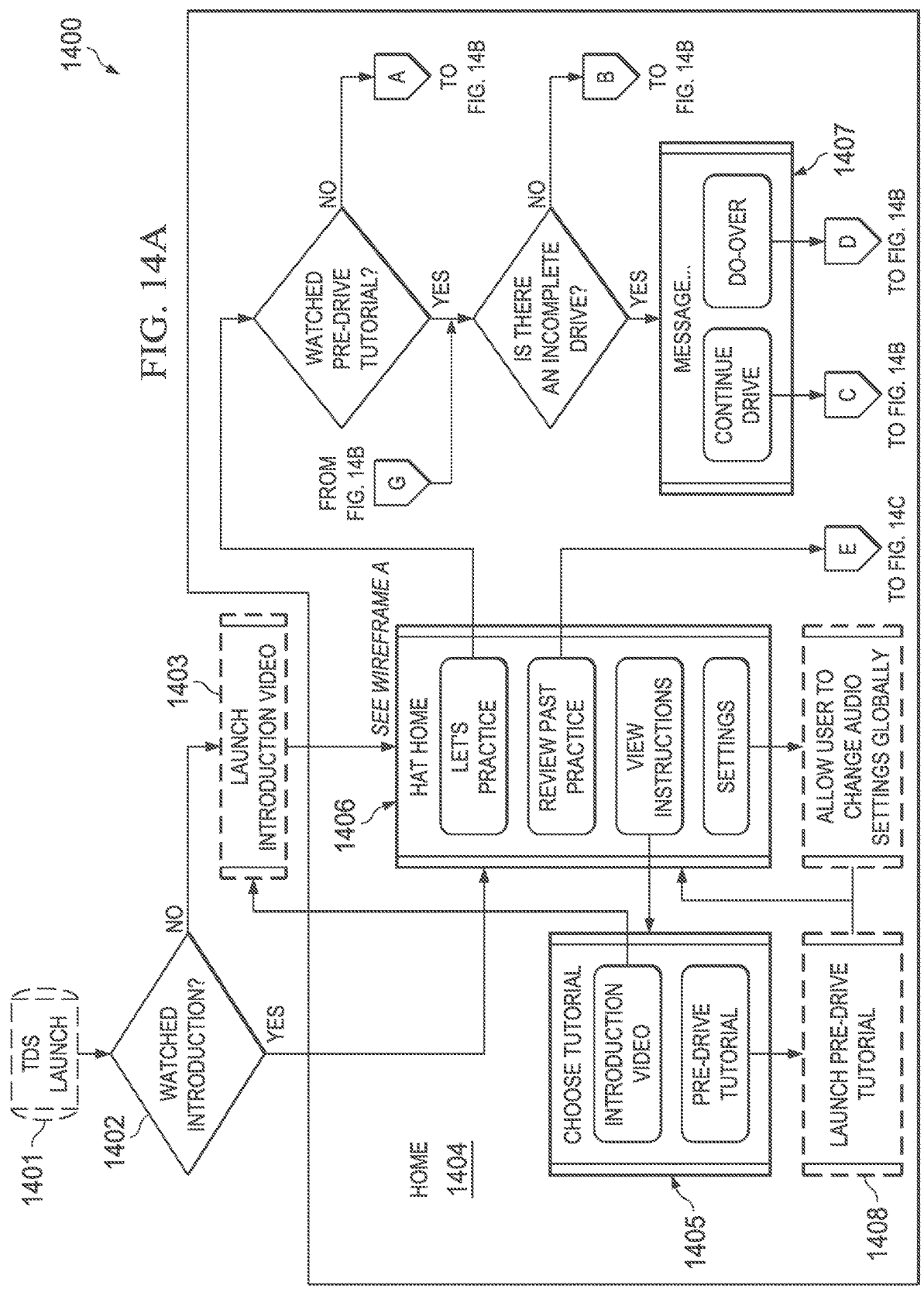

FIG. 15F

ROAD AWARE

WELCOME BACK JOHN.

MY REVIEW LOG

DRIVES COMPLETED 10

CURRENT RATING PER ENVIRONMENT UP TO 5 MOST RECENT DRIVES

- Neighborhood [VIEW]
- Beyond your Neighborhood [VIEW]
- Downtown [VIEW]
- Highway [VIEW]

TOTAL NUMBER OF PRACTICE 10 DRIVES COMPLETED

CURRENT RATING PER ENVIRONMENT UP TO 5 MOST RECENT DRIVES

StateFarm™   [HOME] [DRIVES]   LOGOUT  [REVIEW]

REVIEW

MOST RECENT PRACTICE DRIVES

| | | | |
|---|---|---|---|
| Practice Drive 10 | 8/3/2011 at 12:42 AM | Neighborhood, 0% | [REVIEW DRIVE] |
| Practice Drive 8 | 8/2/2011 at 4:42 PM | Neighborhood, 0% | [REVIEW DRIVE] |
| Practice Drive 7 | 8/2/2011 at 2:42 PM | Highway, 85% | [REVIEW DRIVE] |
| Practice Drive 6 | 8/2/2011 at 2:18 PM | Highway, 0% | [REVIEW DRIVE] |
| Practice Drive 5 | 8/2/2011 at 1:47 PM | Beyond your..., 0% | [REVIEW DRIVE] |
| Practice Drive 4 | 8/2/2011 at 11:42 AM | Neighborhood, 0% | [REVIEW DRIVE] |
| Practice Drive 3 | 8/1/2011 at 10:59 AM | Highway, 50% | [REVIEW DRIVE] |
| Practice Drive 2 | 8/1/2011 at 10:47 AM | Beyond your..., 5% | [REVIEW DRIVE] |
| Practice Drive 1 | 8/1/2011 at 10:42 AM | Neighborhood, 40% | [REVIEW DRIVE] |

ONLINE SYSTEM FOR TRAINING NOVICE DRIVERS AND RATING INSURANCE PRODUCTS

CROSS-REFERENCE TO RELATED APPLICATIONS

This application is a Continuation of U.S. patent application Ser. No. 14/589,486 filed on Jan. 5, 2015, which is a Continuation of U.S. patent application Ser. No. 13/413,554 filed Mar. 6, 2012. The contents of which are incorporated herein by reference in their entirety.

TECHNICAL FIELD

The present disclosure relates generally to systems and methods for training novice drivers to detect and recognize driving hazards and for rating an insurance product. These training and rating systems and methods may utilize online training simulations to help novice drivers develop skills needed to detect and recognize driving hazards in the safe environment of a computer simulation rather than real world circumstances where errors in judgment may result in automobile crashes. Based on completion of an online training simulation and/or driver competence in online training simulations, an insurance product may be rated and/or a discount may be applied to an insurance premium.

BACKGROUND

Automobile crashes are the leading cause of death among novice teen drivers. In their first six months of licensure, teen drivers are up to six times more likely to be involved in fatal crashes than more experienced drivers (over 25 years of age). Insurance premium costs for novice teen drivers reflect this increased risk and crash propensity. Studies by McKnight and McKnight concluded that failures to recognize hazards in the driving environment contributed to approximately 43% of crashes involving this teen driver segment. Studies have also concluded that novice drivers lack the driving experience and the resultant driving behaviors and attitudes that support them. In many states, full licensure is delayed through graduated licensing strategies to minimize the exposure of young drivers to the highest risk periods. The problem then, is how to expose novice teen drivers to the kinds of experiences that will allow them to develop those safe driving schema from which they can then learn to recognize hazards and related dangerous driving conditions without exposing them to actual high risk driving conditions.

Fisher, Pradhan, Pollatsek, et al. concluded that a PC-based training application called Risk Awareness and Perception Training ("RAPT") aimed at novice teen drivers could be effective in improving the hazard detection skills of novice drivers. The RAPT program was created based on an analysis of police crash reports that indicate new drivers tend to lack three basic skills necessary to avoid crashes: hazard anticipation, attention maintenance and hazard avoidance. Hazard anticipation has to do with knowing where to look for dangers; attention maintenance with concentrating on the road ahead, and hazard avoidance with special driving techniques such as skid control. The RAPT program focused on anticipating dangers. The RAPT program used a personal computer to train novice drivers and a driving simulator to test their hazard recognition skills. On the personal computer, the RAPT program required the novice driver to indicate where the novice driver was looking as the virtual car drove through a hazard module. The hazard module was presented as a series of still photographs that exposed the novice driver to a particular simulated hazard. In one version of the program, the novice driver was shown aerial views of situations and then asked to drag yellow ovals and red circles to the appropriate spots to show where the danger might arise and how to adjust to it. In another version of the program, each still photograph remained on the screen for about 3 seconds and the novice driver used a computer mouse to click on the potential hazards shown in the photographs. In another version of the RAPT program, a series of 16 driving scenarios or hazard modules taught novice drivers to be alert to situations that demand extra caution. The scenarios or hazard modules "drove" through each situation, presented via a series of still photographs, while the novice driver clicked on potential hazards visible in the photographs. The program then detailed safe and unsafe responses. A narrator described the driving choices as the virtual car moved through the photographs.

A driving simulator was then used to test whether the novice drivers improved their abilities to detect and identify hazards. In the RAPT testing simulator, the driver operated the simulator vehicle—an actual Saturn sedan—as if it was on the road. A simulated road ahead was displayed on three screens, one in front and one on each side of the car. As the driver turned the wheel, braked or accelerated, the roadway visible to the driver changed appropriately. The system also provided realistic road, wind and vehicle noises. To test how much the new driver had learned from the RAPT training program, the RAPT testing simulator recreated the sensations of actually driving on the road. The driver operated the controls of a Saturn sedan while the road and various situations scrolled by on three surrounding screens. Subjects were also tested on the road with the help of devices that tracked the movements of their eyes as they scanned their surroundings.

Versions of the RAPT program have been made available on the Internet. However, RAPT3 failed to catch on with novice teen drivers or with driving education instructors and as a result, few people outside of academia have ever heard of, or benefited from the RAPT3 training.

Driving simulator-based training has shown to be potentially effective. While the cost of driving simulators continues to drop, few people have access to driving simulators that have been established for training purposes, and the cost of these is still relatively high. Most driving simulators today are maintained by academic institutions primarily for research purposes. Maintaining driving simulators for training purposes is still cost-prohibitive even for driving schools.

SUMMARY OF THE INVENTION

While most people do not have access to a driving simulator, most teens have access to a web-connected personal computer. Road Aware™ is a web-based hazard perception training program that provides a driving simulator-like experience aimed at teaching novice drivers how to recognize and identify hazards. The graphical user interface may use state-of-the-art 3D simulation technology to create a web-streamed video game-like driving experience to engage and hold the interest of teen drivers. By narrowly focusing the training on hazard detection and recognition and not on the psychomotor skills of driving, Road Aware avoids developing overconfidence among young drivers, which can be an unintended consequence of some simulation training systems.

According to one aspect of the invention, there is provided a method for training vehicle drivers to detect hazards, the method comprising: visually presenting to a driver a continuous drive through a driving environment comprised of at least two hazard modules, wherein each hazard module presents at least one driving scenario that comprises at least one hazard; recording where within the visual presentation the driver looks to detect hazards during the visual presentation of the continuous drive; and determining the driver's hazard detection proficiency by evaluating whether the driver looked at hazards during the visual presentation of the continuous drive.

A further aspect of the invention provides a method for determining an insurance premium based at least in part of a vehicle driver's proficiency at detecting hazards, the method comprising: visually presenting at least one driving module that comprises at least one hazard; recording where within the visual presentation the driver looks to detect hazards during the visual presentation; determining the driver's hazard detection proficiency by evaluating whether the driver looked at hazards during the visual presentation; and calculating an insurance premium based at least in part on the driver's hazard detection proficiency.

Still another aspect of the invention provides a system for determining vehicle driver hazard detection proficiency and calculating insurance discounts, the system comprising: an Internet device that presents to an Internet user a visual presentation of a continuous drive through a driving environment comprising at least two hazard modules, wherein each hazard module presents to the Internet user at least one driving scenario that comprises at least one hazard; an Internet device that records user viewing locations within the visual presentation, the user viewing locations corresponding to locations within the visual presentation that are viewed by the user during the visual presentation of the continuous drive; a computer analytics device comprising an algorithm that compares the recorded user viewing locations with defined locations of hazards within the visual presentation of the continuous drive, and determines a hazard detection proficiency of the user based at least on the comparison; a computer memory device comprising at least one minimum hazard detection proficiency criteria corresponding to an insurance discount; and a computer analytics device that compares the determined hazard detection proficiency of the user with the minimum hazard detection proficiency criteria and determines whether to award the insurance discount to the user.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIGS. 1A-1B illustrate a driving hazard module wherein an other vehicle is backing out of a driveway in front of the vehicle of a novice driver, wherein FIG. 1A shows the other vehicle parked with brake lights illuminated and FIG. 1B shows the novice driver's vehicle advanced down the street and the other vehicle starting to move down the driveway.

FIG. 2A shows the other vehicle parked with brake lights illuminated as the novice driver's vehicle advances from a distance. FIG. 2B shows the novice driver's vehicle advanced down the street and the other vehicle starting to move down the driveway. FIG. 2C shows a bird's eye view of the vehicles shown in FIG. 2B.

FIG. 3A shows the other vehicle parked at the right-side curb as the novice driver's vehicle advances from a distance. FIG. 3B shows the novice driver's vehicle advanced down the street toward the other vehicle. FIG. 3C shows the other vehicle's brake lights illuminated as the novice driver gets even closer. FIG. 3D shows the other vehicle pulling into the traffic lane in front of the novice driver's vehicle.

FIG. 4A shows three vehicles parked at the right-side curb as the novice driver's vehicle advances from a distance. FIG. 4B shows the novice driver's vehicle advanced down the street toward the other vehicle as the other vehicle's brake lights are illuminated and the other vehicle begins to move away from the curb.

FIG. 6A shows the pedestrian standing near the stop sign at the right-side curb. FIG. 6B shows the novice driver's vehicle advanced down the street toward the intersection. FIG. 6C shows the novice driver's vehicle advanced down the street toward the intersection even closer to the pedestrian. FIG. 6D shows the novice driver's vehicle advanced stopped at the intersection, next to the pedestrian.

FIG. 7A shows the other vehicle parallel-parked at the right-side curb between two other vehicles as the novice driver's vehicle advances down the street. FIG. 7B shows the novice driver's vehicle advanced further down the street as the other vehicles' door is opened.

FIG. 8A shows the pedestrian at the right-side curb near a stop sign as the novice driver's vehicle advances down the street. FIG. 8B shows the novice driver's vehicle advanced further down the street as the pedestrian is crossing the street at the intersection.

FIG. 9A shows a novice driver's vehicle advancing down the street toward a 4-way intersection. FIG. 9B shows the novice driver's vehicle advanced further down the street. FIG. 9C shows the novice driver's vehicle stopped at the intersection, another vehicle stopped at the left stop sign and a further vehicle stopped at the right stop sign. FIG. 9D shows the novice driver's vehicle stopped at the intersection, the other vehicle remains stopped at the left stop sign and the further vehicle that had been stopped at the right stop sign is crossing the intersection. FIG. 9E shows the novice driver's vehicle stopped at the intersection, the other vehicle that had been stopped at the left stop sign is crossing the intersection and the further vehicle that had been stopped at the right stop sign has crossed the intersection. FIG. 9F shows the novice driver's vehicle stopped at the intersection, the other vehicle that had been stopped at the left stop sign has crossed the intersection. FIG. 9G shows the novice driver's vehicle crossing the intersection.

FIG. 11A shows a bird's eye view of a novice driver's vehicle advancing down a two-way street with several vehicles parallel-parked at the curbs on both sides. FIG. 11B shows a driver's view of same seen as FIG. 11A, wherein a pedestrian is partially visible to the novice driver. FIG. 11C shows the pedestrian being partially visible to the novice driver and a ball rolling into the street from where the pedestrian is standing. FIG. 11D shows the novice vehicle stopped adjacent the pedestrian as the ball continues to roll across the street. FIG. 11E shows the novice vehicle stopped adjacent the pedestrian as the pedestrian advances toward the street.

FIG. 12A shows a novice driver's vehicle advancing down a two-way street, which does not have a stop sign at an intersection, as another vehicle approaches from the opposite direction on the same street and a further vehicle approaches the stop sign at the right side of the intersection. FIG. 12B shows the car from the opposite direction turning in front of the novice driver's vehicle as the car at the right stops at the stop sign. FIG. 12C shows car from the opposite direction in the intersection directly in front the novice driver and the car at the right is stopped at the stop sign. FIG. 12D shows the car at the right stop sign beginning to turn right into the novice driver's lane in front of the novice driver's vehicle. FIG. 12E shows the novice driver's vehicle stopped at the intersection as the car from the right continues to turn right through the intersection. FIG. 12F shows the novice driver's vehicle crossing the intersection behind the car that had turned from the right.

FIG. 13A is an example of a home page for a web site through which a novice driver would be invited to start a practice driver or review past drives.

FIGS. 14A-14C show a flow chart illustrating a process for presenting practice drives to a novice driver through a web site interface.

FIG. 15F is an example of a drive page for a web site through which a novice driver would be invited to review practice drives.

FIGS. 17B-1 through 17B-3 show a flow chart illustrating an alternative example process for reviewing hazard modules of a practice drive.

DETAILED DESCRIPTION

Figure 1A:
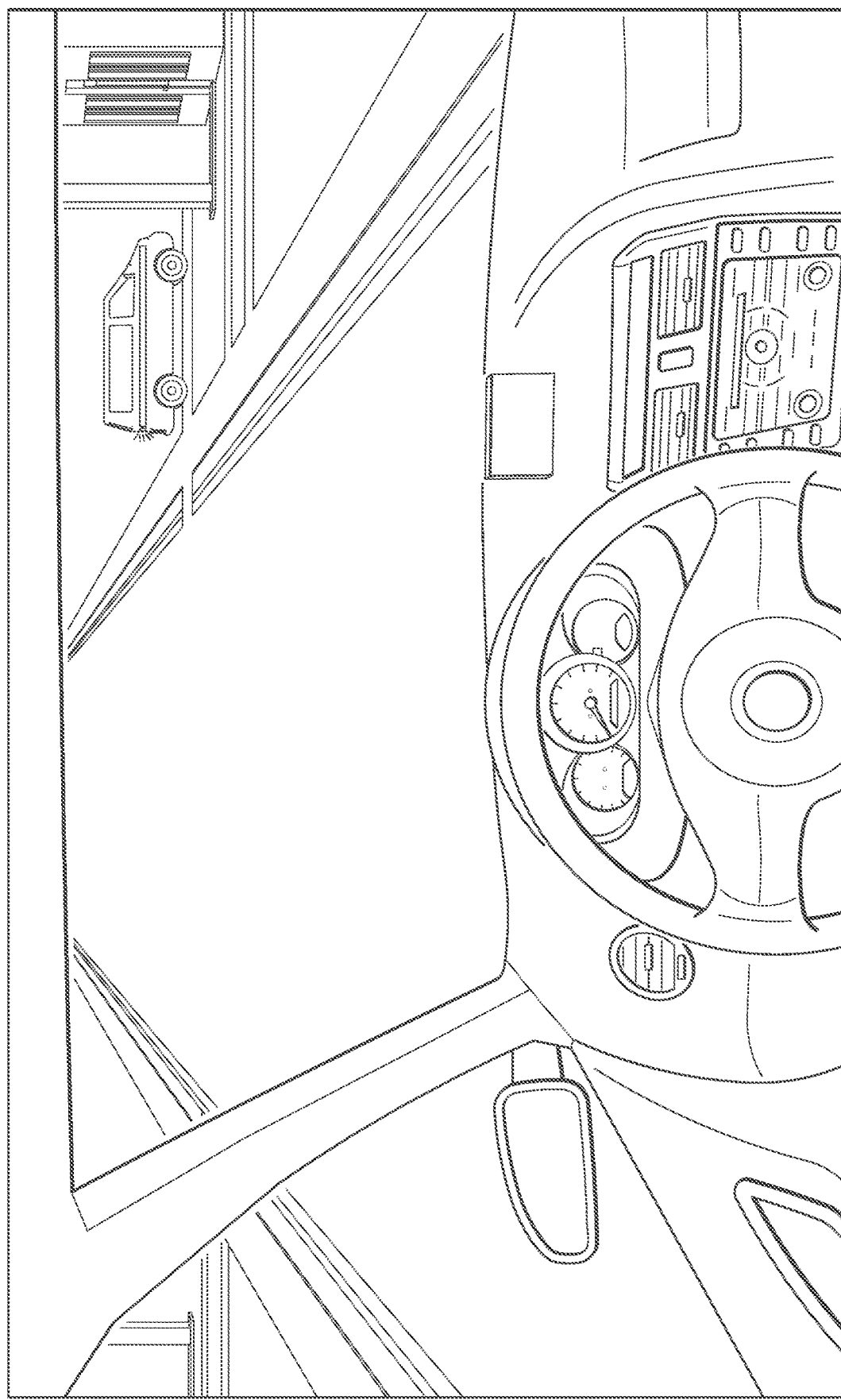

Preferred embodiments and their advantages over the prior art are best understood by reference to FIGS. 1A-18C below. However, the present disclosure may be more easily understood in the context of a high level description of certain embodiments.

Given the proven capacity of a still-frame pictorial presentation format of the prior art Risk Awareness and Perception Training ("RAPT") driver training system to improve novice drivers' abilities to correctly identify hazards, research was conducted to determine whether similar improved capacity could be obtained via video animation formats or 3-D animation formats. Ninety-six novice drivers participated in the research study. First, twenty-four novice drivers were placed in a control group where they where trained with the still-frame pictorial presentation format of the RAPT system. Second, twenty-four novice drivers were placed in a group that were trained on the same 9 separate hazard modules presented in the RAPT system, but instead of still-frame pictorial presentation format, the 9 separate hazards were presented via 9 separate video animations. Third, twenty-four novice drivers were placed in a group that was trained on a Hazard Awareness Training ("HAT") program that comprise many different hazard modules linked in series as one continuous drive through a particular environment presented as an animated video. Fourth, twenty-four novice drivers were placed in a group that was trained on a HAT program that comprise many different hazard modules linked in series as one continuous drive through a particular environment presented as a 3-D animated video. The results of the study showed that the novice drivers in the second, third and fourth groups learned to correctly identify hazards at least as well as the control group.

Real, on-the-road hazards such as cars that 'run-the-red-light', erratic or aggressive driver behavior, and construction zones are relatively rare. Furthermore, most people would avoid practicing at locations where known patterns of such erratic and dangerous behavior can be observed. By simulating these driving behaviors, Road Aware can provide the user with these experiences on a personal computer, thus helping to build the schema and mental models from which the user can draw when he is driving in the real world.

If the user fails to recognize these hazards, Road Aware may allow the user to review what he missed and learn how to recognize these conditions. The user is permitted to repeat the practice drives and is encouraged to do so to improve his score.

User data generated by this application may be used for research applications towards improvements and enhancements for the application. Further, user performance data may be analyzed to determine whether novice drivers who use this application are less likely to be involved in crashes and collisions. An auto premium discount may be applied for successful users of Road Aware.

A principal target audience for Road Aware may be a novice driver, who may take a program as part of a driver education course, but may also include more experienced drivers who require additional driver safety training. The user may interact with Road Aware on a personal computer (Windows- or Mac-based personal computer) equipped with a mouse, keyboard, speakers, and broadband internet access. The user may also interact with Road Aware on a tablet computer (such as an Apple iPad or other tablet device), smartphone, or other mobile device. The novice driver can use Road Aware at home or in a formal instructional setting like a classroom. Road Aware may simulate an end-to-end driving experience, rather than simulating discrete hazard scenarios that last between 30-60 seconds each. A Road Aware practice drive may simulate an entire driving trip though a particular environment or multiple environments, wherein the entire drive may last up to 30 minutes. Road Aware may be integrated into a suite of interventions developed for Teen Drivers, wherein the interventions may include Road Trips™ and the Driver Feedback System. Road Trips may help novice drivers to plan and log actual practice drives. The Driver Feedback System may use GPS and accelerometer technologies to document the locations and driving conditions of actual drives, including: quick accelerations, fast cornering, and hard braking.

The training format may be an 'on-the-rails' simulation, wherein the user will not need to brake, accelerate or steer because speed and steering may be controlled by the program. The simulation format may require the novice driver to use his mouse or other pointing device to click on parts of the scene where he is looking/fixating to identify potential hazards. On touchscreen-enabled devices such as smartphone or tablet devices, the user may directly tap on areas of the screen where he is looking. Alternative interface devices may also be used to detect where a novice driver is looking/fixating during a training practice drive.

The Graphic User Interface (GUI) during a practice drive may present an interior of a car with visibility through the vehicle windows to the landscape. The novice driver may be allowed to pan left and right to see the left and right side windows, and be able to use the driver- and passenger-side (L and R) and rear-view mirrors as would normally be done when driving a real vehicle. Look left and right may correspond to pan left and right with the mouse to look at the side and rear view mirrors. Active speedometer and dash display may be provided. To start the drive, a "Start Drive" button will appear in the middle of the screen. When the user clicks or taps on this virtual button, the practice drive begins. As the practice drive proceeds, the user may use his mouse or pointing device to click on areas of the drive where he is looking or fixating, such as stationary objects, moving vehicles, or pedestrians. At key points such as at intersections, the user may be presented with a "Continue" button, at which time the virtual car "driven" by the user may stop awaiting further input from the user. The user may decide when it is safe to proceed with his right-turn, left-turn or straight through maneuver. By clicking or tapping on the "Continue" button, the user may signify that in his view, it is safe to proceed and the practice drive continues. At the conclusion of a drive, a popup window will appear to inform the user that the drive has concluded, and clicking on the "Next" button returns the user to the main menu.

In addition to clicking on stationary objects, moving vehicles, or pedestrians, Road Aware may also monitor where the user is looking. Road Aware may detect when the user is looking at his driver side, passenger side, or rear view mirror. If the user pans to certain areas on the left or right side of the screen, the Road Aware system may interpret this as a rapid look "over the shoulder" left or right, respectively. The user may use this functionality to make a safety check over his left or right shoulder as he would if he were driving. Road Aware may also detect whether the user is proactively scanning the road scene in anticipation of a possible hazard. For example, while crossing intersections, the user may choose to pan left or right in anticipation of other vehicles that may not stop. Prior to changing lanes to the left, the user may quickly pan to the left to proactively look for vehicles in his left blind spot as he would if he were driving. The Road Aware system will detect this as a precautionary look to anticipate possible hazards.

An introduction may be provided to assist newer users of the Road Aware training. The introduction may include: a welcome page, what Road Aware training is and why it is important, how the program is intended to work, and statements to get novice drivers ready to learn about driving hazards. The introduction may be viewed once (after first time login), and then be available from the help menu after the initial viewing.

A tutorial may also be incorporated into Road Aware. An objective of the tutorial may be to introduce the GUI interface and the principal user interaction. It may introduce the GUI-Dashboard (see above). It may explain how to start the drive by clicking on the "Start Drive" button, explain how and why the user must click on the parts of the drive where he is looking or fixating, or explain the navigation of the main menu.

Different tutorial scenarios may be introduced that may explain why the user must look at certain objects, vehicles, or pedestrians in Road Aware. For example, three (3) introductory tutorial hazard simulation modules may include:

(1) Pedestrian walking on the sidewalk—click on the pedestrian; audio feedback when clicked on (no hazard or conflict); if the user does not click on the pedestrian (the target) in a timely fashion, the user is shown the birds-eye view of this scenario, then is allowed to repeat the scenario two more times or until he clicks on the target in a timely fashion. If the user fails to click on the target three times, then the next scenario will appear.

(2) Vehicle backing from driveway—click on the vehicle before it reaches the street; audio feedback when clicked on (Good job!); if the user does not click on the vehicle (the target) in a timely fashion, the user is shown the birds-eye view of this scenario, then is allowed to repeat the scenario two more times or until he clicks on the target in a timely fashion. If the user fails to click on the target three times, then the next scenario will appear.

(3) Vehicle backing from driveway, occluded by parked cars—click on the vehicle before it reaches the street; audio feedback when the vehicle is clicked on correctly (Good job!); if the user does not click on the vehicle (the target) in a timely fashion, the user is shown the birds-eye view of this scenario, then is allowed to repeat the scenario two more times or until he clicks on the target in a timely fashion. If the user fails to click on the target three times, then the next scenario will appear.

The tutorial may also provide to the user a summary of performance (metrics) based on the three hazard simulation modules presented in the tutorial. The summary may include:

(1) Total number of clickable targets and precautionary looks by the user during the completed practice drive;

(2) Number of targets identified correctly;

(3) Percent of the maximum score achieved by the user for this practice drive;

(4) Number of times that the user has completed this practice drive.

The Road Aware training may also set expectations for particular environments. For example, if the environment is a practice drive in a Neighborhood environment, the novice driver may be advised to expect to see pedestrians on the sidewalk, and vehicles moving into traffic. The Neighborhood environment is a good environment to learn to drive and learn to recognize hazards. In this environment, hazards are usually (but not always) easily seen. The novice driver may be advised that it is OK to look for, and click on every moving object in view. Further, the novice driver may be advised that as she begins to become more experienced in detecting hazards, the novice driver should consider other ways that these same scenarios could occur. The novice driver may also be provided a definition of what constitutes a hazard.

The summary may also provide a way of showing the hazards that the novice driver failed to recognize or failed to timely recognize. The system may flag hazards that were missed. During the playback format, an audio voiceover may be provided to help the novice driver identify the hazard that was not recognized and advise the novice driver information about the hazard. For example, a novice driver could be told as follows.

"At this location, it's important to recognize that there are pedestrians/drivers inside parked cars/vehicles that may be hidden by trees or bushes. Younger pedestrians can also be more unpredictable as they may not understand the driver's need for predictability. They may jump out in the middle of the road in front of you when you least expect it."

"Drivers who are backing up may not see your vehicle. Be prepared to stop if you see cars moving in a driveway."

Environment-based practice drives involve relatively lengthy drives encountering multiple hazards through an environment, including: Neighborhood, Beyond Your Neighborhood, Downtown, and Highway, for example. Scenario-based practice drives are individual segments or scenarios of an environment-based practice drive, wherein individual segments or scenarios present a single hazard or a few related hazards. The "Neighborhood" drive may comprise a drive in a typical subdivision. The "Beyond Your Neighborhood" drive may comprise roads with more traffic and higher speeds compared to the neighborhood drive. The "Downtown" drive may comprise a city roadscape presenting pedestrians, cyclists and unpredictable challenges. The "Highway" drive may comprise travel with high-speed traffic to provide a novice drive practice changing lanes and merging at higher speeds.

Some embodiments of Road Aware use hazard scenario-based practice drives through a particular environment. The novice driver is put in an "on-rails" simulated driving condition where the user has a mouse and PC screen. The user clicks on areas of the screen where he anticipates a hazard may appear or has appeared. An invisible-to-the-user target box is clickable for several seconds. If clicked on, the program notes a 'hit' that a hazard has been successfully anticipated or recognized. Visual feedback may also be presented to the user so that he knows that he has successfully recognized or anticipated a hazard. During playback in plan view, a check mark shows areas that the user has clicked on; an X mark shows areas that the user failed to click on and should have. In one embodiment, the user is allowed to repeat three times a hazard module or scenario before advancing to the next scenario.

Other embodiments of the Road Aware training may use environment-based practice drives that comprise a series of hazard scenarios or modules. An environment-based practice drive may comprise twenty or more different hazard modules. The novice driver is "on-rails" in a simulated driving environment. The user has a mouse and computer with audio; clicks on areas of the screen where he anticipates a hazard may appear. The user may click on objects or hazards. Objects include cars, pedestrians, etc. that could potentially cross the path of the user. Hazards are those objects that would collide with the user if no action is taken. The user gets credit for clicking on objects and areas where hazards may appear. The user may receive more credit for clicking on hazards or anticipating hazards. The user may get credit for clicking on the correct target only once. The user's score is tabulated and may be compared with previous own scores, scores of others (networked), or high scores for the week (networked). In this alternative embodiment, the user only gets one attempt per hazard module so that the entire environment must be completed in one continuous drive.

In a playback mode (after drive review), the user can playback his drive; where he clicks ("sees") those missed critical "hazards," which are shown with an audio commentary about why those events are important and where the user should be looking or behaving. The user may also be given congratulations on correctly identifying hazards. The program calculates a score for the user based on the number of correctly identified hazards and anticipatory looks against the maximum possible score in the background. A score may be calculated as follows.

$$\text{Total Score} = \Sigma f(\text{correctly identified hazards, anticipatory looks})/\Sigma f(\text{maximum score possible}).$$

Figure 1B:
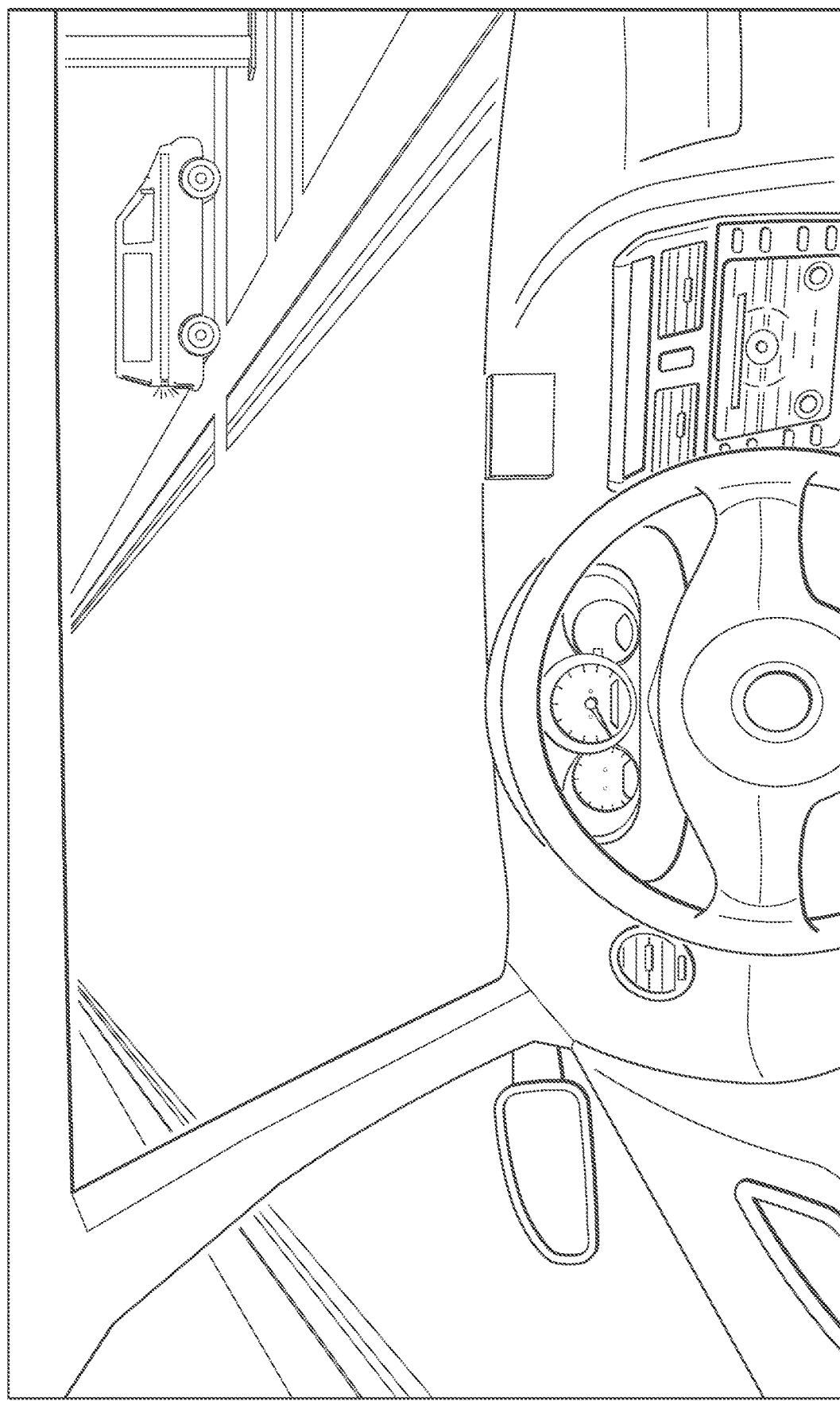

FIGS. 1A-1B illustrate a hazard simulation module depicting another vehicle about to back onto the street in the path of the novice driver. The objective is to teach the novice driver to look for: occupants in parked vehicles; brake lights being illuminated from parked vehicles; and parked vehicles beginning to move. As shown in FIG. 1A, another vehicle is parked in a driveway on the right side of the street, wherein the vehicle is facing away from the street. The driver in the other vehicle is visible to the novice drive through the passenger-side window. The brake lights of the other vehicle come on as the novice driver approaches the driveway. As shown in FIG. 1B, after a brief period of illumination, the brake lights turn off and the other vehicle starts to move slowly backward down the driveway toward the street. The novice driver has about three seconds to click on a target box before the other vehicle stops, and the target box is no longer active.

In this hazard simulation module, the target box is positioned so that the novice driver can click on it by clicking on the other car. The novice driver will be successful if: the novice driver clicks on the target box when it is observed that there is a driver in the other car and the other car's brake lights come on. This should be the first indication to the novice driver that the other vehicle is about to move. The novice driver will be 'rewarded' more for clicking on the target box when the other vehicle's brake lights first come on. The novice driver may also be rewarded a lesser amount if the novice driver clicks on the other vehicle as it is moving, but before that vehicle's brake lights come on the second time.

During a tutorial portion of the simulation, a message point may be made to the novice driver that drivers backing up onto the street may not see your vehicle in time to stop. The novice driver should be prepared to stop in case these vehicles do not stop.

Figure 2A:
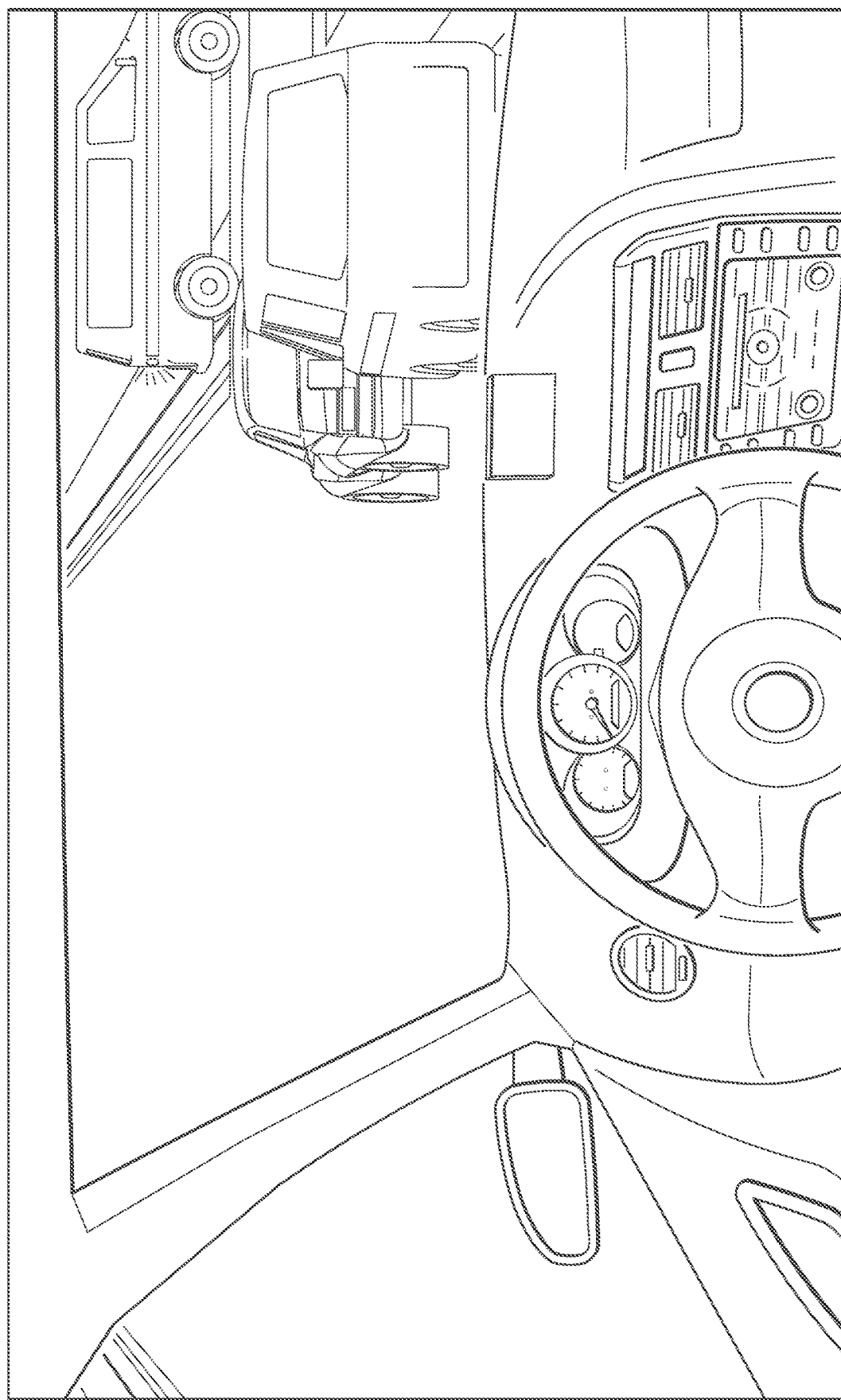
FIGS. 2A-2C illustrate a driving hazard module wherein another vehicle is backing out of a driveway in front of the vehicle of a novice driver and cars are parked at the side of the road to obstruct the novice driver's view of the other vehicle.
Figure 2B:
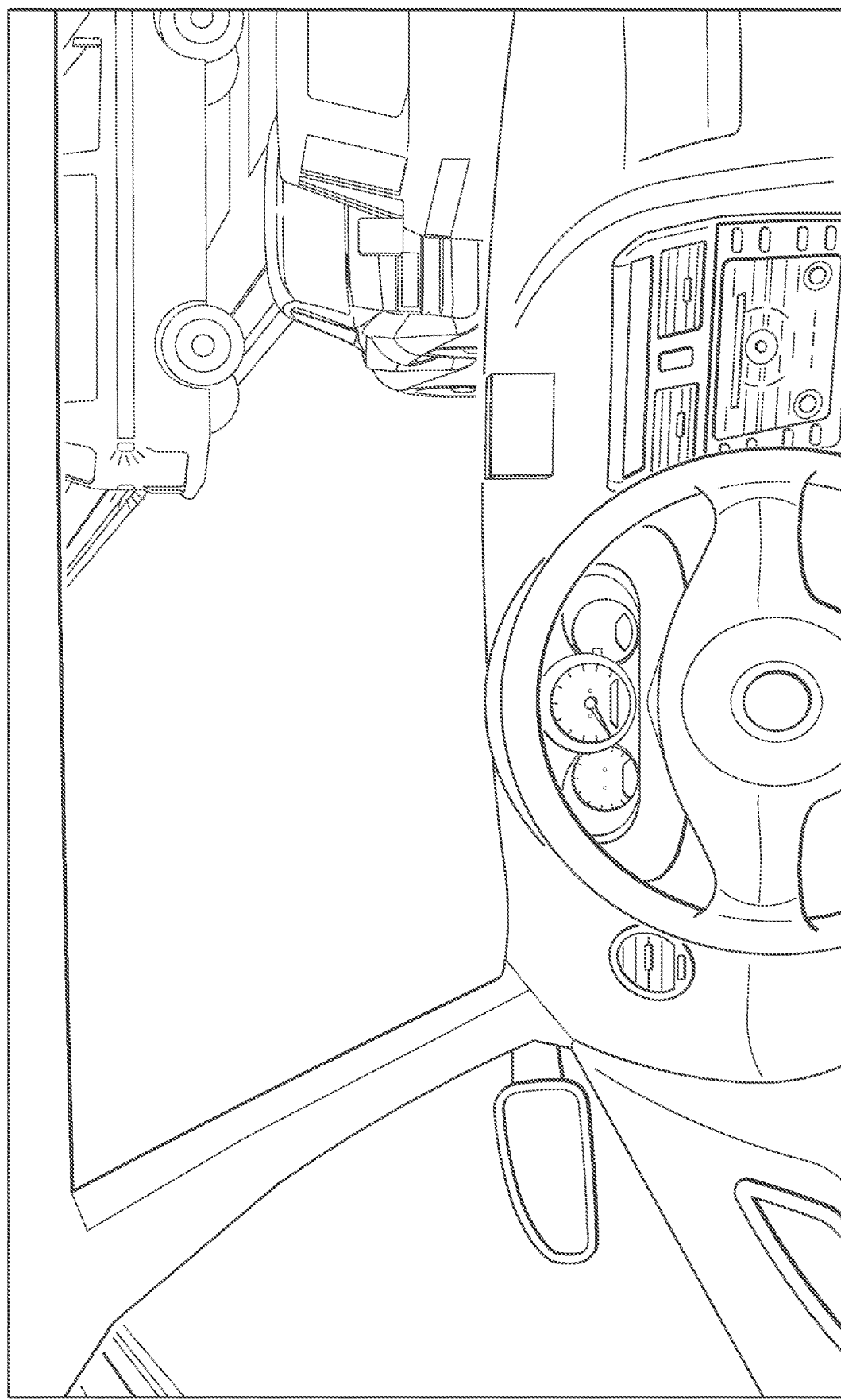
Figure 2C:
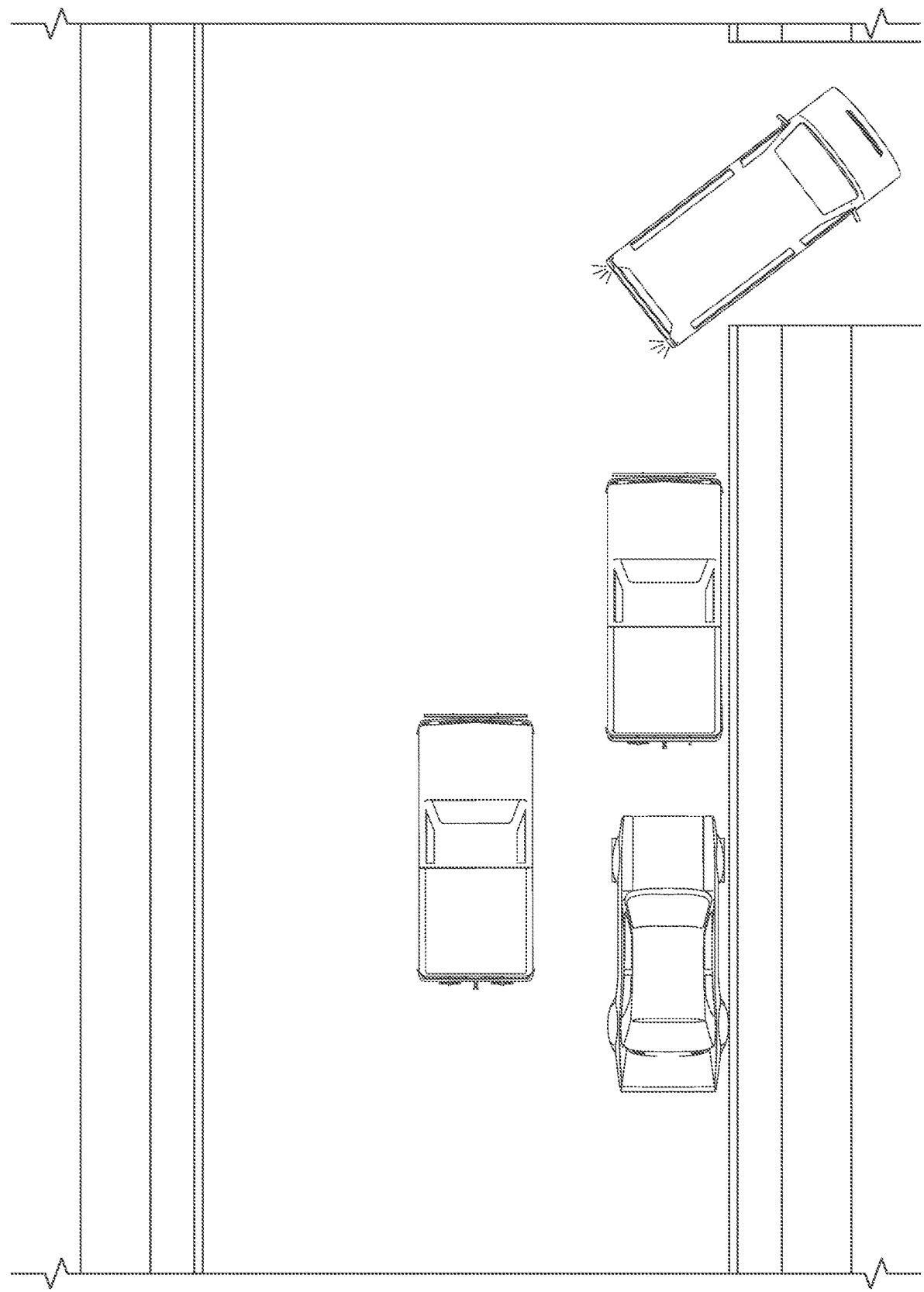

FIGS. 2A-2C illustrate an alternative of the hazard simulation module shown in FIGS. 1A-1B. In this simulation, the driveway is occluded by cars parked at the right-side curb between the novice driver's approaching car and the driveway with the parked other car. As shown in FIG. 2A, another vehicle is parked in a driveway on the right-side of the street, wherein the vehicle is facing away from the street. The driver in the other vehicle is visible to the novice drive through the passenger-side window. The brake lights of the other vehicle come on as the novice driver approaches the driveway. However, the novice driver's view is at least partially blocked by two cars parked at the curb on the right-side of the street. As shown in FIG. 2B, after a brief period of illumination, the brake lights turn off and the other vehicle starts to move slowly backward down the driveway toward the street as the novice driver's car approaches the two cars parked at the curb just in front of the driveway. The novice driver has about three seconds to click on a target box before the other vehicle's tail lights illuminate and the vehicle stops, at which time the target box is no longer active.

In yet another variation of this hazard simulation module, a garage door opens and a car reverses out of a garage. This module may test how soon the novice driver will recognize the opening of the garage door as a potential driving hazard.

Figure 3A:
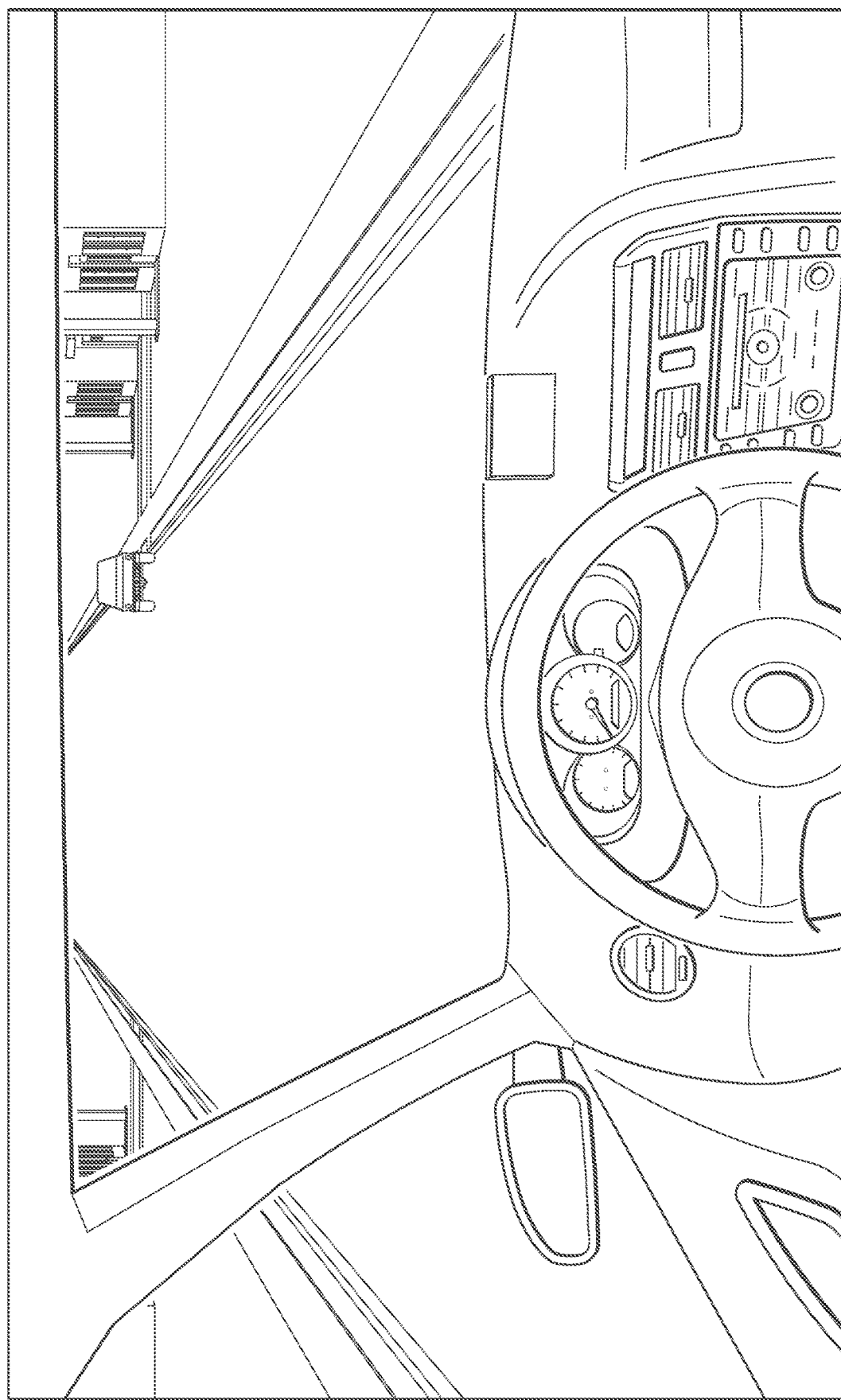
FIGS. 3A-3D illustrate a driving hazard module wherein another vehicle enters the traffic lane in front of the novice driver's advancing vehicle from a position parked at the right-side curb.
Figure 3B:
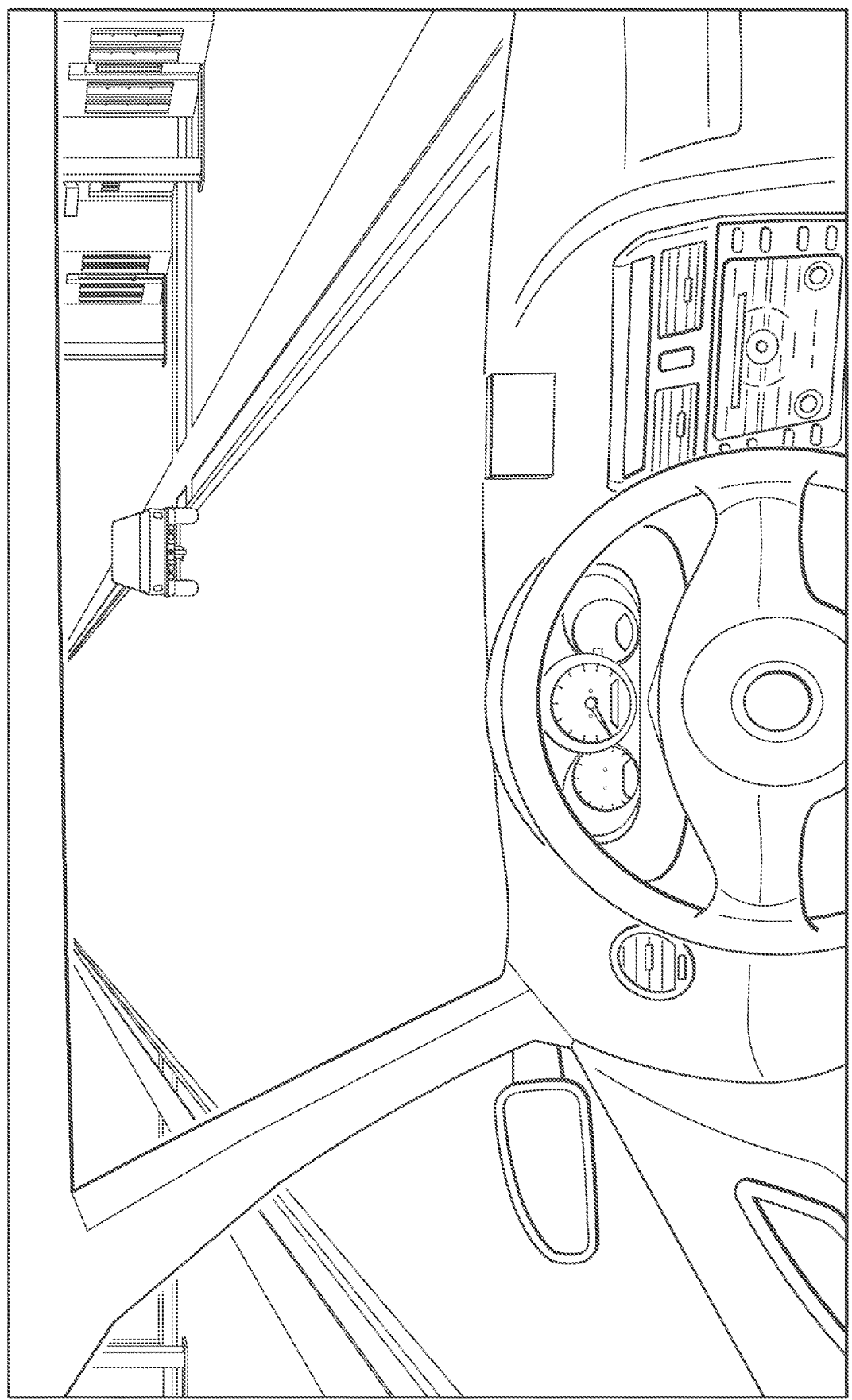
Figure 3C:
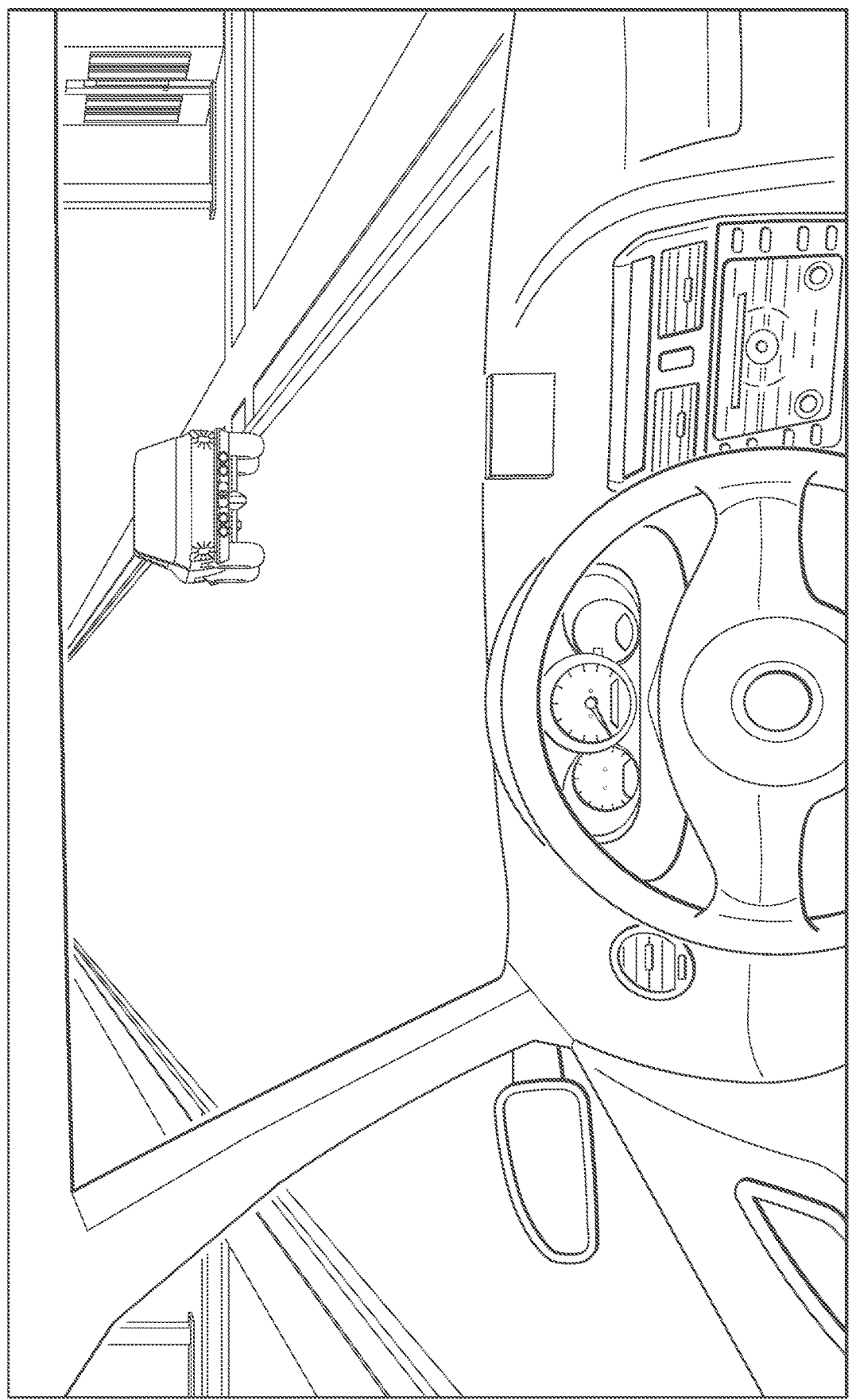
Figure 3D:
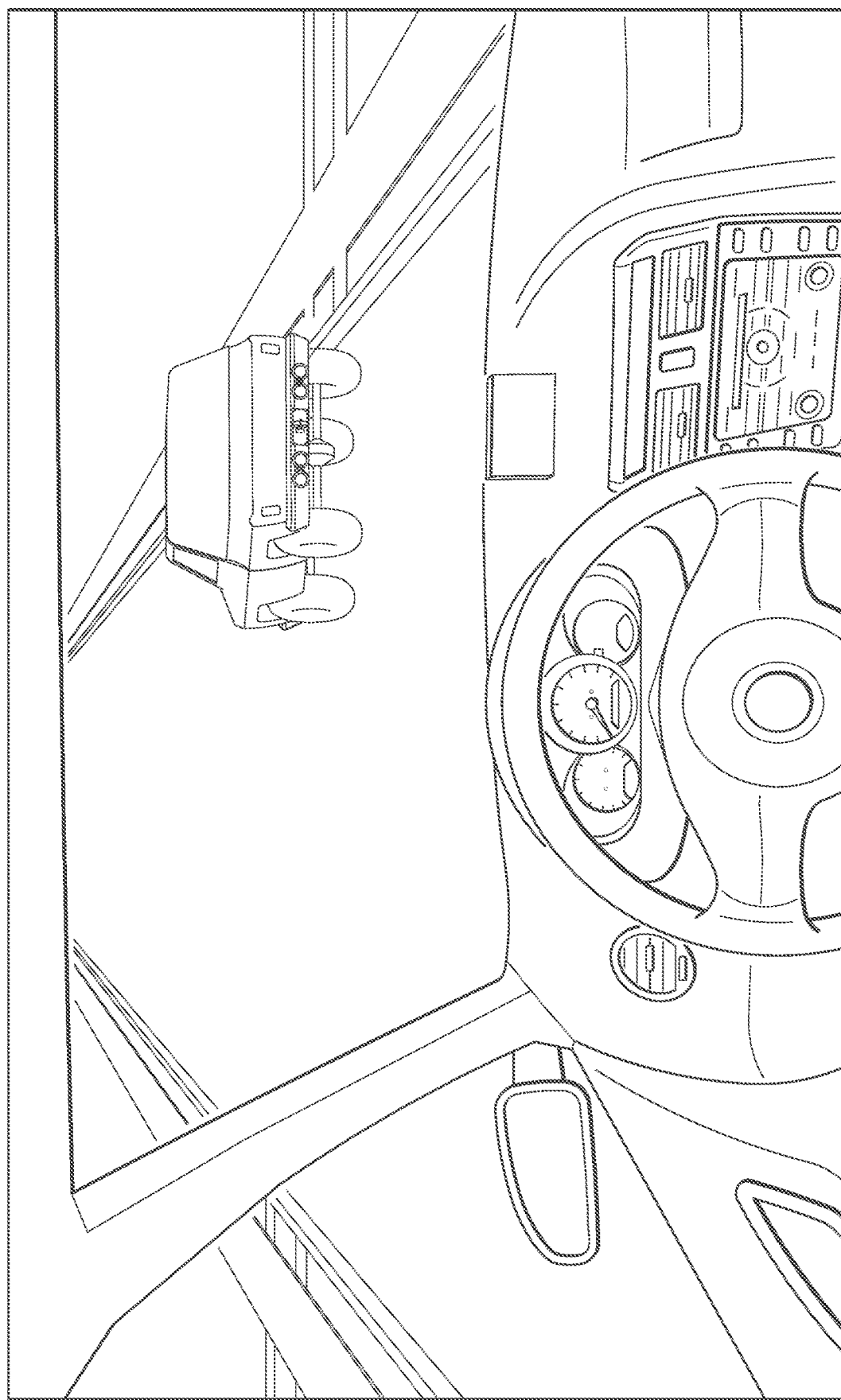

FIGS. 3A-3D illustrate a hazard simulation module depicting a vehicle parked on the street, which pulls into a traffic lane in front of a novice driver's vehicle. The objective of this hazard simulation module is to teach a novice driver to look for: (1) occupants in parked vehicles; (2) brake lights being illuminated in parked vehicles; (3) turn signals flashing from parked vehicles; and (4) parked vehicles beginning to move. As shown in FIG. 3A, the other vehicle is parked at the curb on the right-side of the street as the novice driver's vehicle approaches. The other vehicle is parallel parked at the curb on the right-side of the street facing the same direction as the novice driver's vehicle. In FIG. 3B, the novice driver's vehicle continues to approach as the other car remains parked at the curb. However, in both FIGS. 3A and 3B, the driver in the other vehicle is visible to the novice driver through the rear window of the other vehicle. In FIG. 3C, the brake lights of the other vehicle come on and the left turn signal illuminates as the first indication that the other vehicle is about to enter the traffic lane. As shown in FIG. 3D, the other vehicle then pulls into the traffic lane in front of the advancing novice driver's vehicle directly in the path of the proceeding novice driver's vehicle and the novice driver's vehicle is required to slow down to avoid a collision with the other vehicle.

The other vehicle's turn signal is on for about 3 seconds before the other vehicle pulls into the traffic lane, so that the novice driver has about 3 seconds to click on the target box (the other vehicle) before the other vehicle begins to pull out into the traffic lane, and the target box is no longer active. The novice driver will be rewarded if: (1) the novice driver recognizes that the other vehicle has a driver in the driver's seat and recognizes the left turn signal indication as soon as it appears; (2) the novice driver clicks the target box when the other vehicle's brake lights come on; and (3) the novice driver clicks on the target box before the other vehicle begins moving, wherein the amount of the award decreases, respectively.

If the novice driver's vehicle is moving at about 20 mph, then 3 seconds allows the novice driver's vehicle to travel about 88 feet; the other vehicle animation may begin when the novice driver's vehicle is about 100' from the other vehicle. The message point for the tutorial portion of the module may be that cars pulling out into traffic don't always yield the right-of-way or signal that they are about to go into traffic. Novice drivers should look for warning signs like people sitting in the driver's seat and brake lights.

Figure 4A:
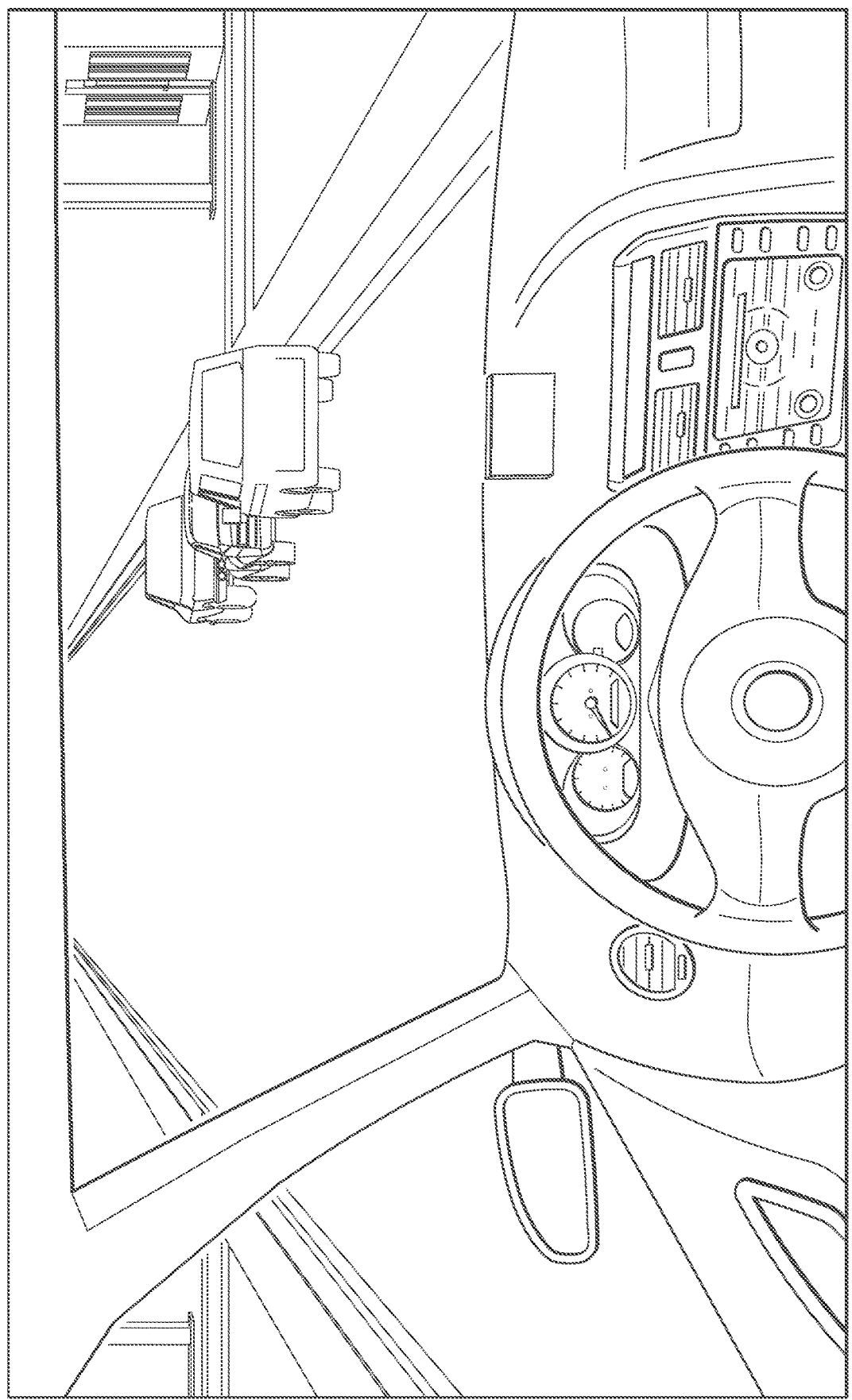
FIGS. 4A-4B illustrate a driving hazard module similar to that illustrated in FIGS. 3A-3D, except that the other vehicle is parked at the right-side curb between two more vehicles, which partially block the novice driver's view of the other vehicle.
Figure 4B:
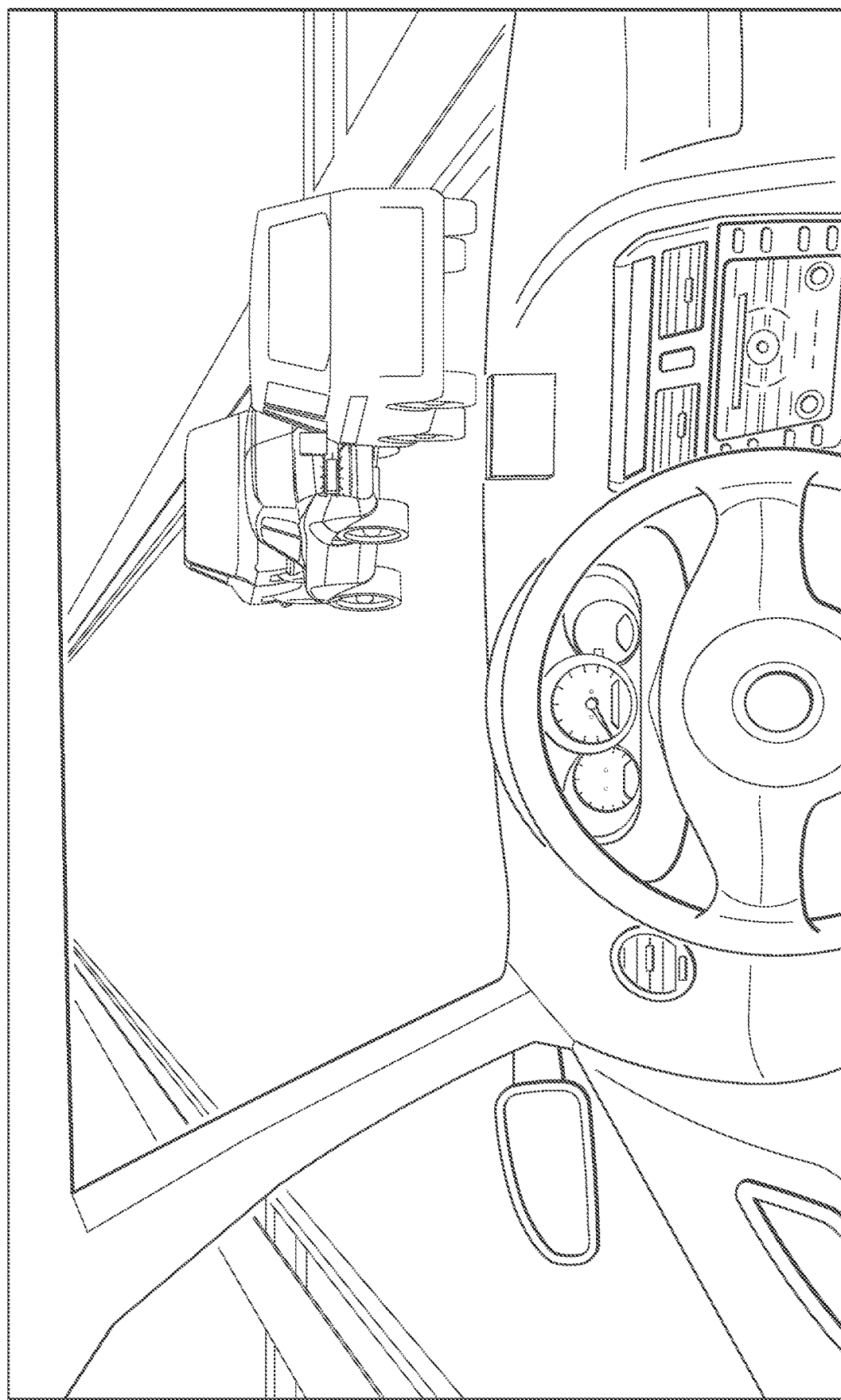

FIGS. 4A-4B illustrate a hazard simulation module similar to that of FIGS. 3A-3D, wherein a vehicle is depicted parallel-parked on the street between two other cars, and the vehicle pulls into a traffic lane in front of a novice driver's vehicle. The objective of this hazard simulation module is to teach a novice driver to look for: (1) occupants in parked vehicles; (2) brake lights being illuminated in parked vehicles; (3) turn signals flashing from parked vehicles; and (4) parked vehicles beginning to move. As shown in FIG. 4A, the other vehicle is parallel-parked between two other vehicles at the curb on the right-side of the street facing the same direction as the novice driver's vehicle. The novice driver's vehicle approaches in the traffic lane. The driver in the other vehicle is only partially visible to the novice driver through the rear window because there is a vehicle parked behind the other vehicle. In FIG. 4B, the brake lights of the other vehicle come on and the left turn signal illuminates as the first indication that the other vehicle is about to enter the traffic lane. Similar to the module shown in FIGS. 3A-3D, the other vehicle then pulls into the traffic lane in front of the advancing novice driver's vehicle directly in the path of the proceeding novice driver's vehicle and the novice driver's vehicle is required to slow down to avoid a collision with the other vehicle. The novice driver may be rewarded more for recognizing the other vehicle as a potential hazard as early as possible.

This hazard simulation module may be further modified to include a car (parked) is occluded by a larger truck. A further modification may include several parallel-parked cars that have drivers visible, but only one of the vehicles moves (indicated by active brake lights). A still further modification may be where the parallel-parked other vehicle has a broken tail light and the first indication of a hazard is actual movement of the other vehicle into the traffic lane.

Figure 5:
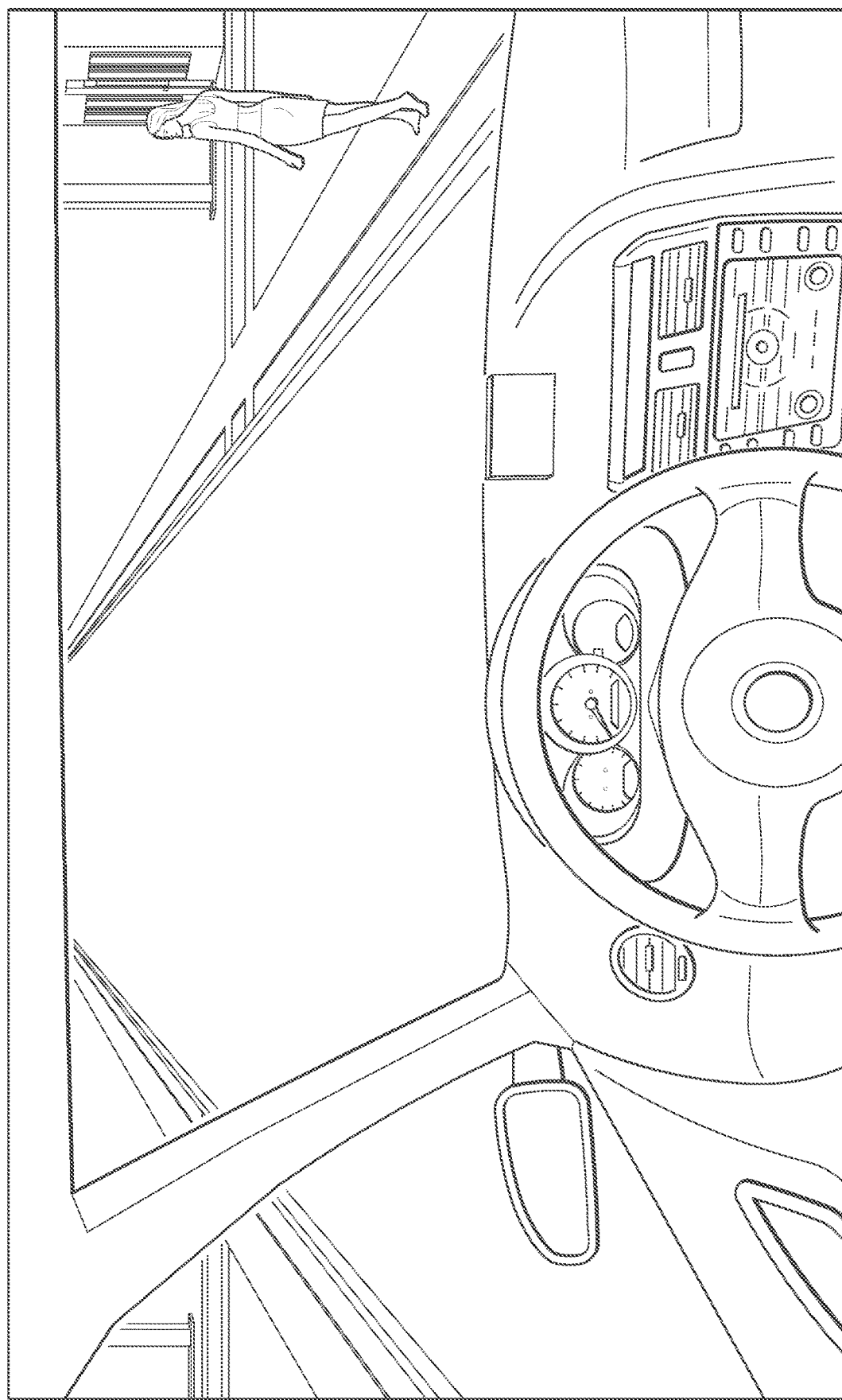
FIG. 5 illustrates a driving hazard module wherein a pedestrian is walking down the right-side sidewalk as the novice driver's vehicle approaches.

FIG. 5 illustrates a hazard simulation module depicting a pedestrian walking/gliding along a sidewalk. The novice driver should recognize the presence of the pedestrian by clicking/fixating on him, wherein the target box is over the pedestrian. The learning objective of this hazard simulation module is to teach a novice driver to learn to detect the presence of pedestrians through: (1) detection of movement; (2) patterns of pedestrian traffic; and (3) detection and recognition of warning signs or events. In this scenario, a pedestrian is visible a walking parallel to the path of the novice driver. No actual hazard is presented here, but the novice driver should detect the presence of a pedestrian by the pedestrian's movement. The novice driver will be 'successful' if the novice driver recognizes that the pedestrian is moving on the sidewalk. The novice driver will be 'rewarded' more for clicking on the pedestrian early and repeatedly to make sure that the pedestrian does not change direction. During a tutorial portion of the module, a message point may be that pedestrians walking along a street may change direction and cross in front of you. Novice drivers should be watchful for sudden changes in direction by pedestrians or cyclists that may require the novice driver to stop.

Figure 6A:
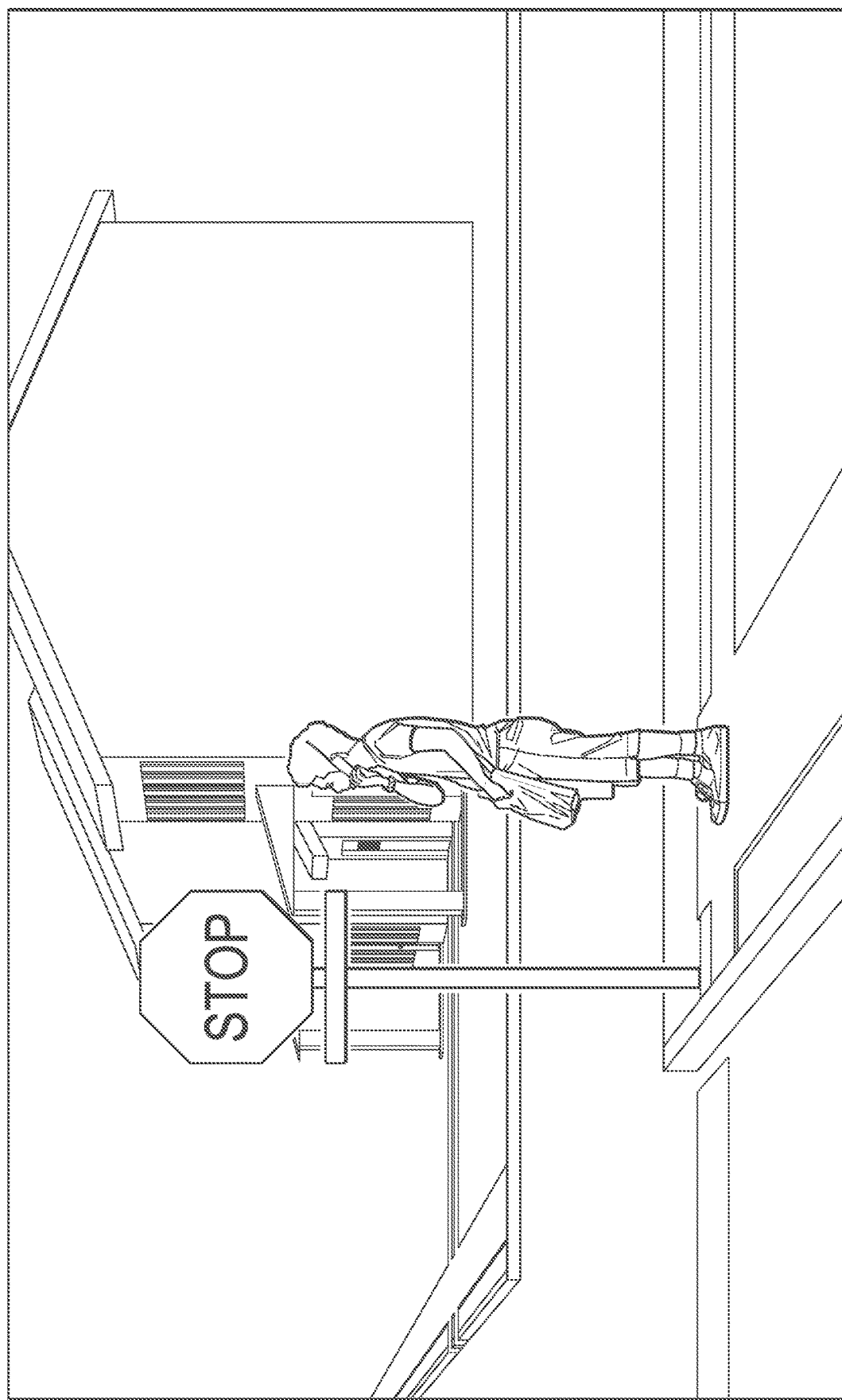
FIGS. 6A-6D illustrate a driving hazard module wherein a pedestrian is standing near a stop sign at an intersection as the novice driver's vehicle approaches the intersection.
Figure 6B:
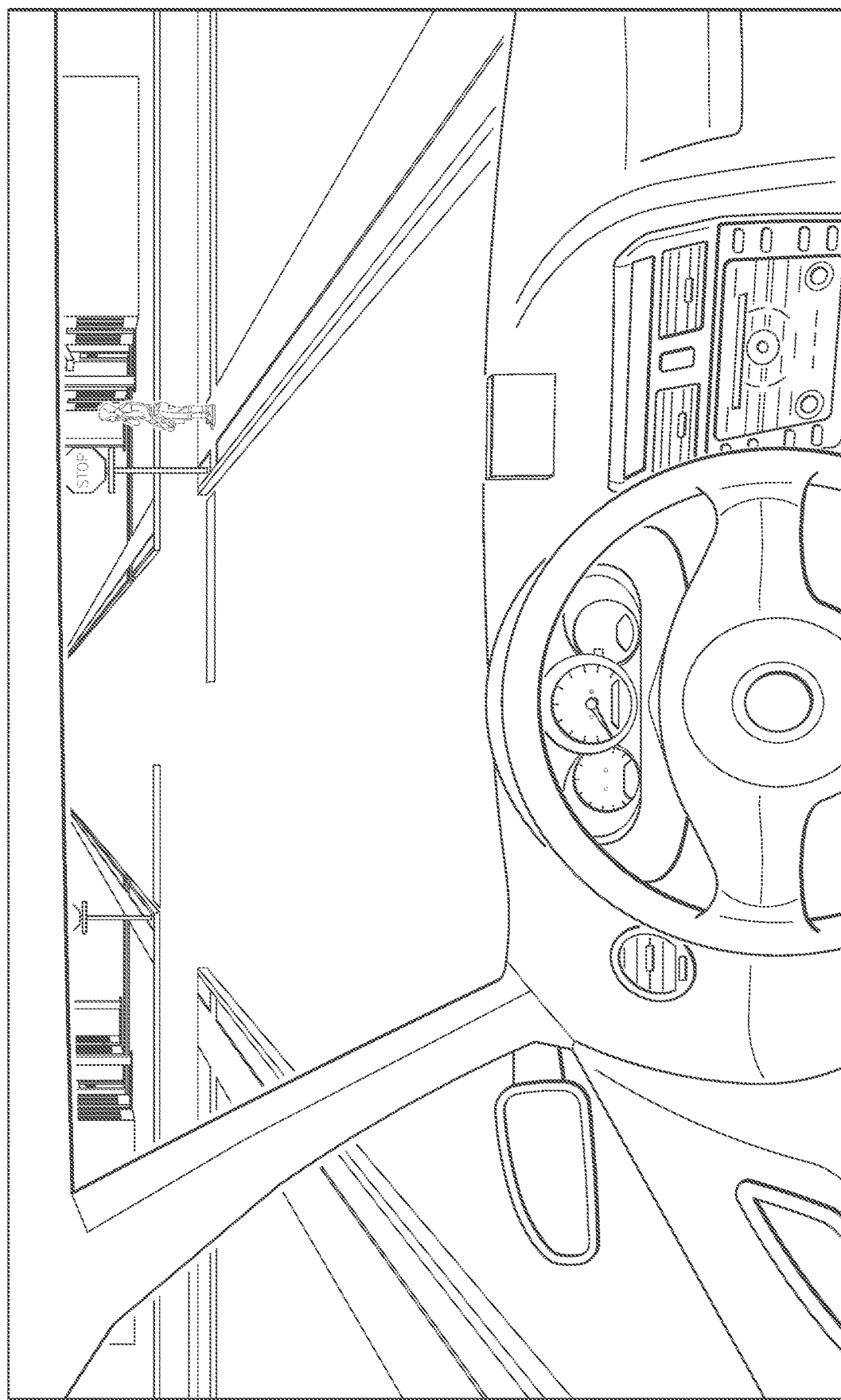
Figure 6C:
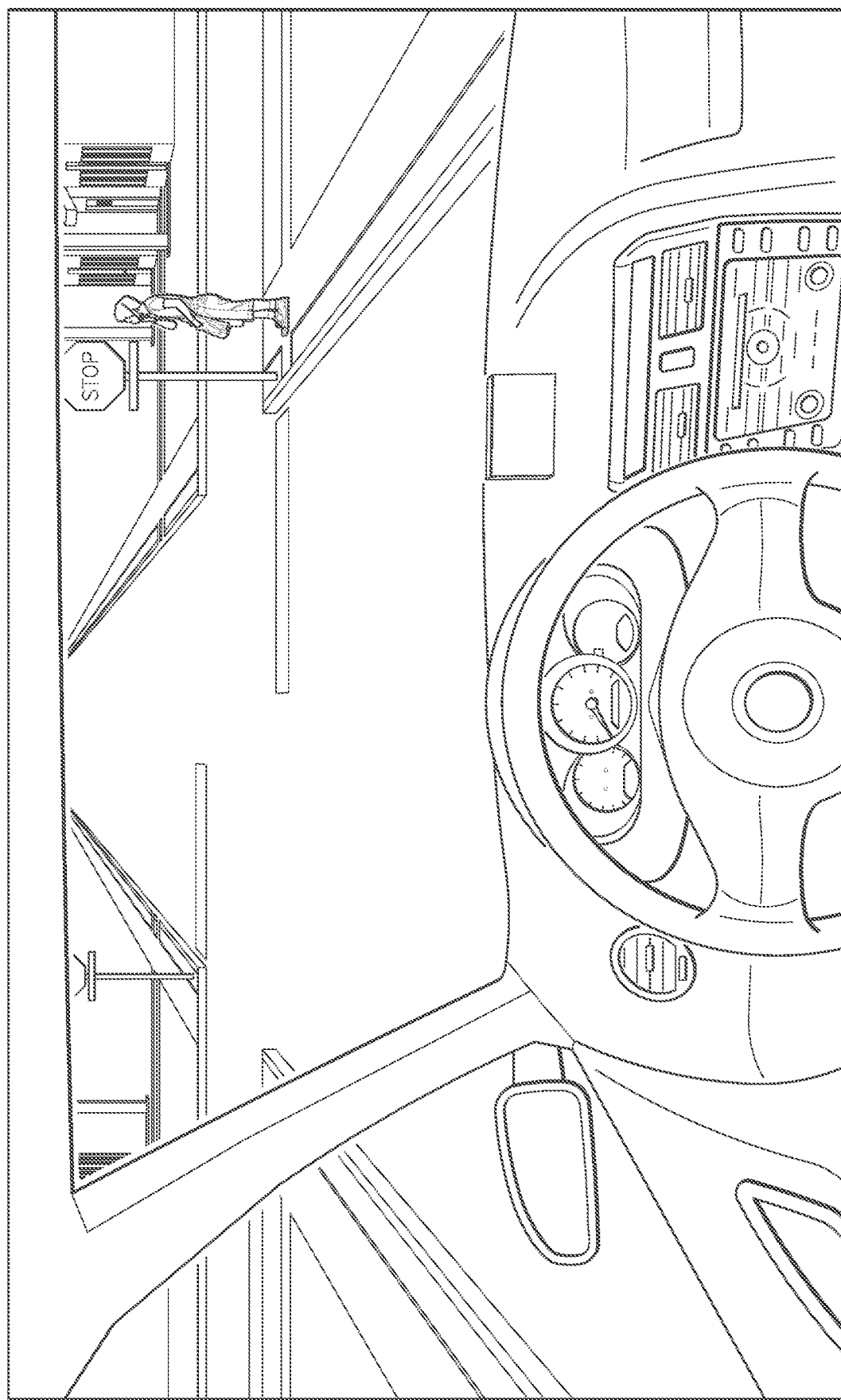
Figure 6D:
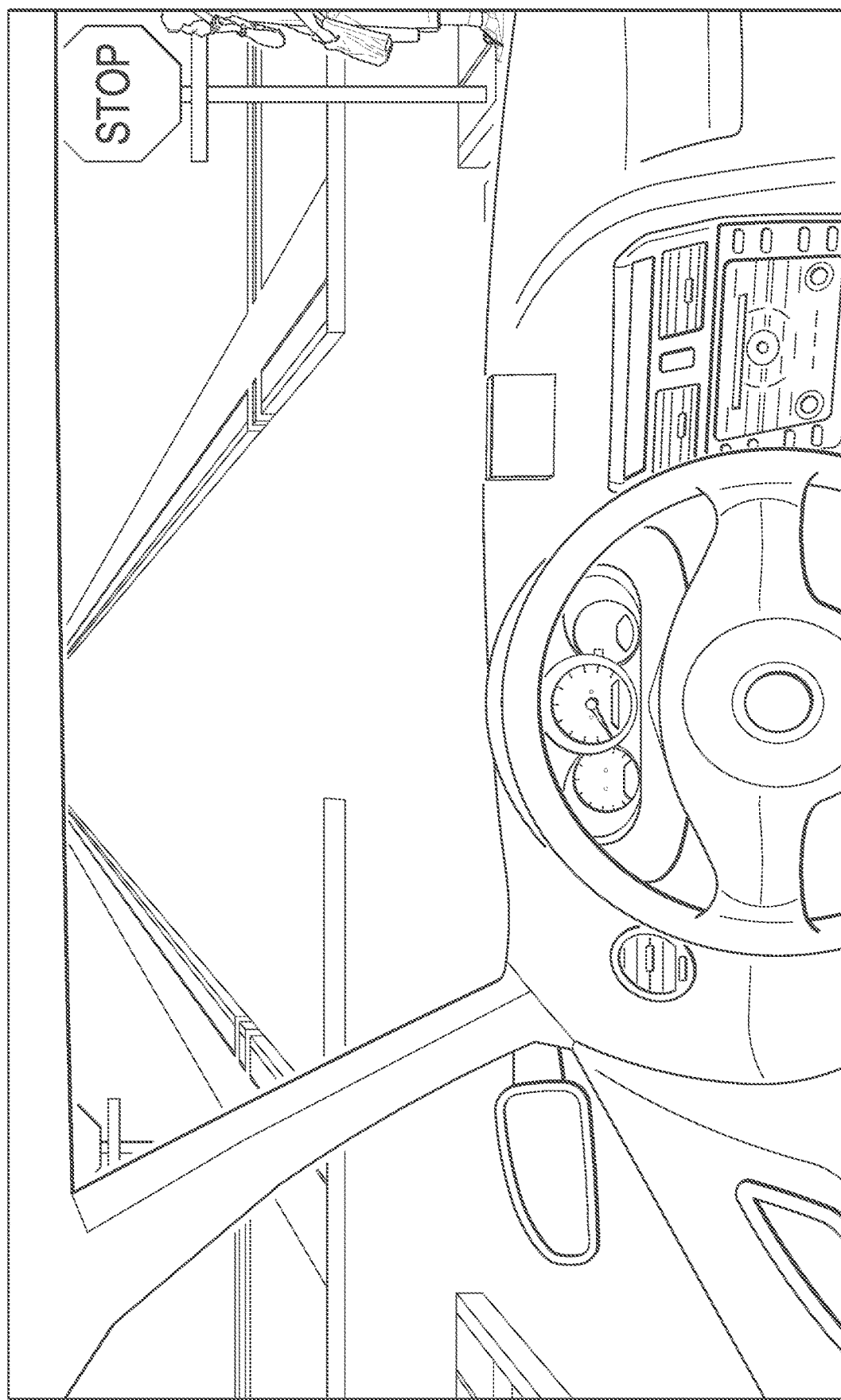

FIGS. 6A-6D illustrate a pedestrian (child) standing on the sidewalk near a crosswalk at an intersection. The learning objective of this hazard simulation module is to detect and anticipate the presence of pedestrians through: (1) recognition of pedestrians near a crosswalk; and (2) patterns of pedestrian traffic. In this scenario, pedestrian(s) are stationary at or near a crosswalk location. No actual hazard is presented here, but the novice driver should detect the presence of pedestrians and the possibility that they might move out into the crosswalk in front of them. As shown in FIG. 6A, a pedestrian is standing at or near a crosswalk at an intersection. This could be a young child who might be waiting for a school bus to arrive. The target box is over the pedestrian. FIG. 6B shows the novice driver's vehicle approaching the intersection where the pedestrian is standing at a corner by a stop sign. FIG. 6C illustrates how the novice driver's vehicle approaches the intersection. FIG. 6D shows the novice driver's vehicle stopped at the intersection with the brake lights illuminated. The novice driver may be 'successful' if the novice driver recognizes that the pedestrian may begin moving across the path of the novice driver. The novice driver may be 'rewarded' more for clicking on the pedestrian early and repeatedly to make sure that the novice driver is aware of the potential that the pedestrian may begin to move into the cross-walk.

Alternative variations of this hazard simulation module could include a stop sign where the pedestrian is occluded by a tree or another vehicle parked at the curb. A message point during a tutorial portion of the module may be to advise the novice driver that child pedestrians should be treated as especially unpredictable. Drivers should be prepared to stop if the pedestrian does something unexpected. The module could illustrate by having the pedestrian crossing in front of the car at the crosswalk.

Figure 7A:
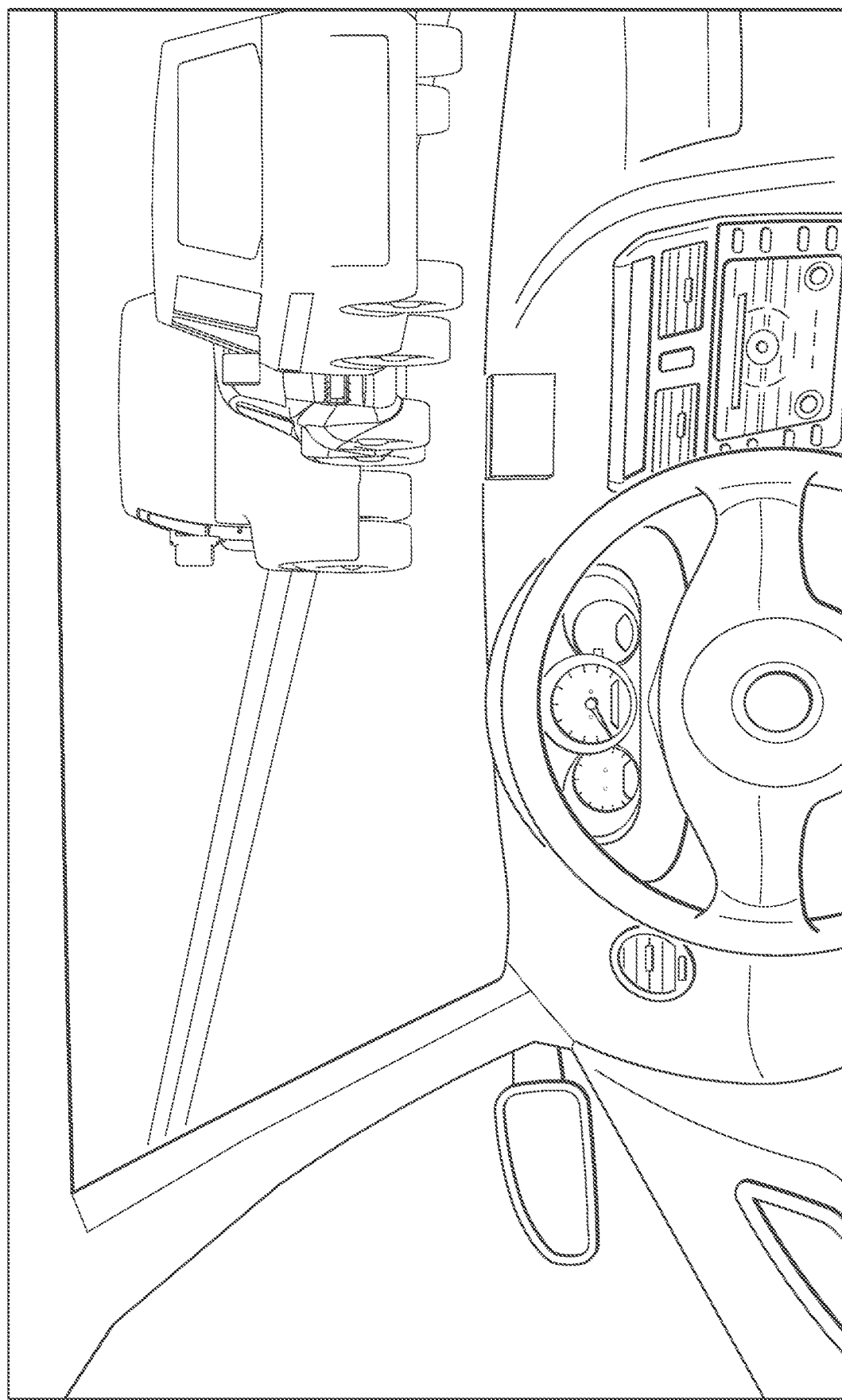
FIGS. 7A-7B illustrate a driving hazard module wherein another vehicle opens a car door into a lane of traffic from a position parked at the curb.
Figure 7B:
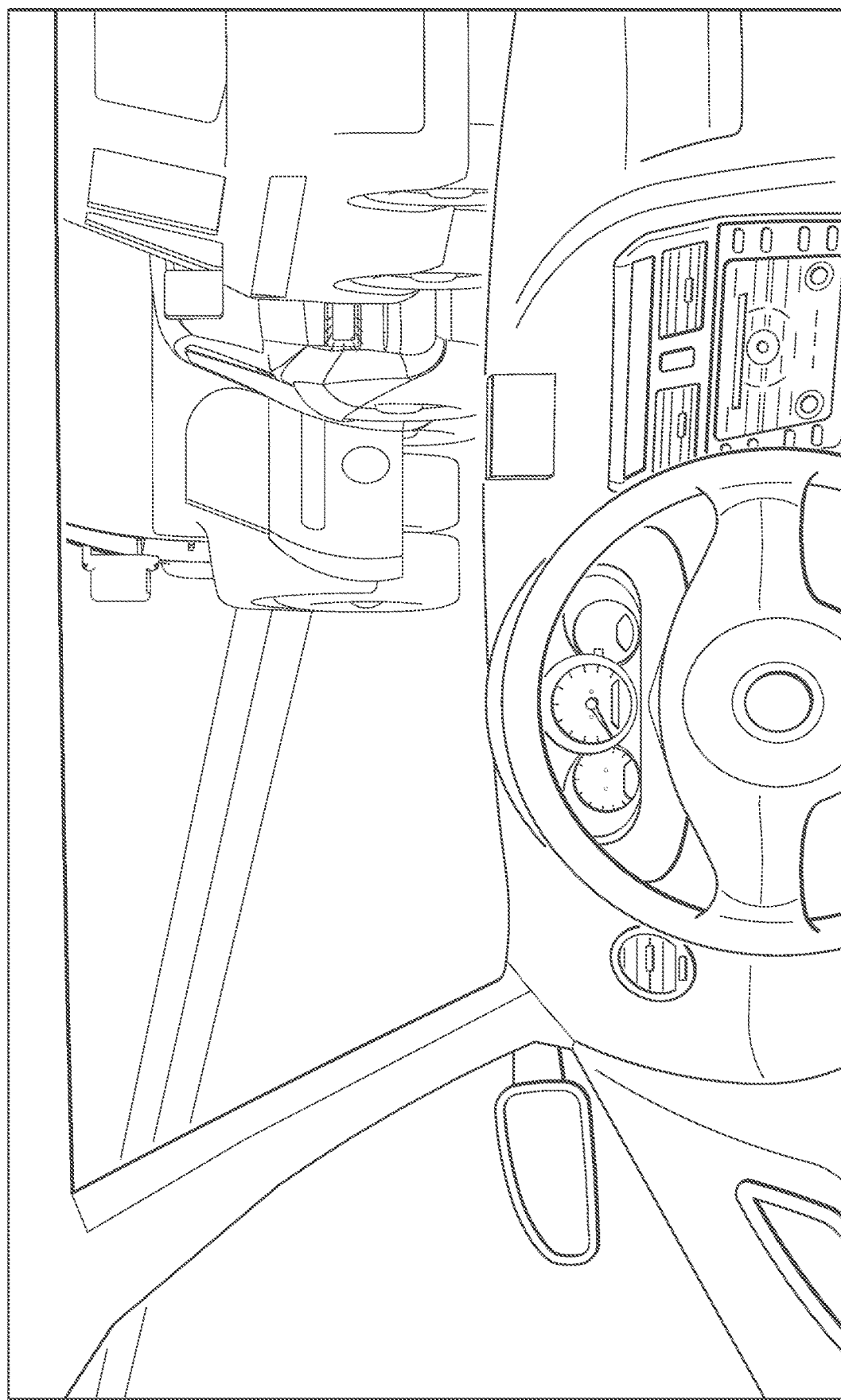

FIGS. 7A-7B illustrate a hazard simulation module wherein a vehicle door opens along a line of parked cars (on-street). The learning objective of the module is to teach how to look for warning signs regarding parked cars indicating that the cars may be occupied and that doors may open in such a way to pose a hazard for the novice driver. In this simulation, the street narrows due to on-street parking. As shown in FIG. 7A, several vehicles are parallel-parked bumper-to-bumper at the right curb. The novice driver approaches cars parked along the right side of the road. In one of the cars ahead on the right, a passenger is visible in the rear window. The novice driver's vehicle is approaching in the traffic lane, which runs beside the parked vehicles. One of the vehicles in the line of parked vehicles has its brake lights illuminated. As shown in FIG. 7B, the novice driver's vehicle has advanced and is about to pass the parked cars, as the vehicle with the illuminated brake lights has its driver's-side door open and extending into the traffic lane. During the initial stages of the simulation, the target box may be over the passenger visible inside the parked vehicle. During later stages of the simulation, the target box may be over the illuminated tail lights and or the open car door. novice driver will be 'successful' if: (1) the novice driver clicks on the occupant inside the parked vehicle; and (2) the novice driver clicks on the door opening into the traffic lane.

Alternative modifications of the module may include a narrower street or a one-way street with parking on both sides, wherein car(s) on either side of the street may open doors. A message point for a tutorial portion of the module may be to teach drivers to expect that drivers won't always check their mirrors before leaving their vehicles. When driving alongside parked cars, novice drivers should look for people who might open their car doors in front of them, or brake lights that appear. A car door opening may be shown in a second photo or video to illustrate the point.

Figure 8A:
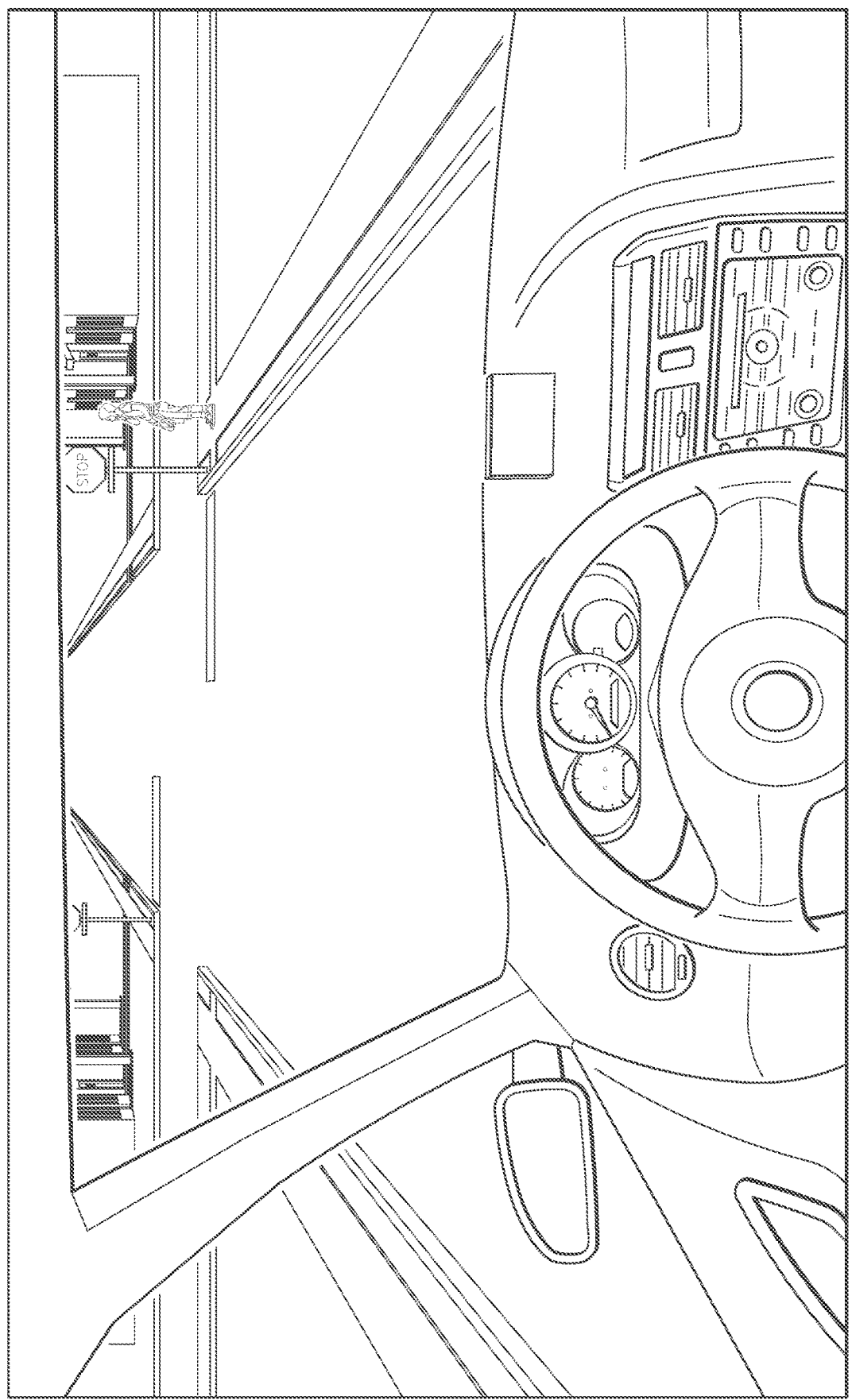
FIGS. 8A-8B illustrate a driving hazard module wherein pedestrian crosses at an intersection.
Figure 8B:
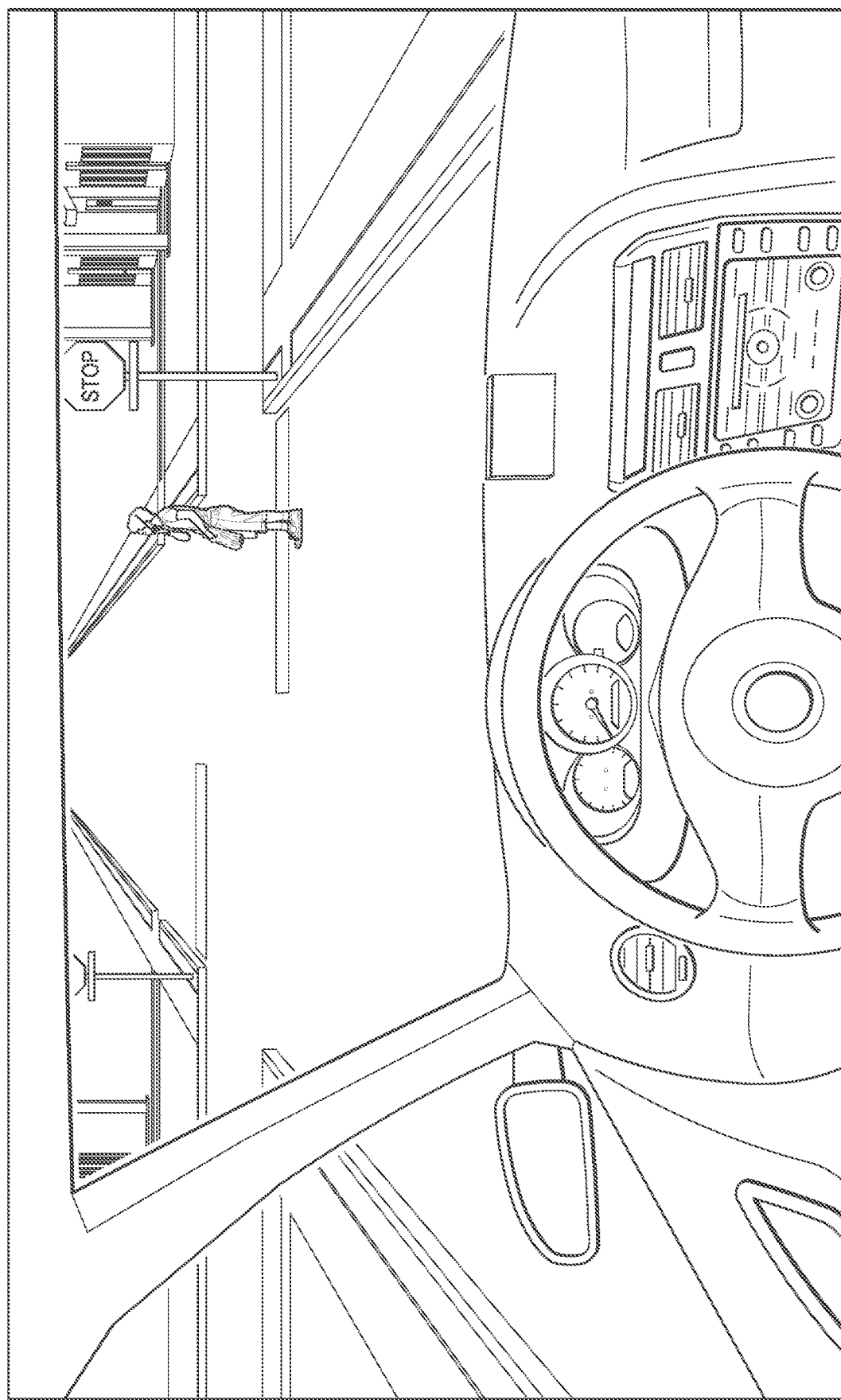

FIGS. 8A-8B illustrate a pedestrian (child) crossing a street at an intersection cross walk. The learning objective of this hazard simulation module is to detect and anticipate the presence of pedestrians through: (1) recognition of pedestrians at a crosswalk; and (2) patterns of pedestrian traffic. In this scenario, pedestrian(s) are stationary at or near a crosswalk location. In this scenario, the pedestrian is visible to the novice driver and is walking along the sidewalk. The pedestrian crosses the street well ahead of the novice driver so that no actual hazard or conflict is possible. As shown in FIG. 8A, a pedestrian is standing at or near a crosswalk at an intersection. This could be a young child who might be waiting for a school bus to arrive. The pedestrian may be seen for at least 5 seconds before the novice driver's vehicle arrives at the crosswalk. The target box is over the pedestrian. FIG. 8B shows the pedestrian entering the street and crossing at the cross-walk as the novice driver's vehicle approaches the intersection. The novice driver may be 'successful' if the novice driver recognizes that the pedestrian may begin moving across the path of the novice driver. The novice driver may be 'rewarded' more for clicking on the pedestrian early.

Alternative variations of this hazard simulation module could include a stop sign where the pedestrian is occluded by a tree or another vehicle parked at the curb. It may further include a car behind the novice driver's vehicle that is honking (aggressive driving). A message point during a tutorial portion of the module may be to advise the novice driver that pedestrians may cross in front of cars.

FIGS. 9A-9G illustrate a hazard simulation module depicting a novice driver at four-way STOP (Left-Right-Left look). The objective of this hazard simulation module is to teach a novice driver to give way to other vehicles that arrive at the four-way stop sign first. During this simulation, an "up" arrow, which means "Proceed," will be active and when clicked by the novice driver will move the ND vehicle forward. The novice driver will successfully navigate the hazard simulation module by waiting until the appropriate time to click on the "up" arrow.

Figure 9A:
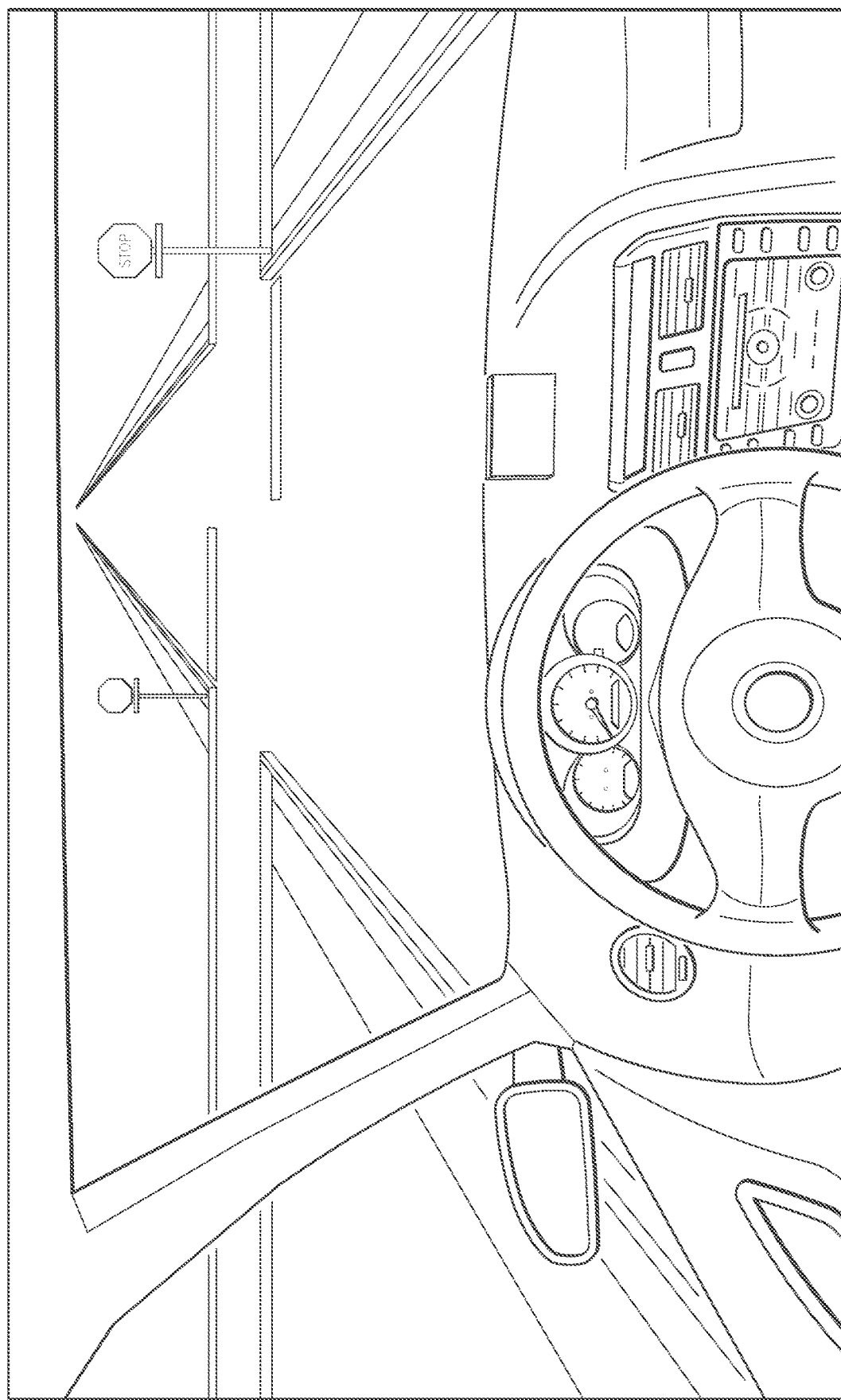
FIGS. 9A-9G illustrate a driving hazard module wherein several cars arrive at a 4-way stop simultaneously.
Figure 9B:
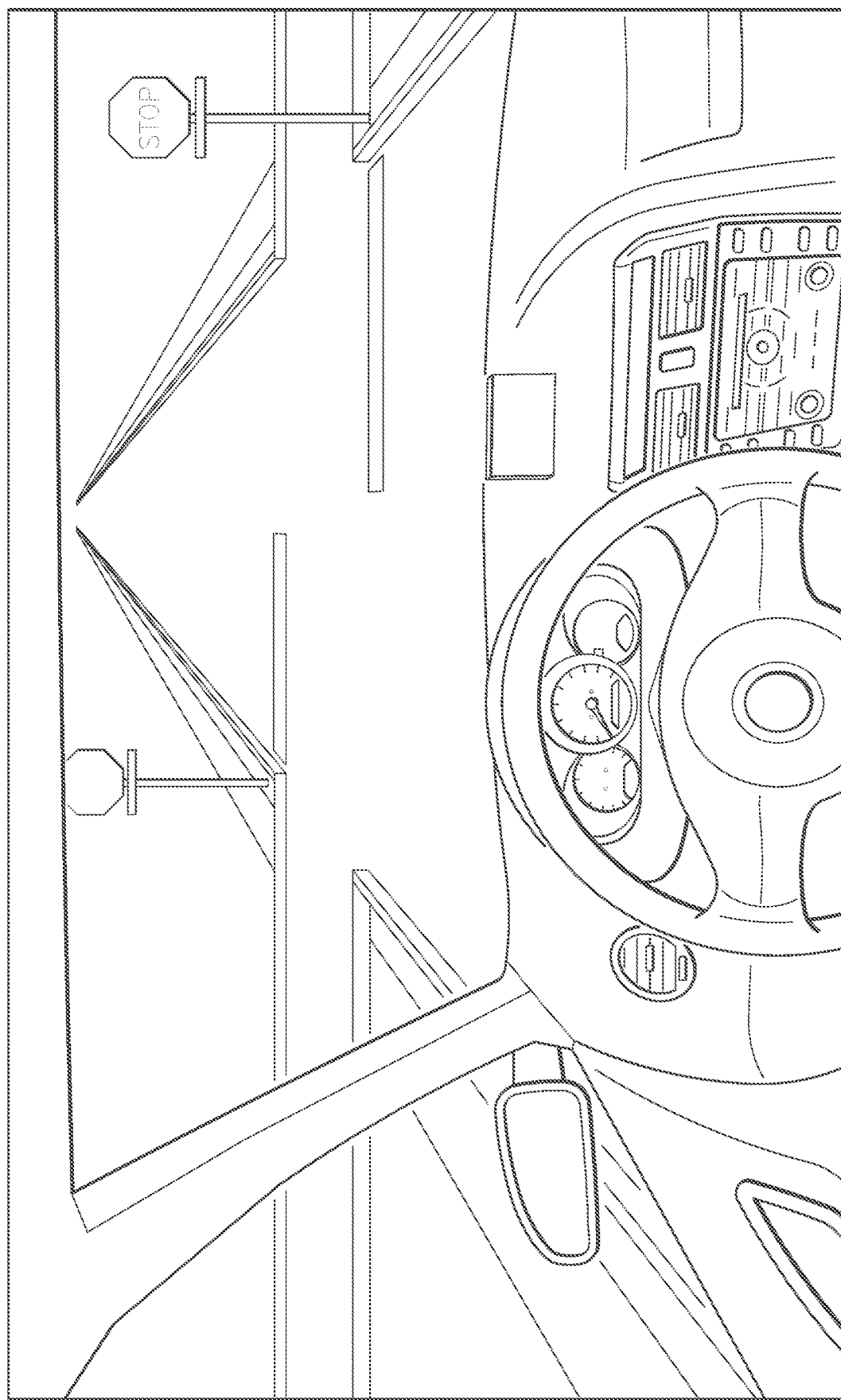
Figure 9C:
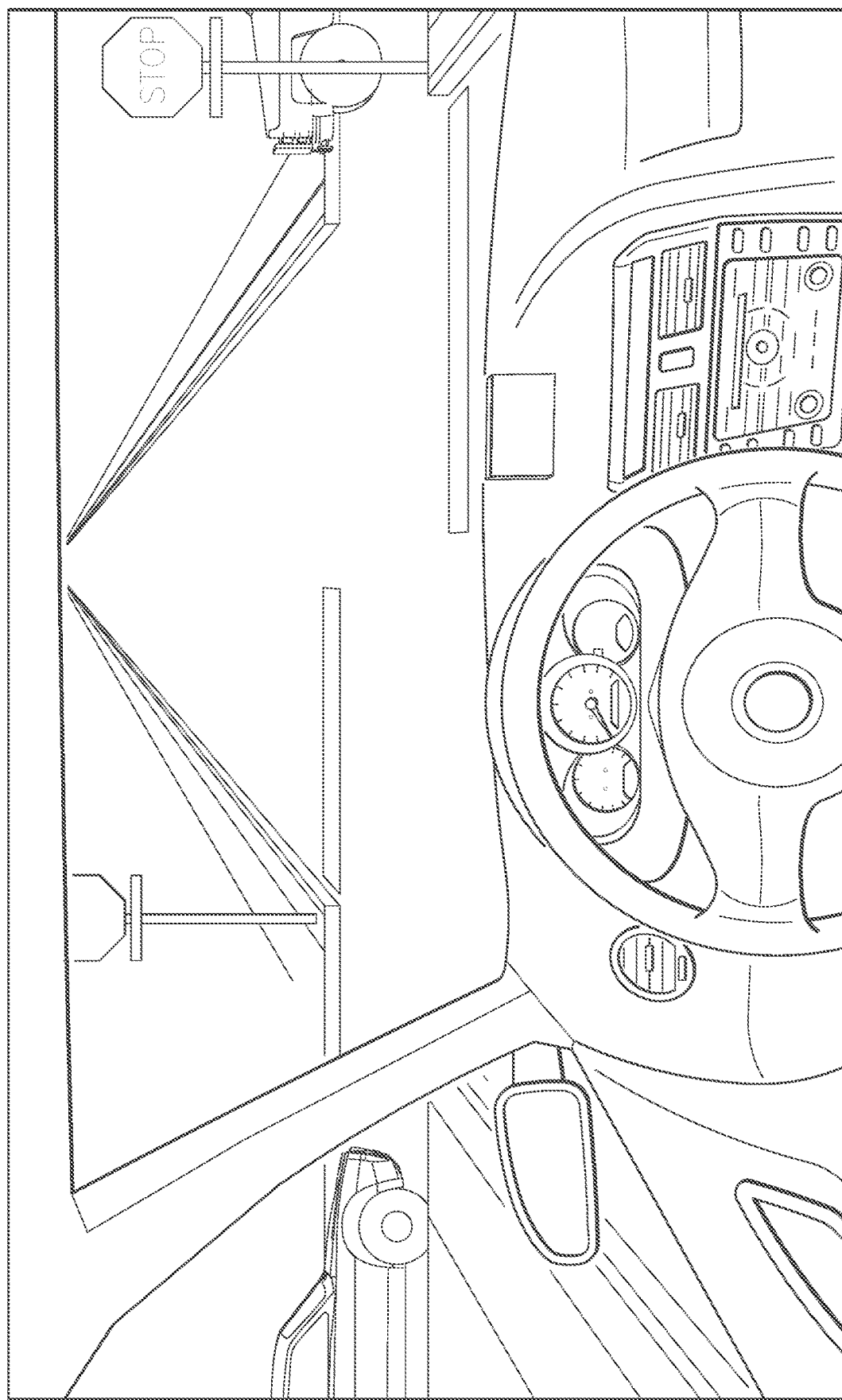
Figure 9D:
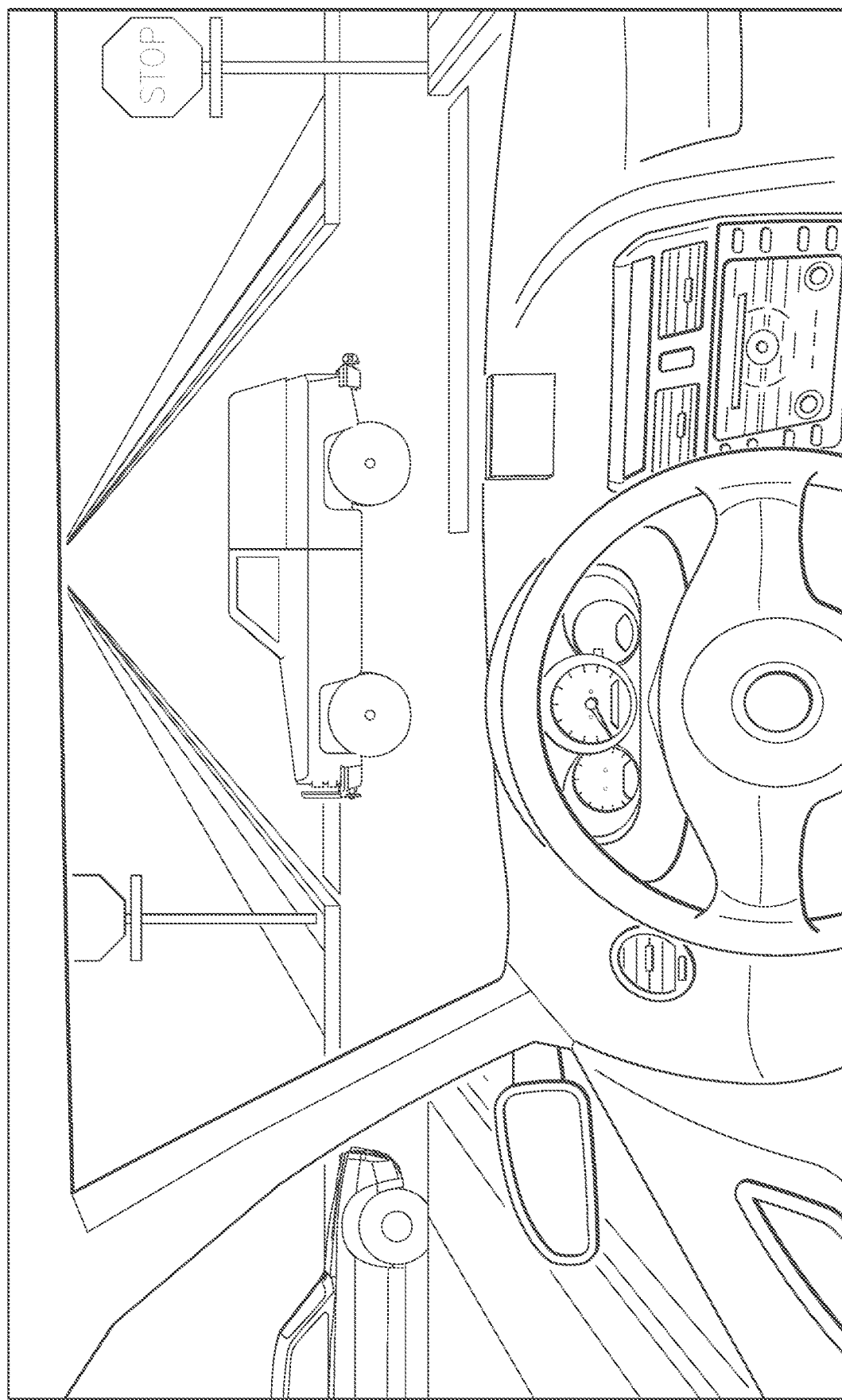
Figure 9E:
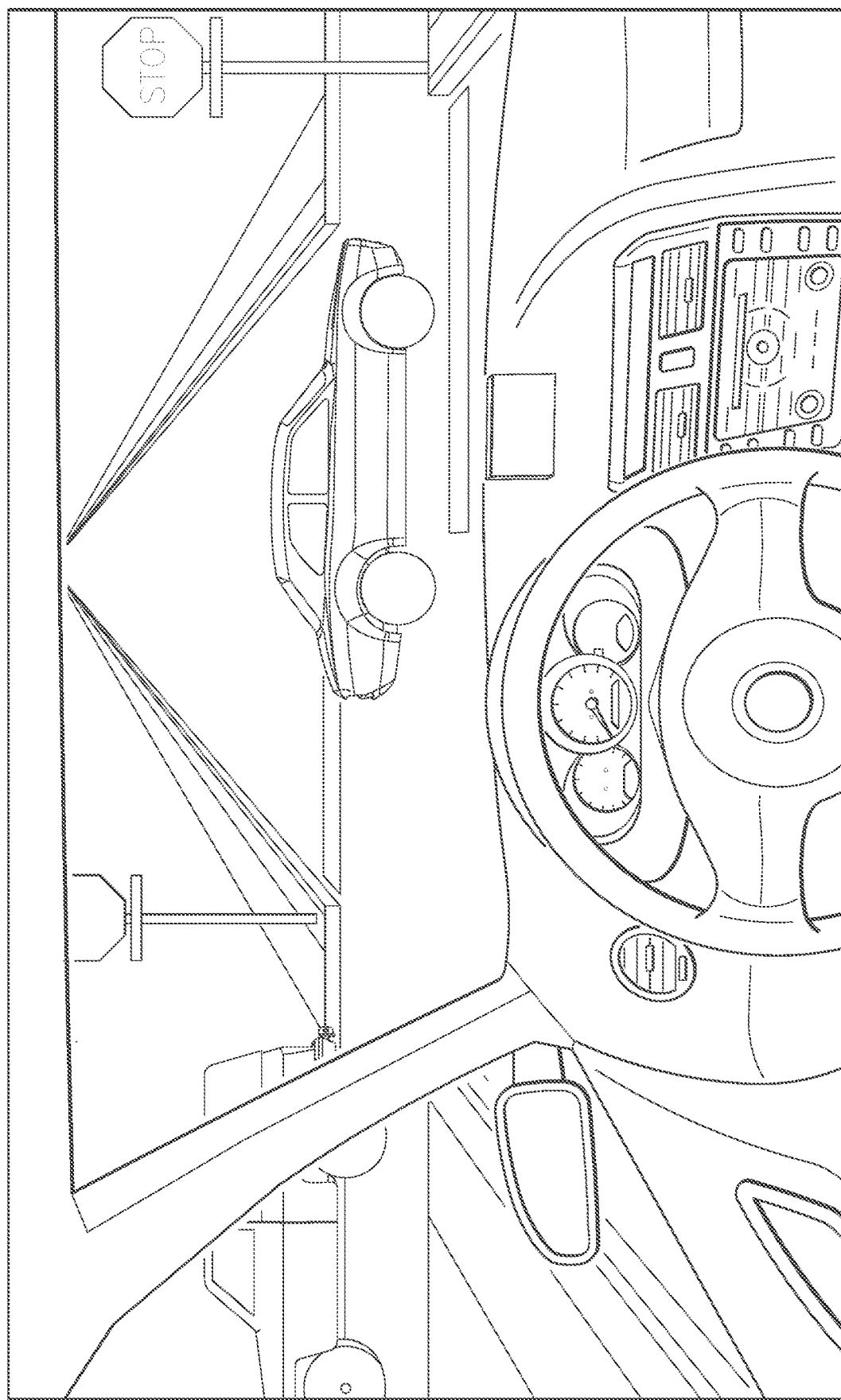
Figure 9F:
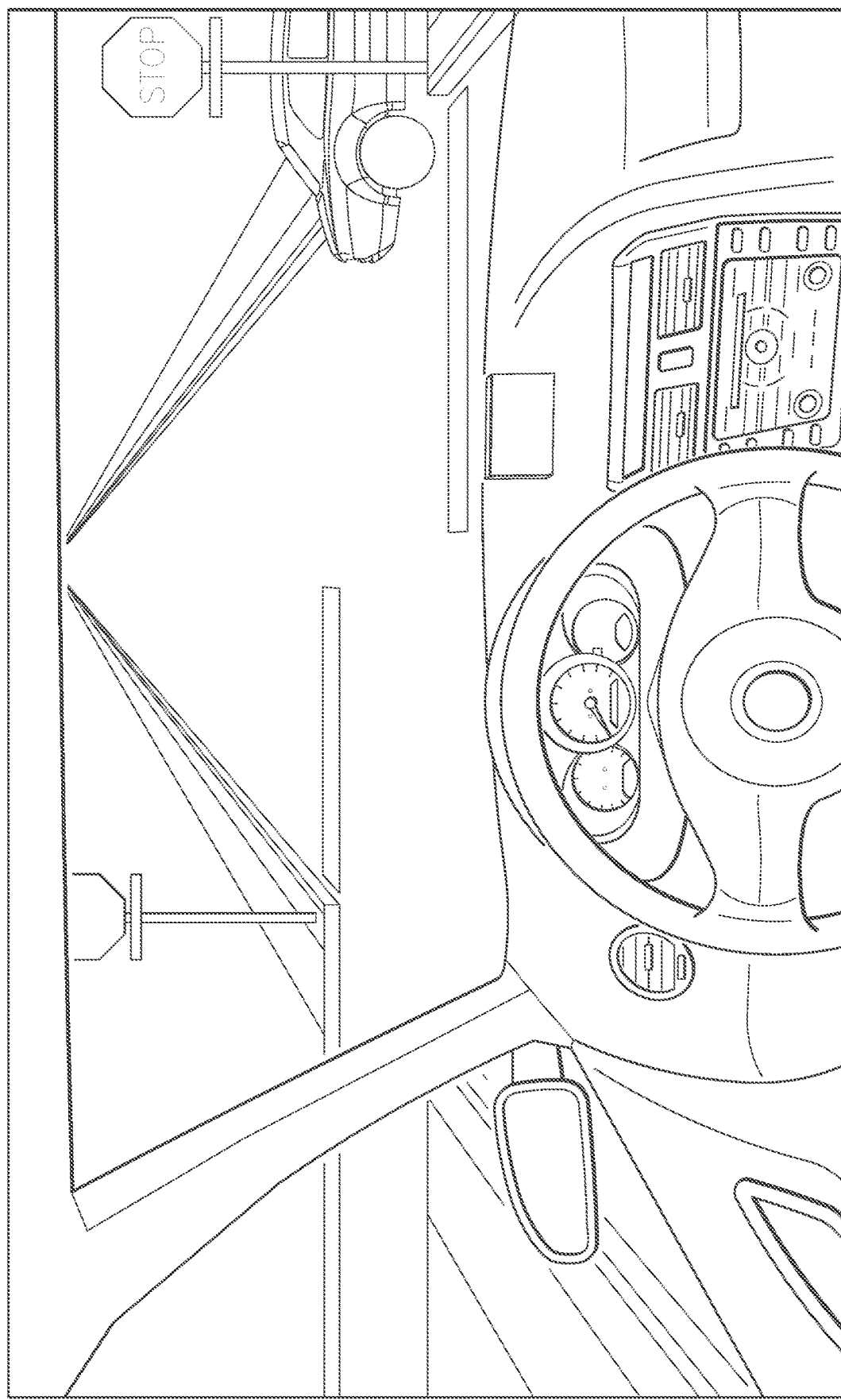
Figure 9G:
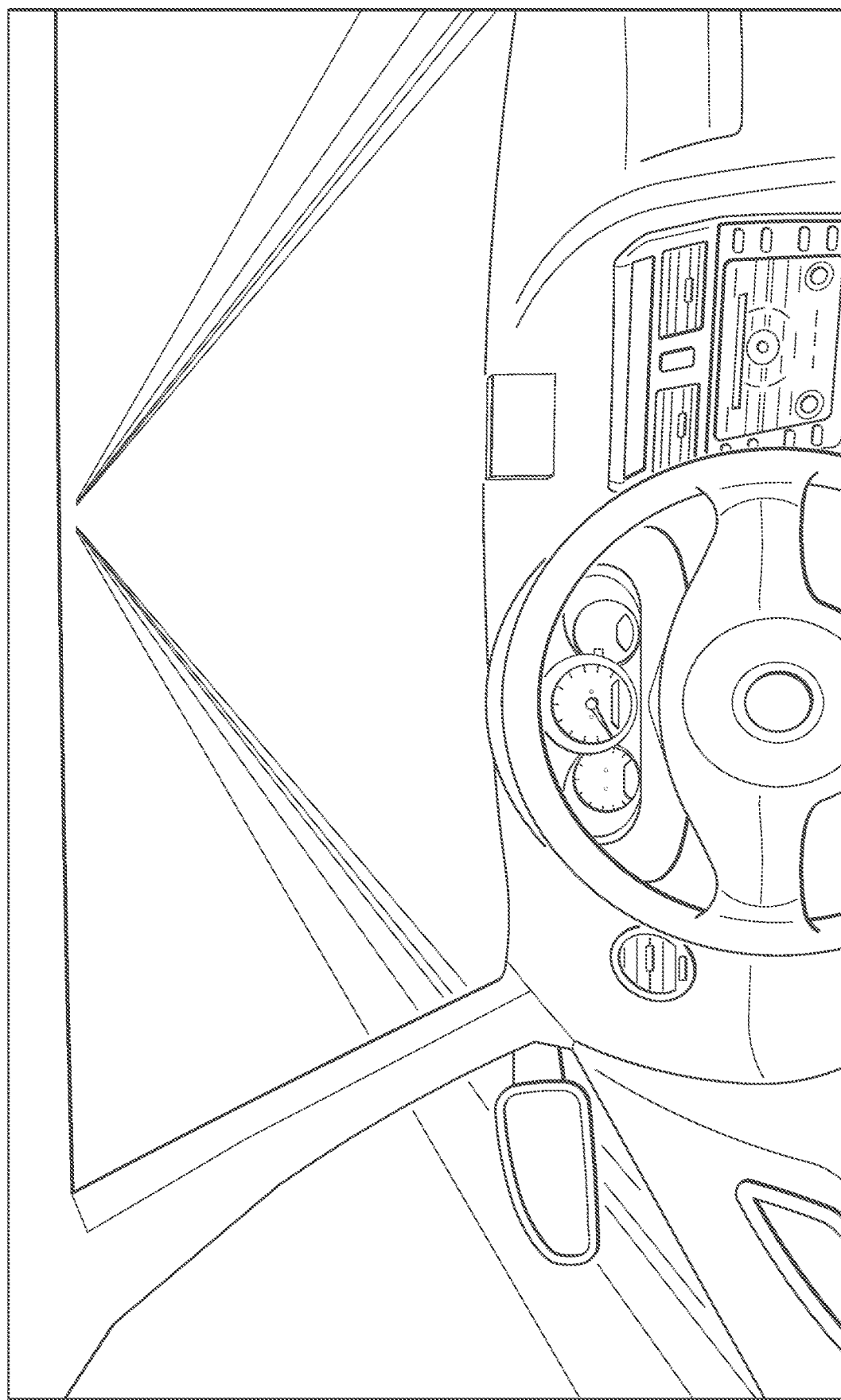

As shown in FIGS. 9A and 9B, a novice driver's vehicle approaches a four-way intersection controlled by STOP signs. Referring to FIG. 9C, two other vehicles arrive at the intersection before the novice driver's vehicle, one approaching from the right and the other approaching from the left. The novice driver's vehicle arrives last at the intersection. The 'up' arrow, meaning 'Proceed' becomes active and, when clicked by the novice driver, will move the novice driver vehicle forward. As shown in FIG. 9D, the other vehicle at the right first enters the intersection and crosses the intersection from right to left. As shown in FIG. 9E, the other vehicle at the left next enters the intersection and crosses the intersection from left to right. FIG. 9F shows that the novice driver's vehicle remains stopped at the STOP sign until the second of the other vehicles has cleared the intersection and departs toward the right. FIG. 9G shows the novice driver's vehicle entering the intersection and driving straight through it.

The novice driver should not click on the 'Proceed' button before the other vehicles have passed through the intersection. The novice driver will be 'successful' if the novice driver allows the other vehicles proceed through the intersection before clicking on the 'Proceed' (up arrow) button. The novice driver may also be 'rewarded' more for looking left, right, and left before proceeding into the intersection.

This hazard simulation module may be modified to include a third vehicle (OV3) approaching from the left side so as to appear if and only if the novice driver fails to look left a second time before proceeding through the intersection.

Figure 10:
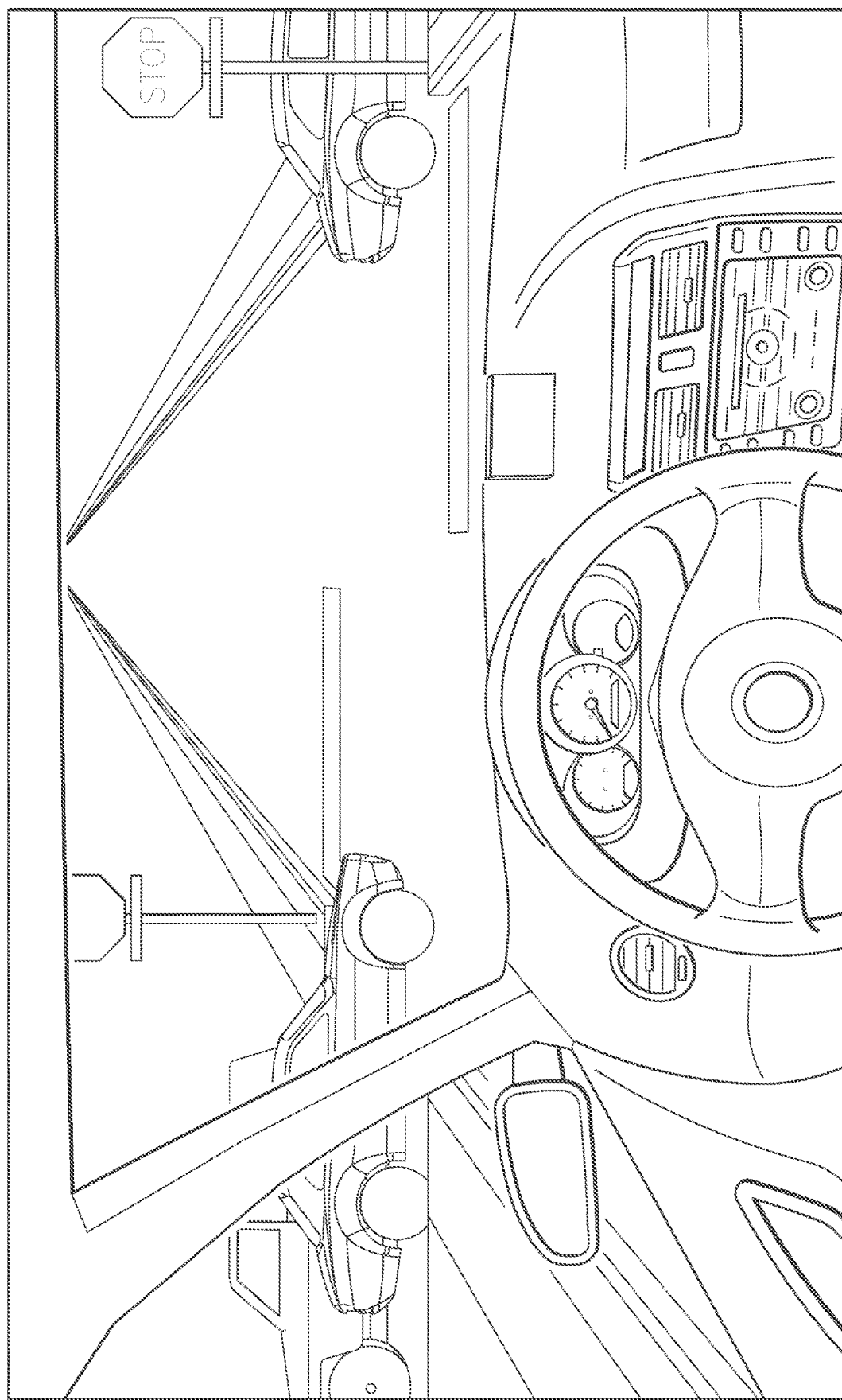
FIG. 10 illustrates a driving hazard module wherein a novice driver is trying to turn right from a position stopped at a stop sign onto a two-lane street busy with traffic.

FIG. 10 illustrates a hazard simulation module wherein novice driver will stop at two-way intersection controlled by two STOP signs, and allow traffic to pass, before proceeding. This module may be called a "gap acceptance" module. The objective is to teach a novice driver to look left, right and left before proceeding into the intersection. As shown in FIG. 10, the novice driver's vehicle will approach a two-way STOP controlled intersection with the intent to stop and then to turn right at the intersection. The cross-traffic from the left and right has no STOP signs and does not stop. After the novice driver vehicle comes to a complete stop, the 'Proceed' button becomes available.

After the novice driver's vehicle comes to a stop at the intersection, four other vehicles go through the intersection: three from the left and one from the right. The gap between the three vehicles arriving from the left may be between 3 and 5 seconds. The first vehicle from the left will arrive within a second of the arrival of the novice driver's vehicle arrival at the intersection. The second vehicle from the left may arrive three seconds after the first vehicle and the third vehicle may arrive five seconds after the second vehicle. A fourth vehicle may arrive from the left and will arrive at the intersection three seconds after the third vehicle. novice driver will be 'successful' if: (1) he waits until all vehicles have cleared the intersection; and (2) he will be 'rewarded' more if he looks left, right, left before proceeding. A message point for a tutorial portion may be to explain to the novice driver that before entering an intersection, he must make sure to look left, right—and left again before proceeding, such that it's important to look to the left a second time since in the direction that vehicles nearest to you could be approaching.

In alternative embodiments of this hazard simulation module, an infinite number of vehicles may approach from the left with gaps of either 3 or 6 seconds and the challenge is for the novice driver to choose a "correct" larger gap in which to proceed.

In a further alternative embodiment, a pedestrian may remain stationary near the STOP sign on the near right sidewalk. The pedestrian remains visible and stationary at the intersection near the STOP sign during the entire simulation module. A target box is active over the pedestrian during the entire simulation module. The pedestrian adds a challenge to the novice drive, because the novice driver must first check that the traffic lane is free of cars and second check that the pedestrian is not moving, before the novice driver may proceed into the intersection. In this embodiment, the novice driver will be "successful" if: (1) he waits until all vehicles have cleared the intersection; and (2) he will be 'rewarded' more if he looks left, right, left and clicks on the pedestrian before proceeding.

Figure 11A:
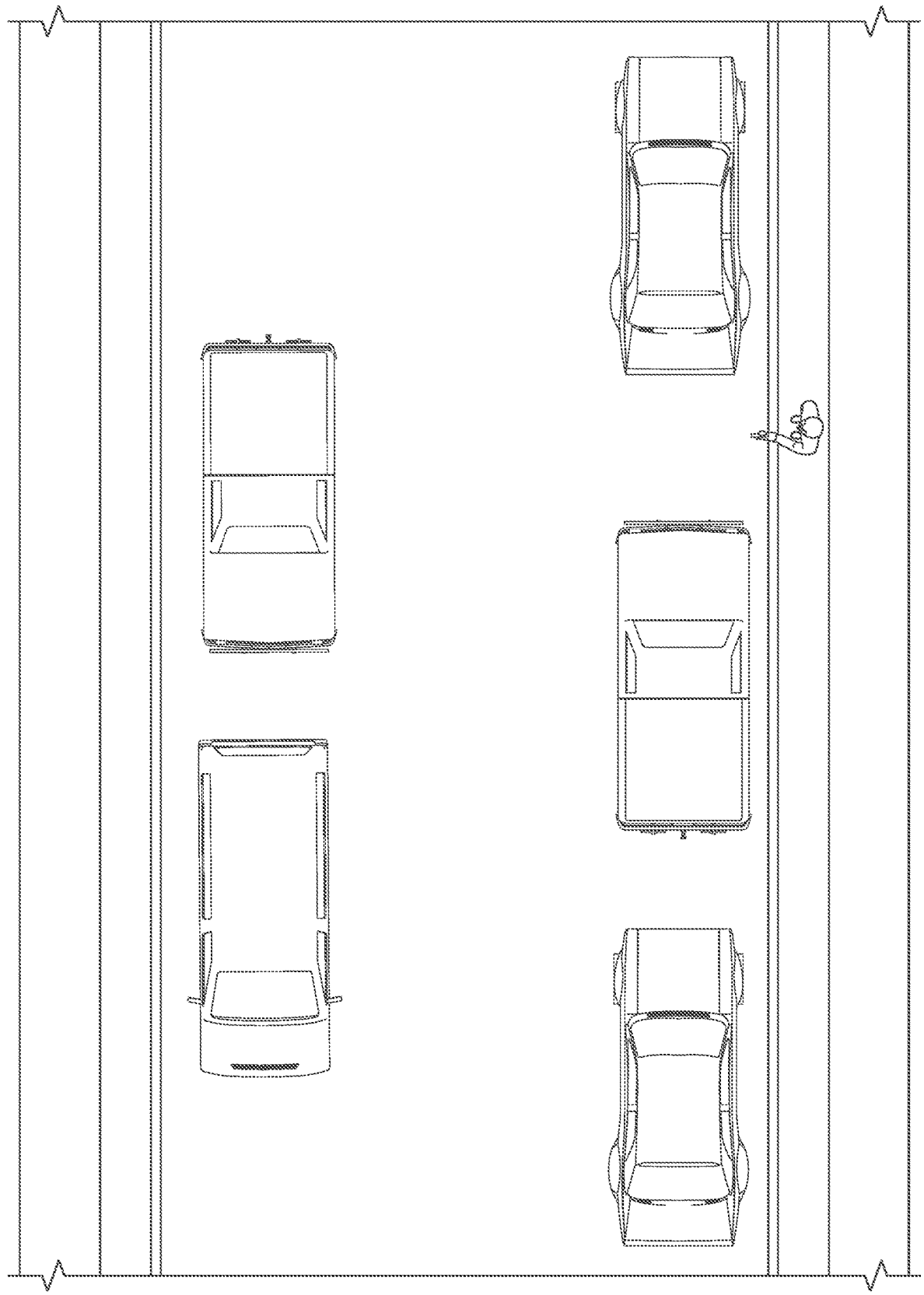
FIGS. 11A-11E illustrate a driving hazard module wherein a novice driver is faced with a ball and pedestrian.
Figure 11B:
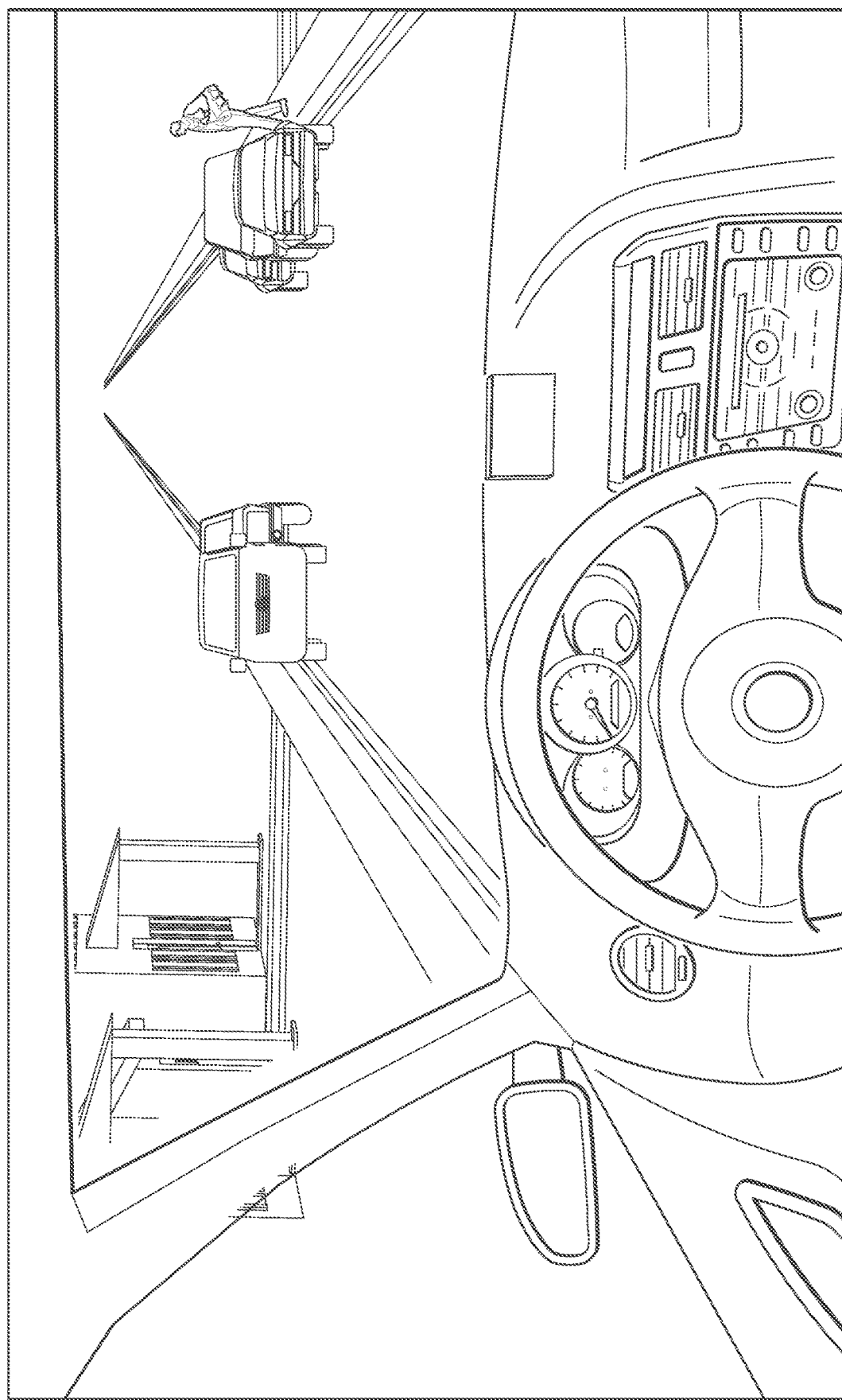
Figure 11C:
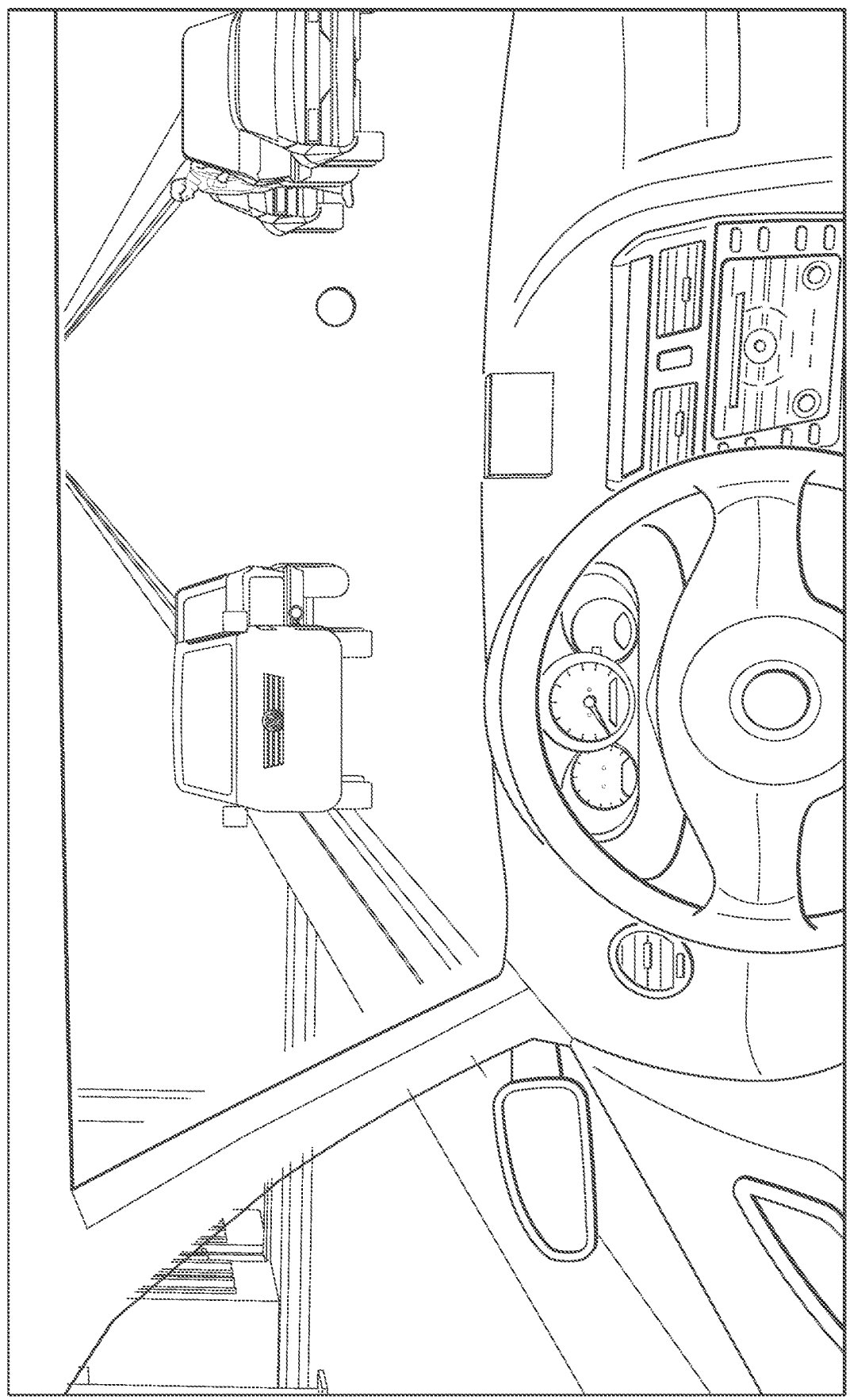
Figure 11D:
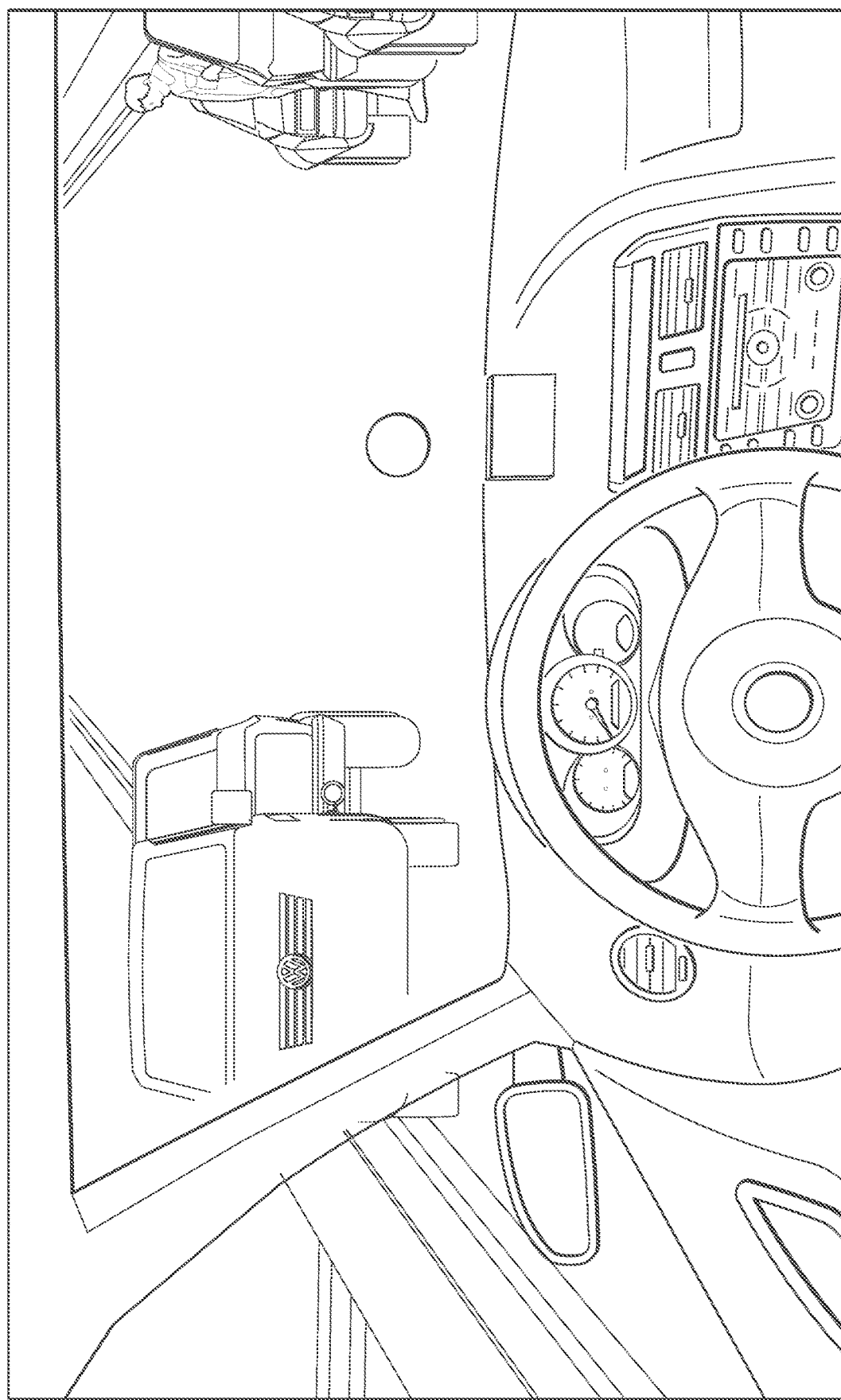
Figure 11E:
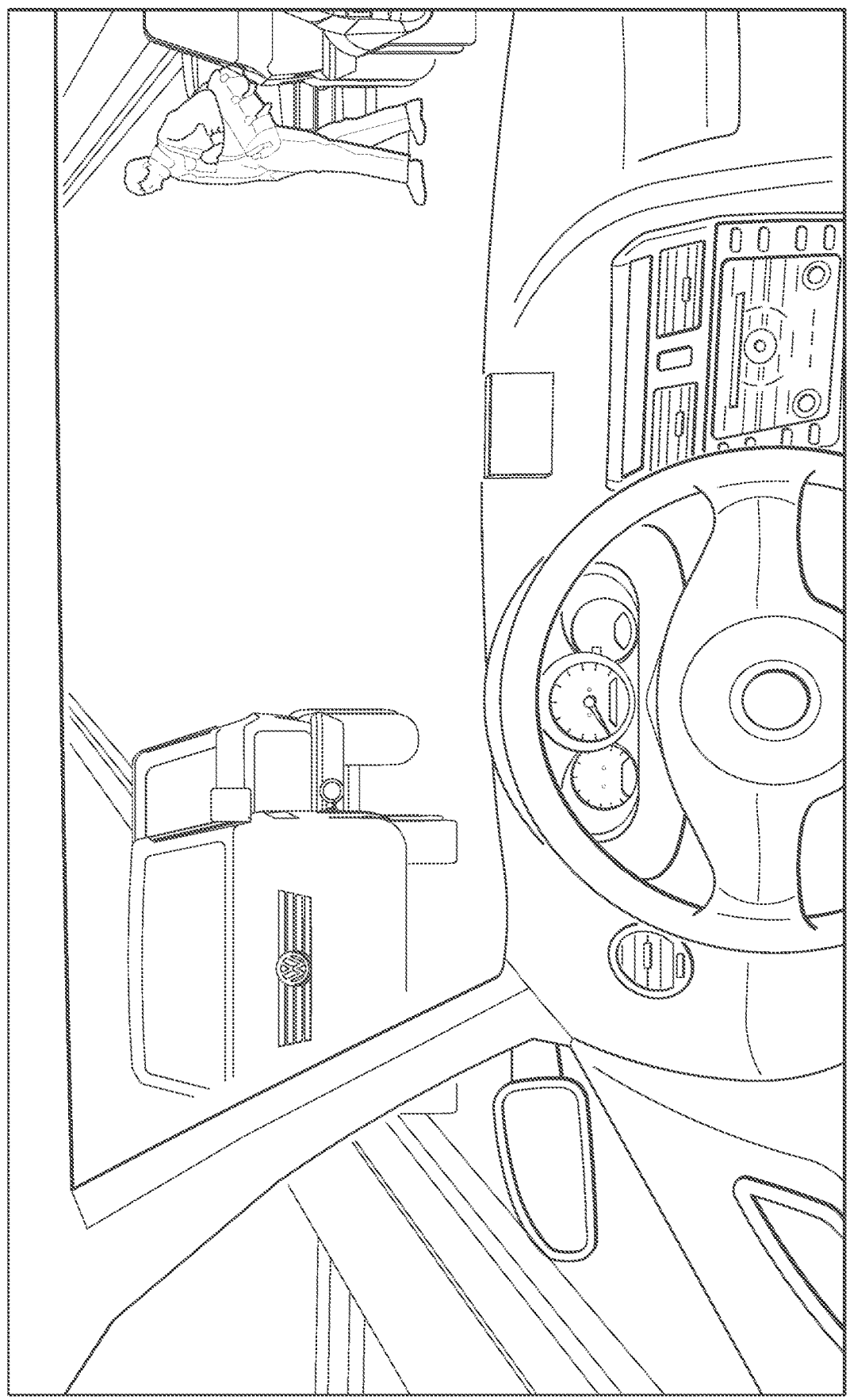

According to a hazard simulation module illustrated in FIGS. 11A-11E, a ball rolls/bounces from left to right across a traffic lane of a novice driver's vehicle. The objective of this module is for the novice driver to learn to recognize a possible hazard on the right side of the road in the direction from which the ball has appeared. In this module, the novice driver will be driving along a narrow street where vehicles are parallel-parked on both sides. A ball bounces out from between two cars on the right. As shown in FIG. 11A, cars are parked on both sides of the street as the novice driver's vehicle is driving down the street in the traffic lane past the parked cars. FIG. 11B shows how the parked vehicles at least partially block the novice driver's view of pedestrians on the sidewalks. Approximately 60 feet or two seconds before the novice driver passes the front of a particular vehicle on the right side of the street, as shown in FIG. 11C, a ball bounces out from in front of the particular vehicle. As shown in FIG. 11D, the novice driver's vehicle is adjacent the parked car from where the ball originated, the ball has bounced into the left lane, and a pedestrian is partially visible between the cars. A target box is between the cars where the ball originated. In FIG. 11E, as the novice driver vehicle passes the minivan, the pedestrian is more fully visible between the vehicles parked on the side of the road. The target box is at the pedestrian.

The novice driver will be 'successful' if she clicks in the space between the cars from where the ball came into the street. For a tutorial instruction to the novice driver, a message point could be made instructing the novice driver to be aware of the possibility of pedestrians appearing between parked cars, wherein one must not assume that everyone else can see one's vehicle. Of course, rather than a ball bouncing out from between the cars, it could be a cyclist or a skater.

FIGS. 12A-12F illustrate a novice driver driving straight through intersection. A vehicle approaching from the opposite direction turns left in front of novice driver into a side street; and a second other vehicle is turning from the side street into the traffic lane in front of the novice driver's vehicle. The learning objective of this hazard simulation module is to teach a novice driver that there may be multiple threats or hazards in the same situation and both are of equal importance to being a safer driver.

Figure 12A:
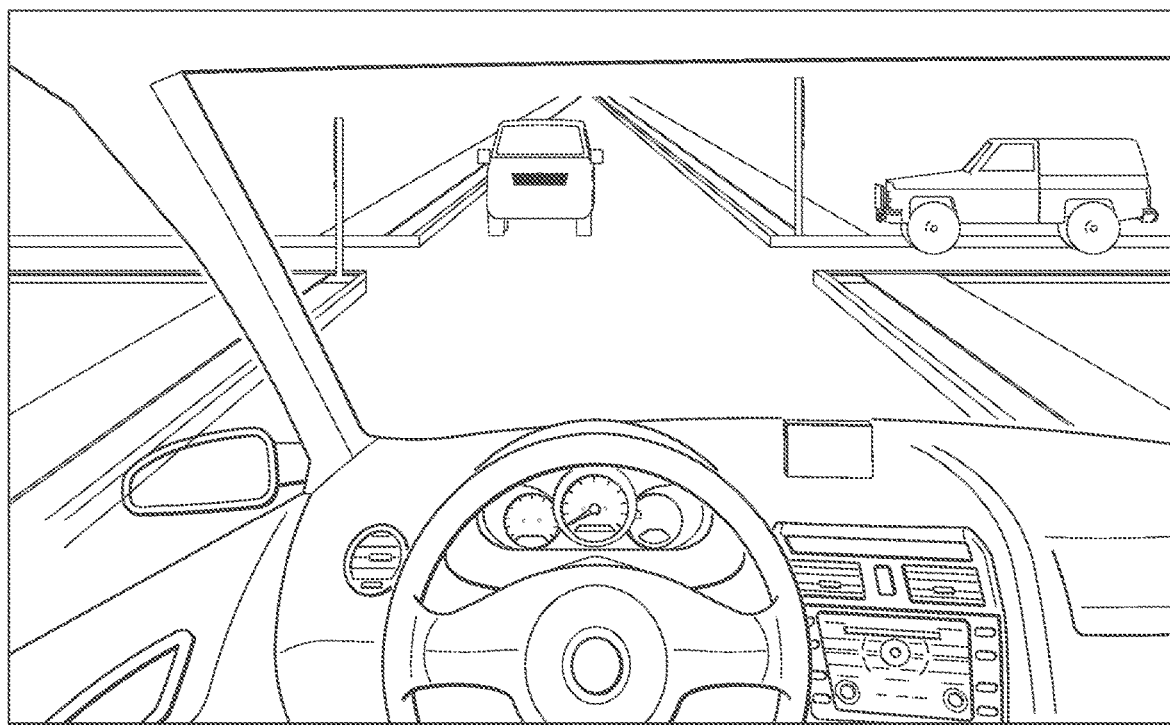
FIGS. 12A-12F illustrate a driving hazard module involving a 4-way intersection with only two stop signs, such that cross-traffic does not stop.
Figure 12B:
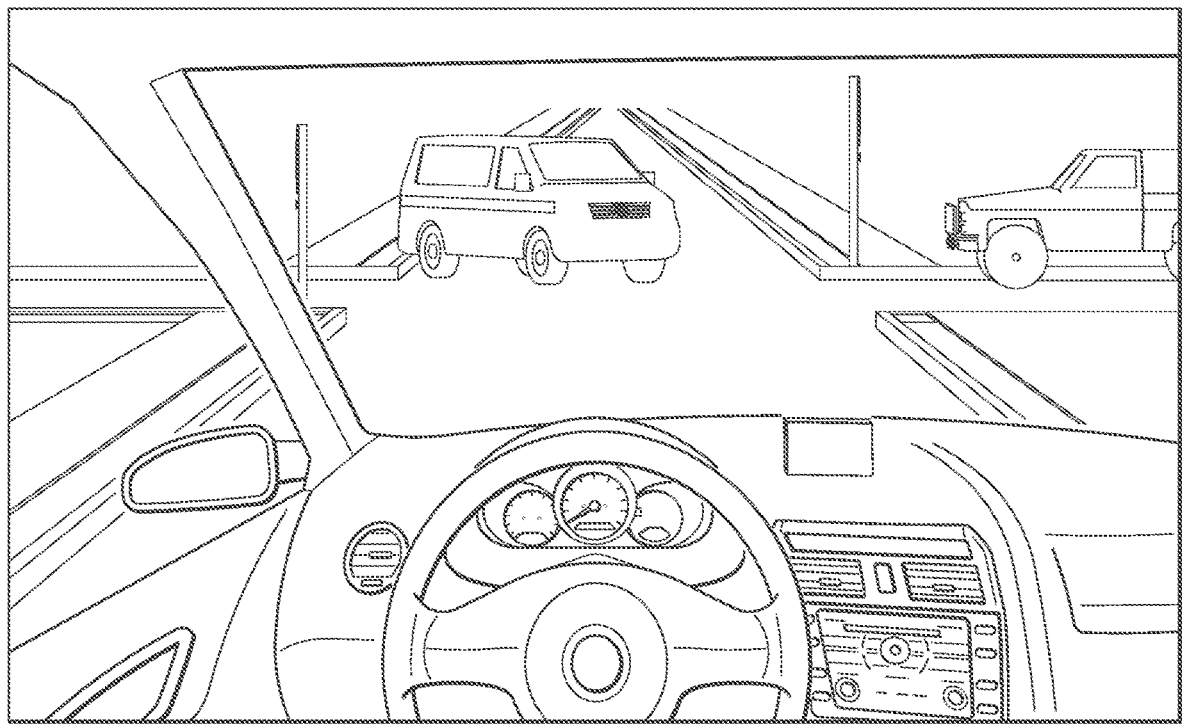
Figure 12C:
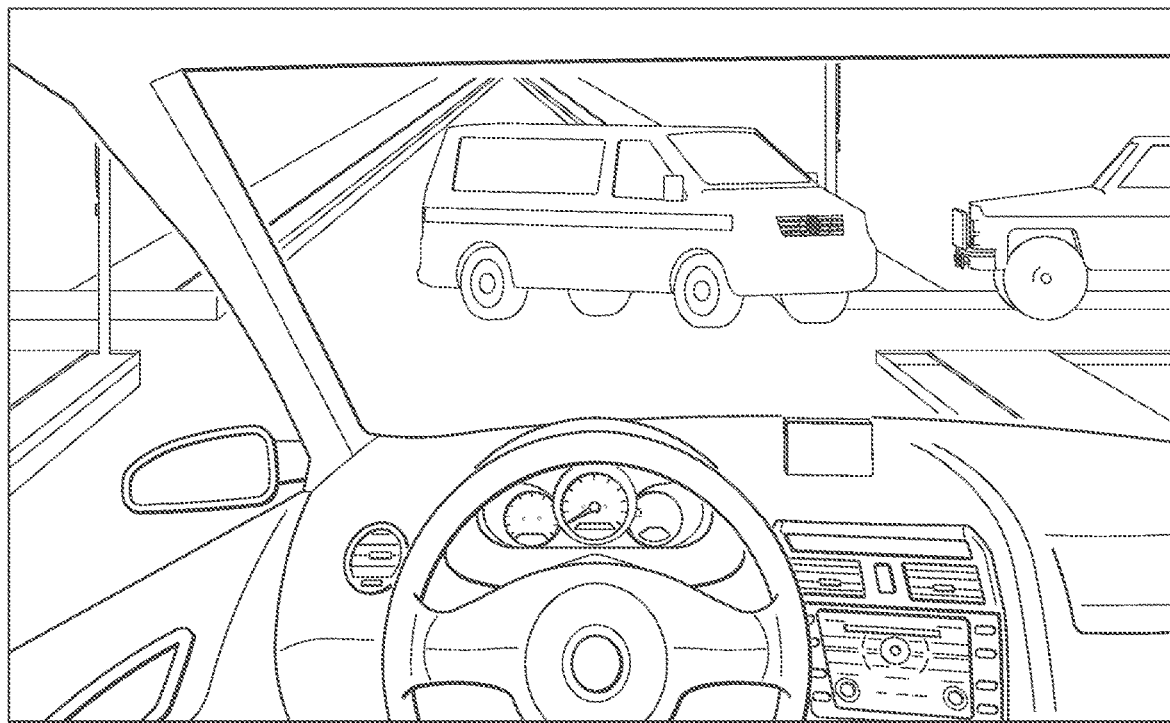
Figure 12D:
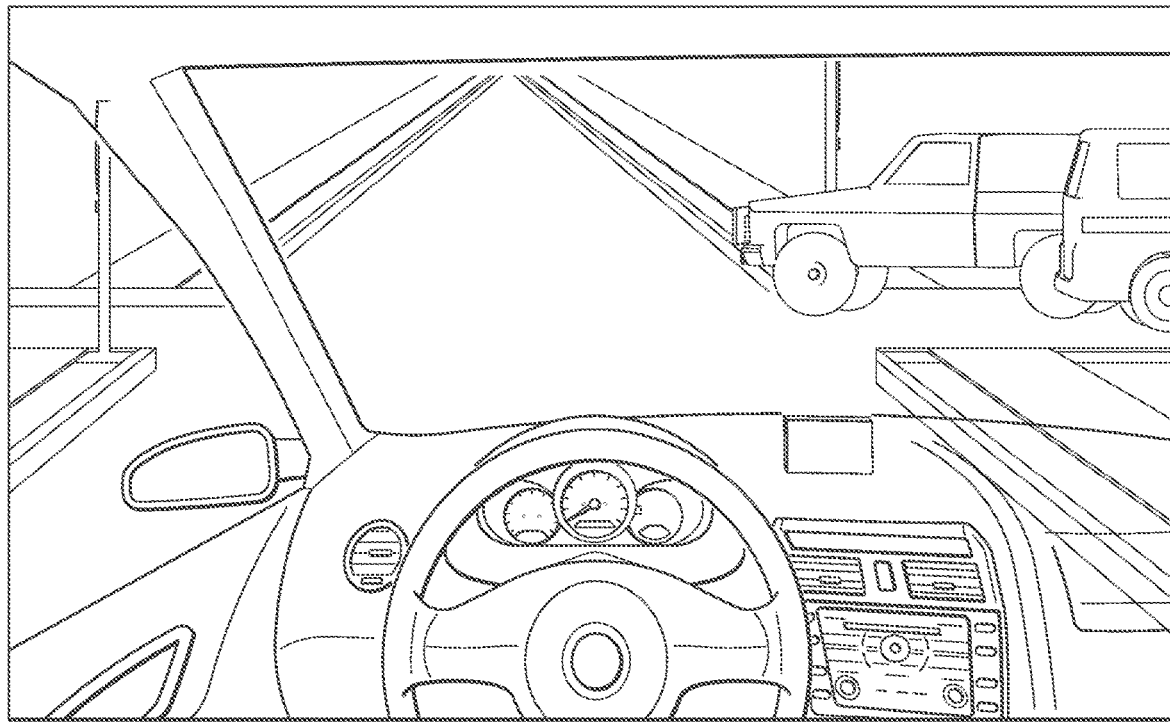
Figure 12E:
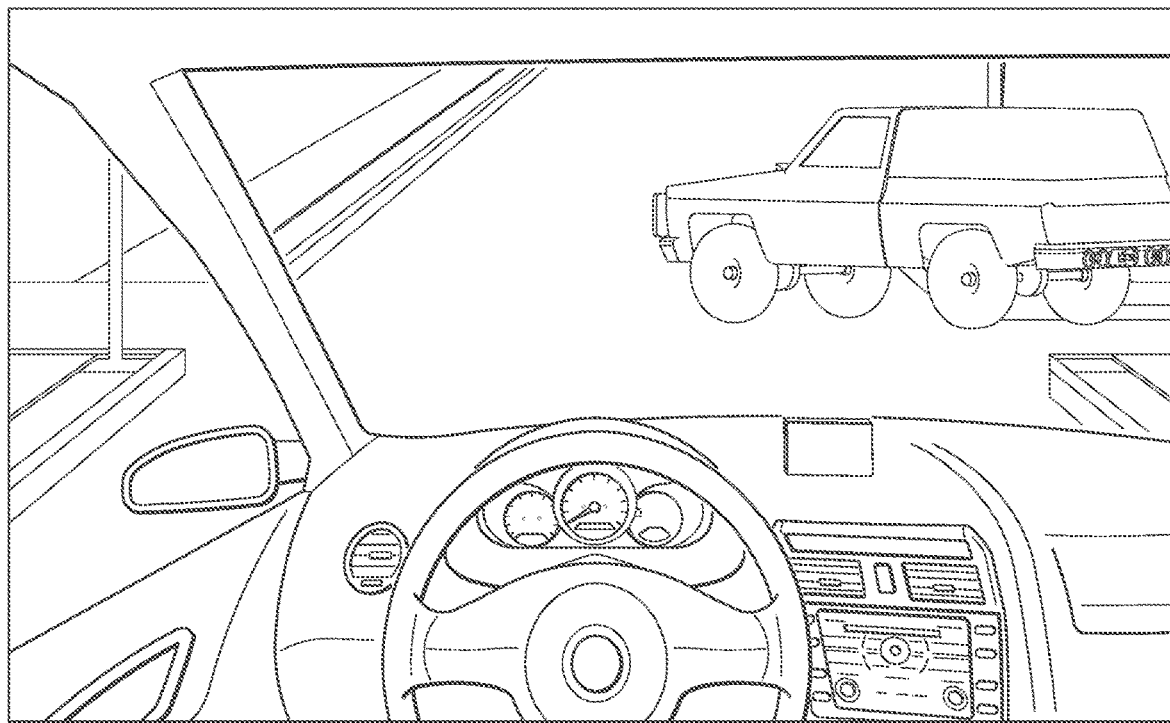
Figure 12F:
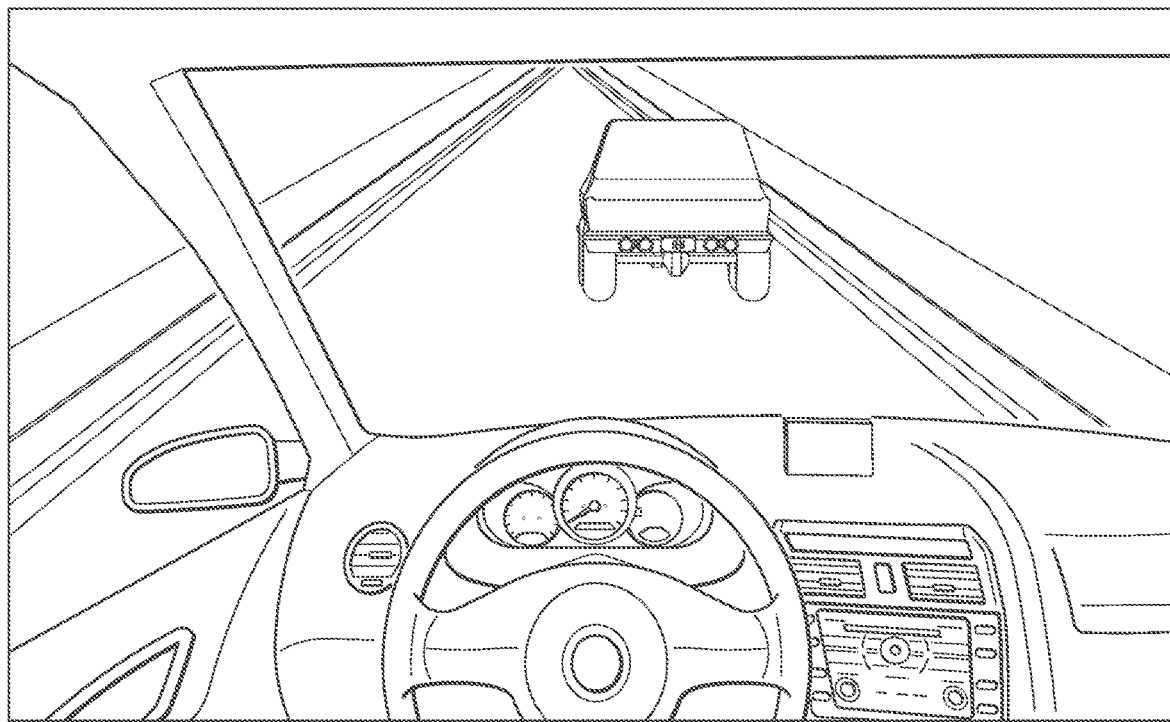

As shown in FIG. 12A, in this module, novice driver's vehicle approaches a four-way intersection, wherein STOP signs are posted at two opposite ways, and the cross-traffic on which the novice driver's vehicle is driving does not stop. FIG. 12A further illustrates a first other vehicle approaching from the opposite direction as that of the novice driver's vehicle and signaling a left-turn, while a second other vehicle is approaching the STOP sign on the right. FIG. 12B shows the first other vehicle turning left through the intersection in front of the novice driver's vehicle as the novice driver's vehicle continues to drive toward the intersection and the second other vehicle has stopped at the STOP sign on the right. FIG. 12C shows the first other vehicle turning left in front of the novice driver's vehicle as the novice driver's vehicle has nearly reached the intersection and the second other vehicle remains stopped at the STOP sign on the right. FIG. 12C further shows how the first other vehicle is about to pass through the direct line of sight between the second other vehicle and the novice driver's vehicle, so that there will be a brief period of time when the driver of the second other vehicle may not be able to see the novice driver's vehicle. As shown in FIG. 12D, the first other vehicle has completed its left turn through the intersection and is driving passed the second other vehicle, and the novice driver's vehicle has nearly slowed to a stop to allow the first other vehicle to make its left turn in front of the novice driver's vehicle. Importantly, the second other vehicle has begun to move away from it position at the STOP sign at the right and is beginning to make a right-hand turn into the traffic lane directly in front of the novice driver's vehicle. Presumably, the driver of the second vehicle was unable to see the novice driver's vehicle advancing toward the intersection because the view was momentarily blocked by the passing first other vehicle. As shown in FIG. 12E, the second other vehicle makes a right-hand turn through the intersection immediately in front of the novice driver's vehicle, which is driving straight through the intersection behind the second other vehicle. FIG. 12F shows the second other vehicle accelerating away from the intersection with the novice driver's vehicle immediately behind.

Novice driver will be 'successful' if the novice driver clicks on both other vehicles before crossing the intersection. This module may be modified, for example, such that after turning right in front of the ND, the second vehicle stops to wait for a pedestrian to cross a driveway before turning left into that driveway. Another modification may be, for a commercial environment, a third vehicle blocks the view of second vehicle to the novice driver vehicle.

While the hazard simulation modules illustrated in FIGS. 1A-12F are shown as still photographs, embodiments of the invention may implement animation, 3D animation, or actual video footage for viewing by the novice driver.

Figure 13B:
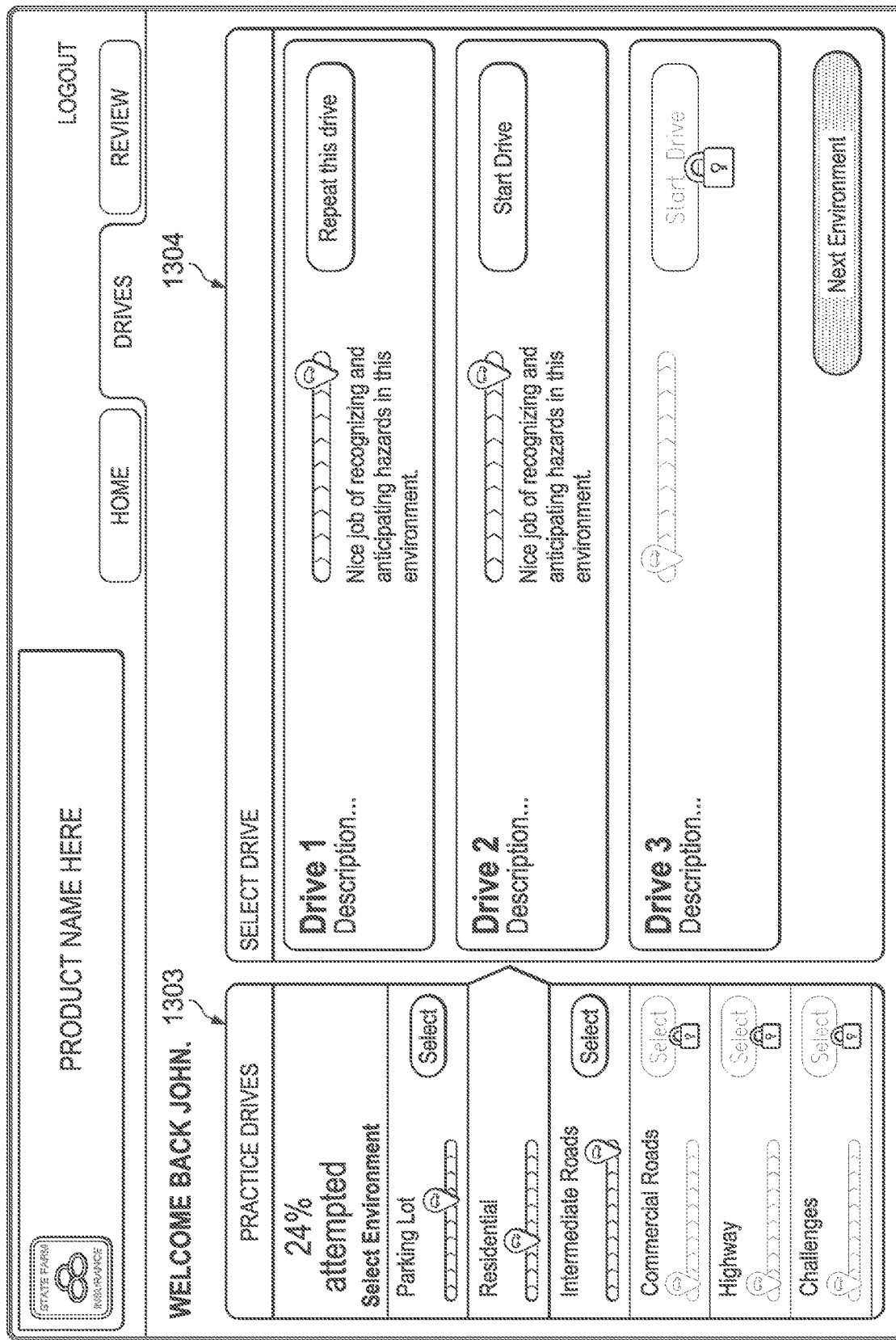
FIG. 13B is an example of a drive page for a web site through which a novice driver would be invited to review practice drives or select a drive.
Figure 13C:
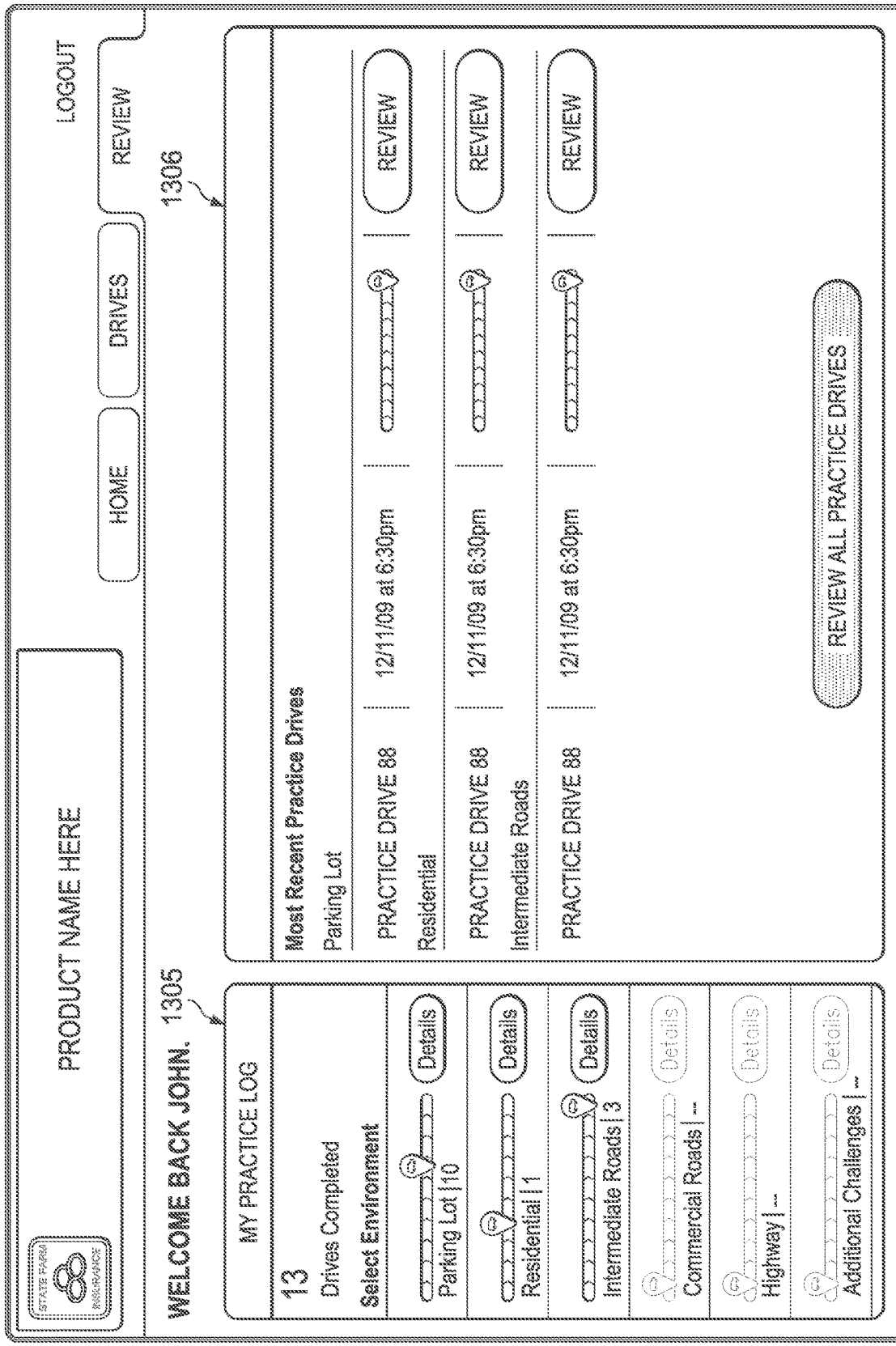
FIG. 13C is an example of a drive page for a web site through which a novice driver would be invited to review practice drives.

FIGS. 13A-13C illustrate a graphic user interface according to one embodiment of the invention. In FIG. 13A, a "Home" page is illustrated which provides a summary pane and a question pane asking the novice drive what the driver would like to do. The summary pane 1301 provides a total number of practice drives. The summary pane 1301 further provides radiance and practice drives wherein parking lot, residential, and intermediate roads. Practice drives are indicated as having been completed. The summary pane 1301, as illustrated, further provides radiance for commercial roads, highway, and additional challenges, wherein none of these practice drives are indicated as having been completed. FIG. 13A further illustrates an inquiry pane 1302 which asks the novice driver what the drive would like to do. In particular, the driver is asked whether he would like to do start a practice drive, or review past drives. Further options are provided when a novice driver may view instructions or change settings.

FIG. 13B illustrates a window under a "Drives" tab. This window provides a practice drive pane 1303 and select drive pane 1304. In the practice drives pane 1303, a total percentage is provided for the percent of drives attempted by the novice driver. The practice drive pane 1303 further provides icons for the novice driver to select particular driving environments including: parking lot, residential, intermediate roads, commercial roads, highway, and challenges. As illustrated in FIG. 13B, the residential practice drives have been selected. The select drive pane 1304 as illustrated, provides information about the residential practice drives. In this case, the novice driver has completed two drives and has yet to complete a third drive. In each of the first two drives, the novice driver had done a nice job of recognizing and anticipating hazards in this environment. The novice driver is presented icons which allow the novice driver to repeat the drive, or start a new drive. A further icon is provided which allows the novice driver to select the next environment.

FIG. 13C illustrates a window under the "Review" tab. This review window contains a practice log pane 1305 and a history pane 1306. In the illustrated practice log pane 1305, it is indicated that 13 drives have been completed, wherein ten parking lot practices drives, one residential practice drive, and three intermediate practice drives are indicated as having been started. The practice log pane 1305 further indicates that no commercial road drives, highway drives, or additional challenge drives have been started. The history pane 1306 provides information regarding selected environments from the practice log pane 1305. Alternatively, the history pane 1306 may provide most recent practice drive information. Still further, the history pane 1306 may comprise a review all practice drives icon which, when selected, provides information about all practice drives. The history pane 1306 may provide the name of the practice drive, the environment in which the practice drive had been made, the time at which the practice drive was completed, and an indication of the score received which is reflective of the novice driver's competence in identifying hazards.

Figure 14B:
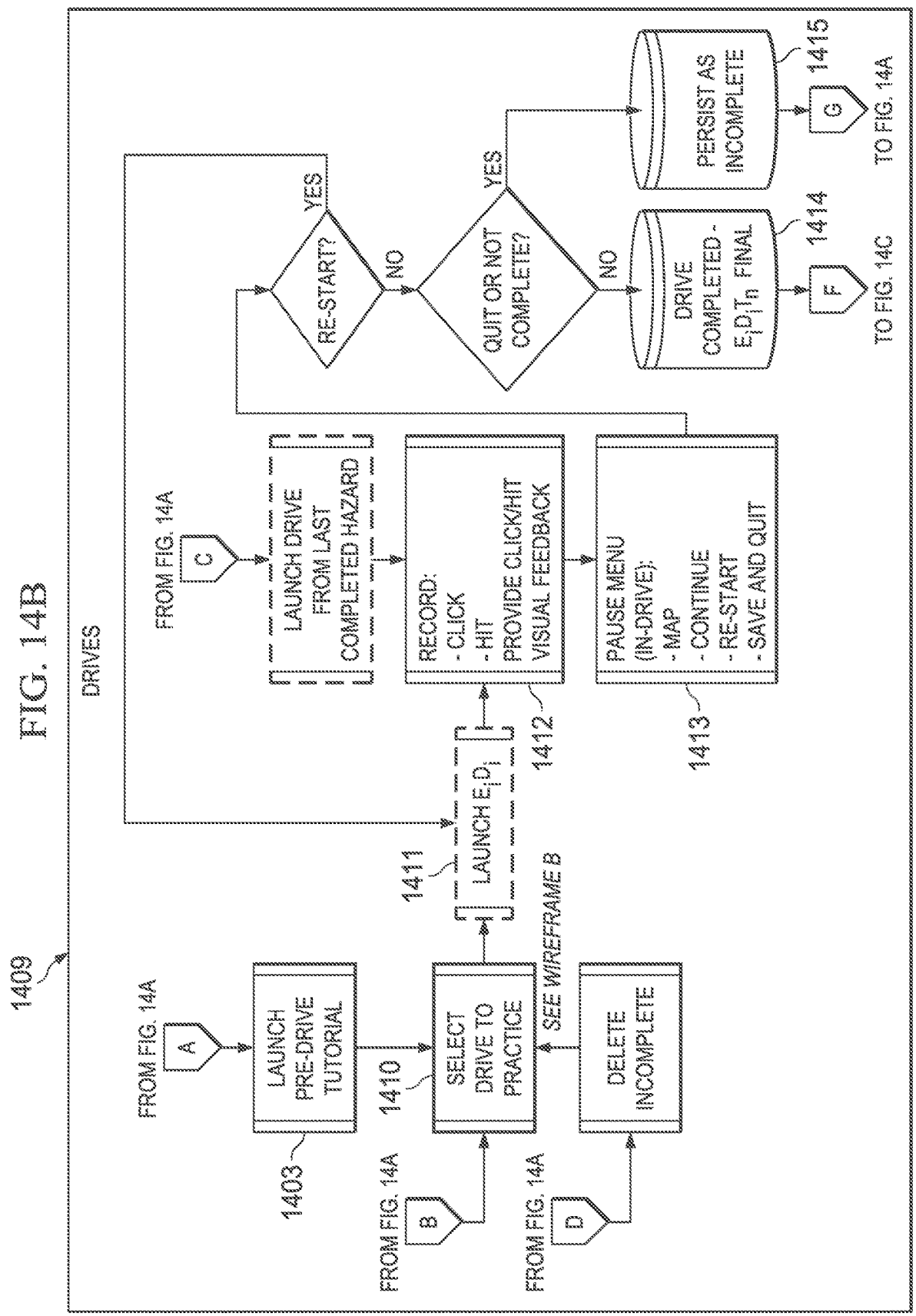
Figure 14C:
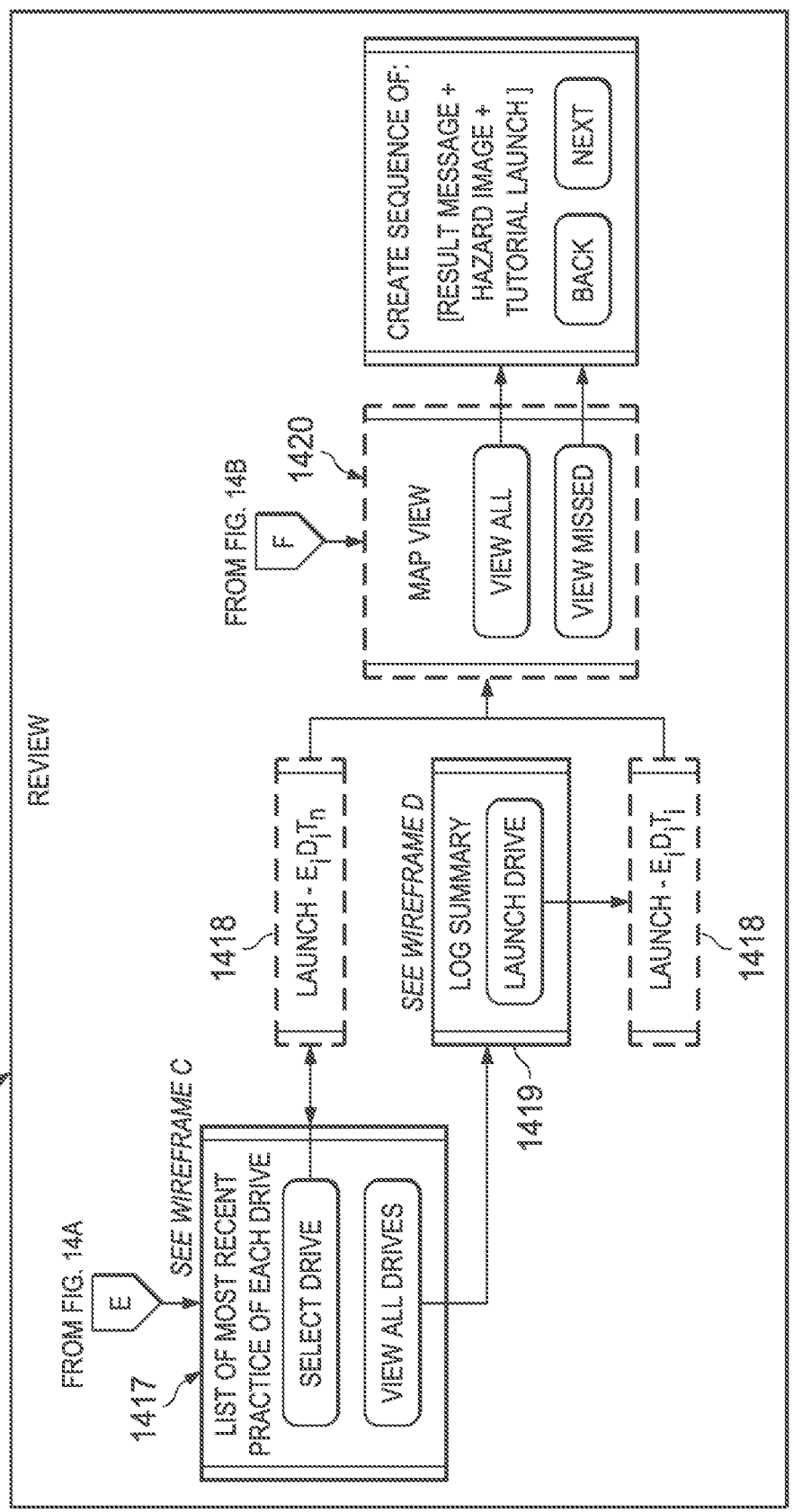

FIGS. 14A-14C provide a flow-chart, which illustrates an embodiment of the invention for navigating the various windows of the graphic-user interface. Process begins by launching the application from the State Farm Teen Driver website (TDS 1301). The novice driver is then questioned about whether he has watched the introductory video at 1402. If not, the introductory video is launched at 1403. After the introductory video is complete, the home window 1404 is launched. If the novice driver had already watched the introductory video, the home window 1404 would be launched without launching the video. The home window 1404 provides the following options: choose tutorial 1405, Road Aware home 1406, and message 1407. Under the choose tutorial option 1405, there is provided icons for introductory video and pre-drive tutorial. If the novice driver selects the introductory video icon within the choose tutorial 1405, then the introductory video would be launched 1403. If the novice driver selects the pre-drive tutorial icon then the pre-drive tutorial would be launched 1408. After either the launch of the introductory video 1403 or the launch of the pre-drive tutorial 1408, control is returned to the Road Aware home 1406. Within the Road Aware home 1406, icons are provided for: let's practice, review past practice, view instructions, and settings. If "let's practice" is selected, the novice driver is asked whether he has watched the pre-drive tutorial. If not, the pre-drive tutorial is launched 1403. If the novice driver has watched the pre-drive tutorial, then the novice driver is asked if there is an incomplete drive. If there is an incomplete drive, then control goes to the message option 1407 wherein the novice driver is given opportunity to continue a drive or do a drive over.

The flow-chart diagram of FIGS. 14A-14C further comprises a drive module 1409 corresponding to the drive tab of the graphic-user interface. The novice driver is given an option to select a drive to practice 1410. Once the driver has selected a drive to practice, a practice driver within an environment ($E_iD_i$) is launched 1411. During the $E_iD_i$ practice drive, a record 1412 is made of the clicks and hits so as to provide a quick/hit visual feedback. During the launched $E_iD_i$ practice drive, the novice driver may also select a pause menu 1413. In the pause menu, the novice driver may select map, continue, restart, or save and quit. After the launched $E_iD_i$ practice drive is completed, the novice driver is given opportunity to restart the practice drive. If yes, the program goes back to launch $E_iD_i$ practice drive 1411. If not, a determination is made as to whether the practice drive has been prematurely quit or is not complete. If the answer to that inquiry is "no," then the drive is identified as complete as $E_iD_iT_n$ final drive. If the answer is "yes" that the drive has not been completed, then the incomplete drive persists and is saved as an incomplete drive. Completed drives are saved at 1414 and incomplete drives are saved at 1415.

A review module 1416 is also illustrated which corresponds to the review module of FIG. 13C. The review module 1416 provides a list 1417 of the most recent practice of each drive. From this list 1417, the novice may select a drive or view all drives. If the user selects a drive, then an $E_iD_iT_n$ practice drive is launched for a 1418. If novice driver has selected all drives then a log summary 1419 will be displayed. From the log summary 1419, the novice driver may also launch an $E_iD_iT_n$ practice driver 1418. From within the review module 1416, the novice driver may select map view 1420. The map view 1420 may be a view all or a view missed option selection relative to the hazards on the maps. Finally, within the review module 1416, the novice driver may create a sequence 1421 of result message plus hazard image plus tutorial launch. From within the sequences created 1421, the novice driver may go backward and forward within the sequence.

Figure 15A:
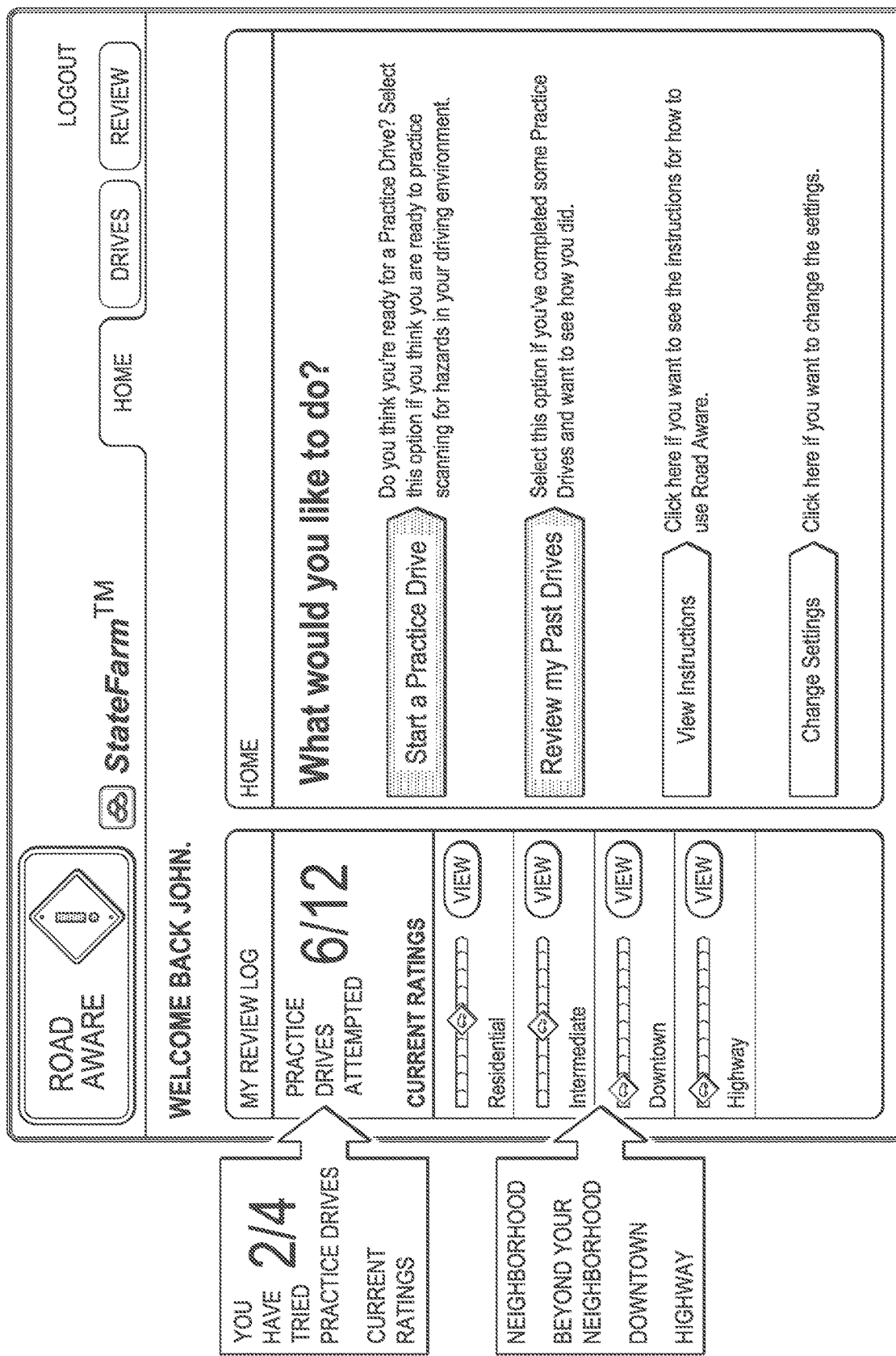
FIG. 15A illustrates a further example of a home page for a web site through which a novice driver would be invited to start a practice driver or review past drives.

FIGS. 15A-15F illustrate an alternative embodiment of a graphic user interface. FIG. 15A a home page, FIGS. 15B-15E illustrate drive pages under a drive tab and FIG. 15F illustrates a review page under a review tab.

The home page illustrated at FIG. 15A provides a review log pane 1501 and a home pane 1502. The review log pane 1501 provides a number of practice drives attempted, in this case, six of 12. The review log pane 1501 further provides information regarding current ratings for different drive environment, including: residential, intermediate, downtown, and highway. Alternatively, the pane of practice drive may be included in the system, for example it could indicate two of four practice drives have been attempted. Further, any variety of environments may be provided under the current ratings, in particular, neighborhood, beyond your neighborhood, downtown, and highway. In the review log pane 1501, the current ratings may be indicated by a sliding scale which shows number of practice drives completed and/or the scores obtained for each practice drive for an average score of practice drives. Further the review log pane 1501 may include icons which a novice drive may use to select or view individual practice drives. The home pane 1502 allows a novice driver to indicate what he would like to do. In particular, a novice driver may indicate if he would like to start a practice drive, review pass drives, view instructions or change settings. If the novice driver wants to select a practice drive or start a practice drive, the novice driver may select this option if he is ready to practice scanning for hazards in a driving environment. If the user is ready to review past drives, he may select this option if he has completed some practice drives and wants to see how he did.

View instructions may be selected if the novice driver wants to see the instructions on how to use the Road Aware training program. The novice drive may also select "change settings" if he wants to change the settings.

As illustrated in 15B, the drive tab provides a drive window wherein two panes are shown: a practice drives pane 1503 and a select drive pane 1504. The practice drives pane 1503 again provides a number of practice drives attempted, in this case, six of 12. The practice drives pane 1503 also contains a list of environments which the novice driver may select, including: neighborhood, beyond your neighborhood, downtown, and highway. These environments may also contain a sliding scale which shows a number of drives completed, a score for individual drives, or an average score for all drives completed for the particular environment. In the situation illustrated in FIG. 15B, the practice drives pane 1503 has the neighborhood environment selected.

Figure 15B:
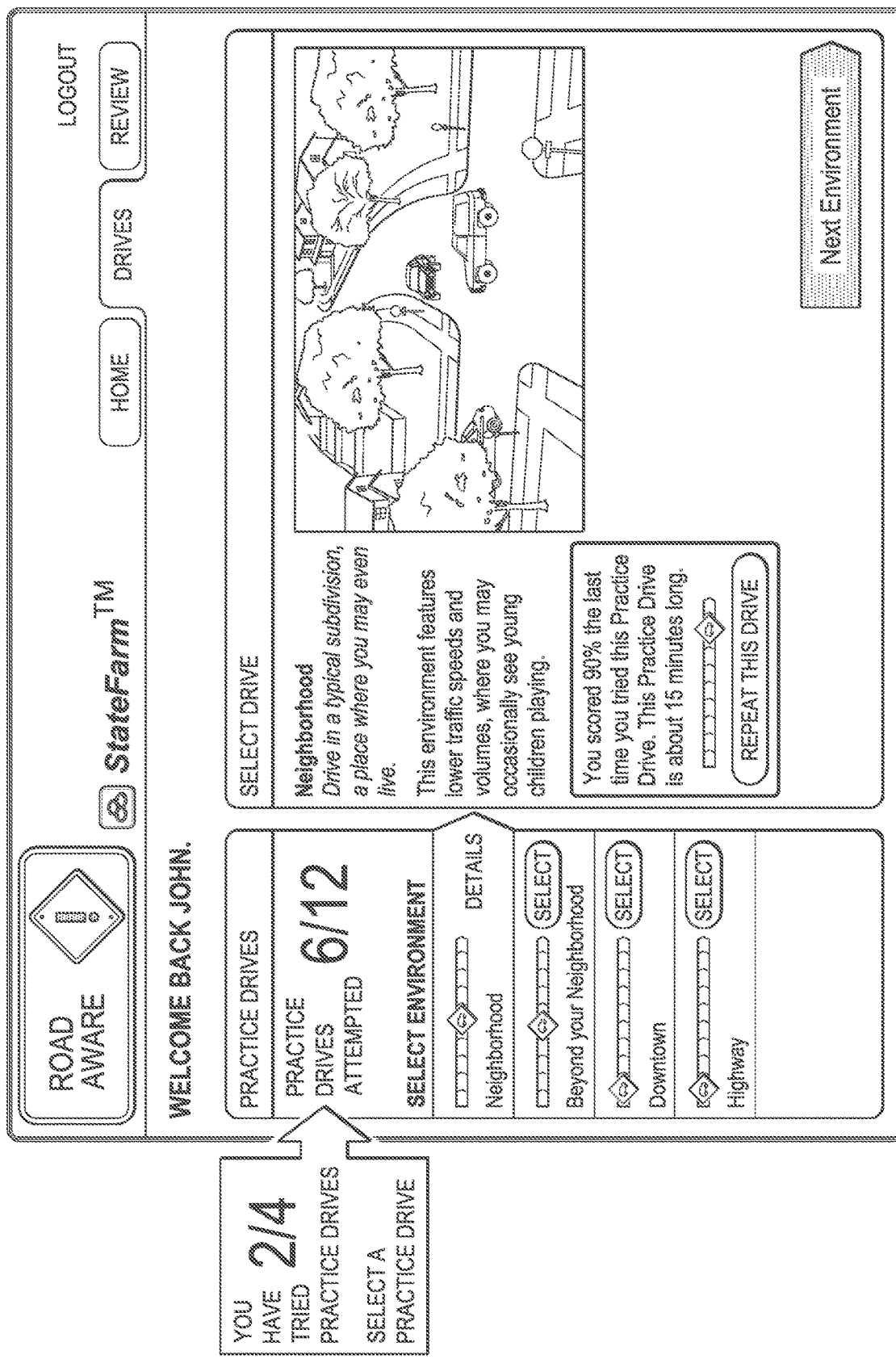
FIG. 15B is an example of a drives page for a web site through which a novice driver would be invited to review practice drives or select a drive, wherein a "Neighborhood" drive is selected.

FIG. 15B also illustrates a select drive pane 1504. In the illustrated situation, a neighborhood environment has been selected for the select drive pane 1504. The select pane 1504 contains information about the environment, in written form and pictorial form. The pane further comprises an icon wherein the novice driver may repeat the drive. The select drive pane 1504 further comprises an icon for the novice driver to select a next environment. In FIG. 15B, the select drive pane 1504 is of a neighborhood environment where the environment features lower traffic speeds and volume, where the novice driver may occasionally see young children playing.

Figure 15C:
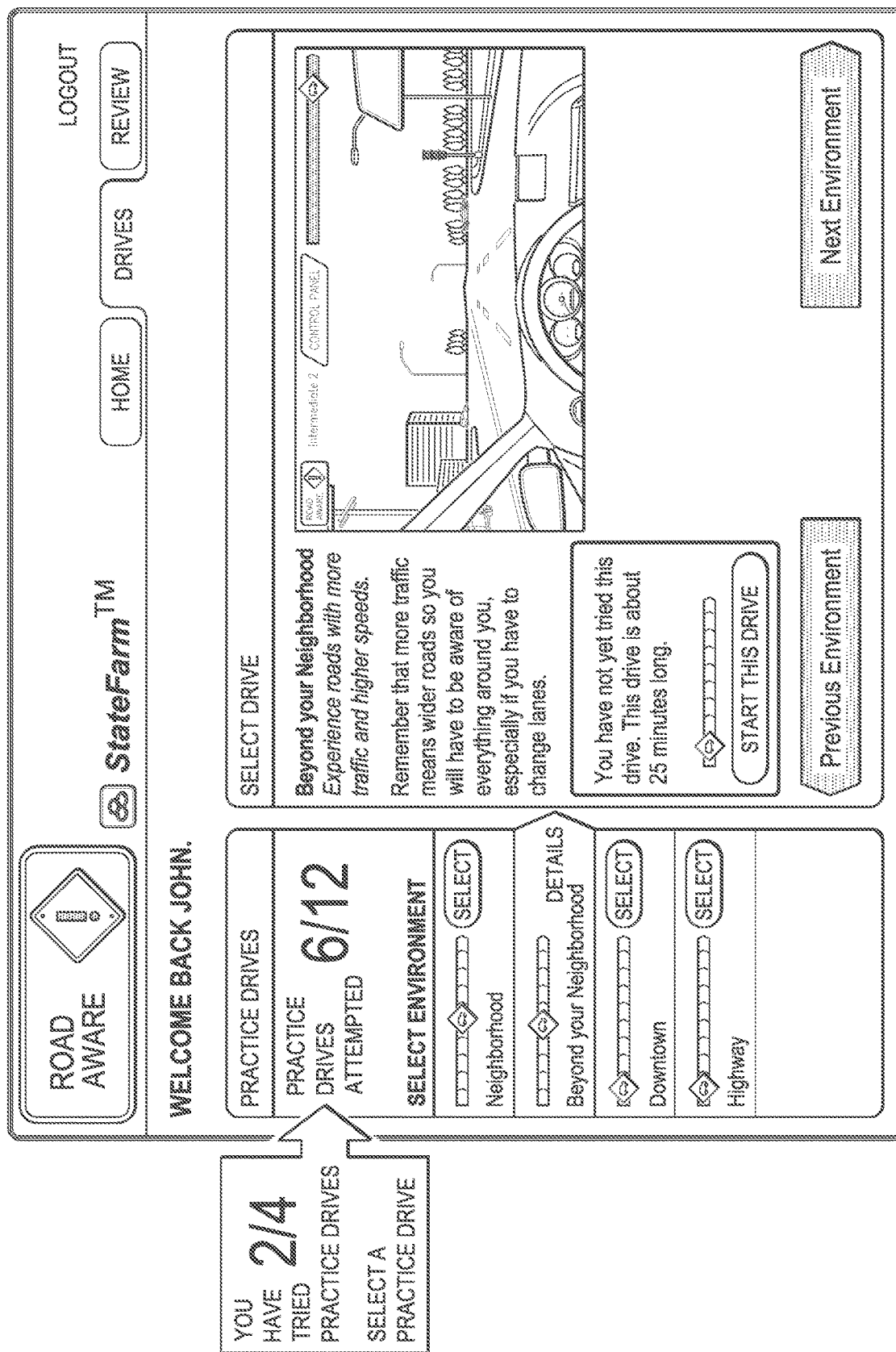
FIG. 15C is an example of a drives page for a web site through which a novice driver would be invited to review practice drives or select a drive, wherein a "Beyond Your Neighborhood" drive is selected.

In FIG. 15C, a practice drives pane 1503 is shown wherein a "beyond your neighborhood" environment is selected. A select drive pane 1504 is also shown, wherein the selected environment is "beyond your neighborhood." In the beyond your neighborhood environment, a novice driver may experience roads with more traffic and higher speeds. In this environment, the roads are relatively wider with multiple lanes.

Figure 15D:
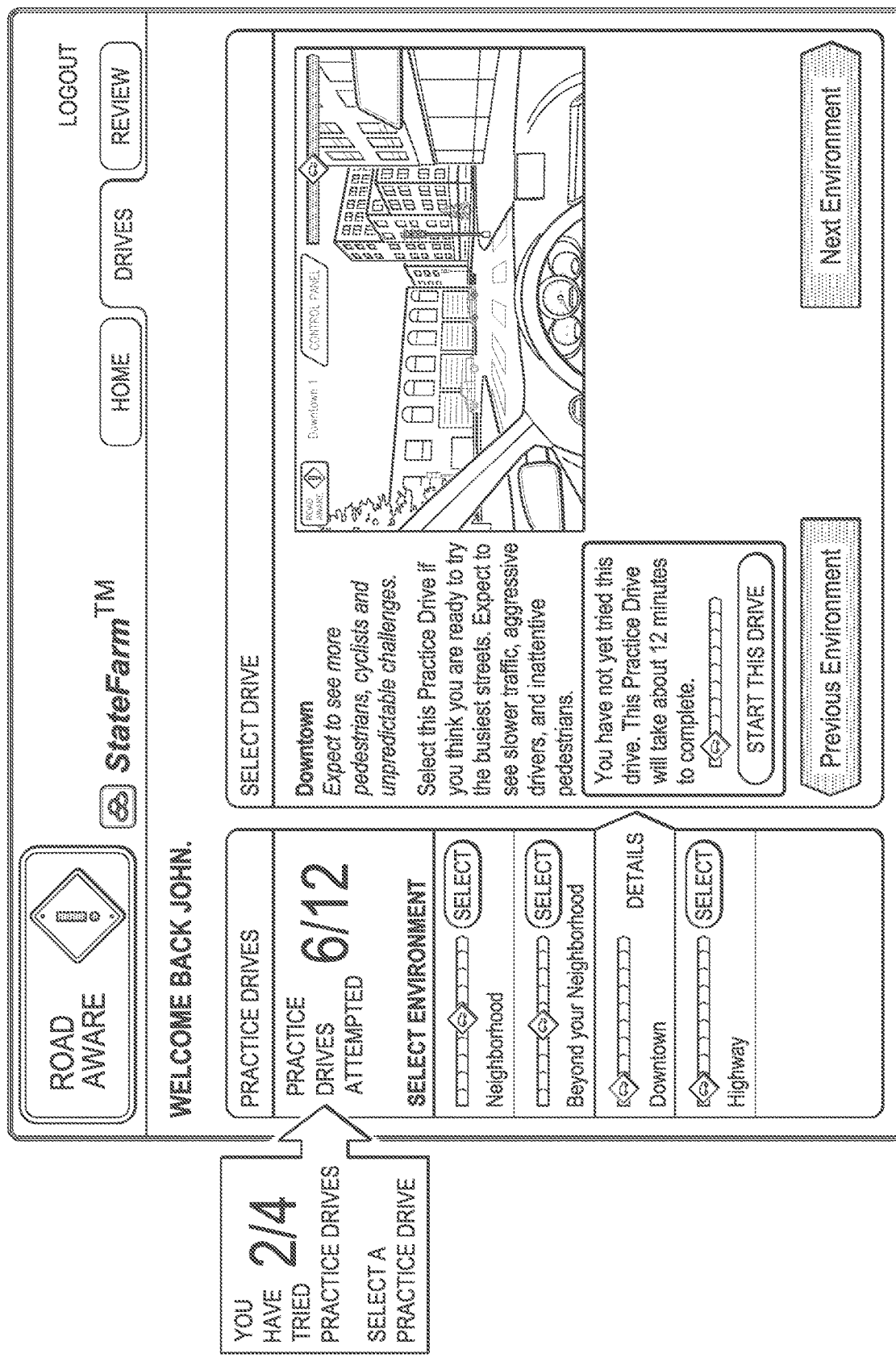
FIG. 15D is an example of a drives page for a web site through which a novice driver would be invited to review practice drives or select a drive, wherein a "Downtown" drive is selected.

FIG. 15D illustrates a drive window under the drives tab, wherein the practice drives pane 1503 is similar to that previously shown, except that a downtown environment is selected. A select drive pane 1504 is also illustrated, for a downtown environment. In the downtown environment, the novice driver may expect to see more pedestrians, cyclists and unpredictable challenges. Further, the novice driver should expect to see slower traffic, aggressive drivers, and inattentive pedestrians in the downtown environment. Of course, icons are provided for the novice driver to start this drive, select a previous environment, or select next environment.

Figure 15E:
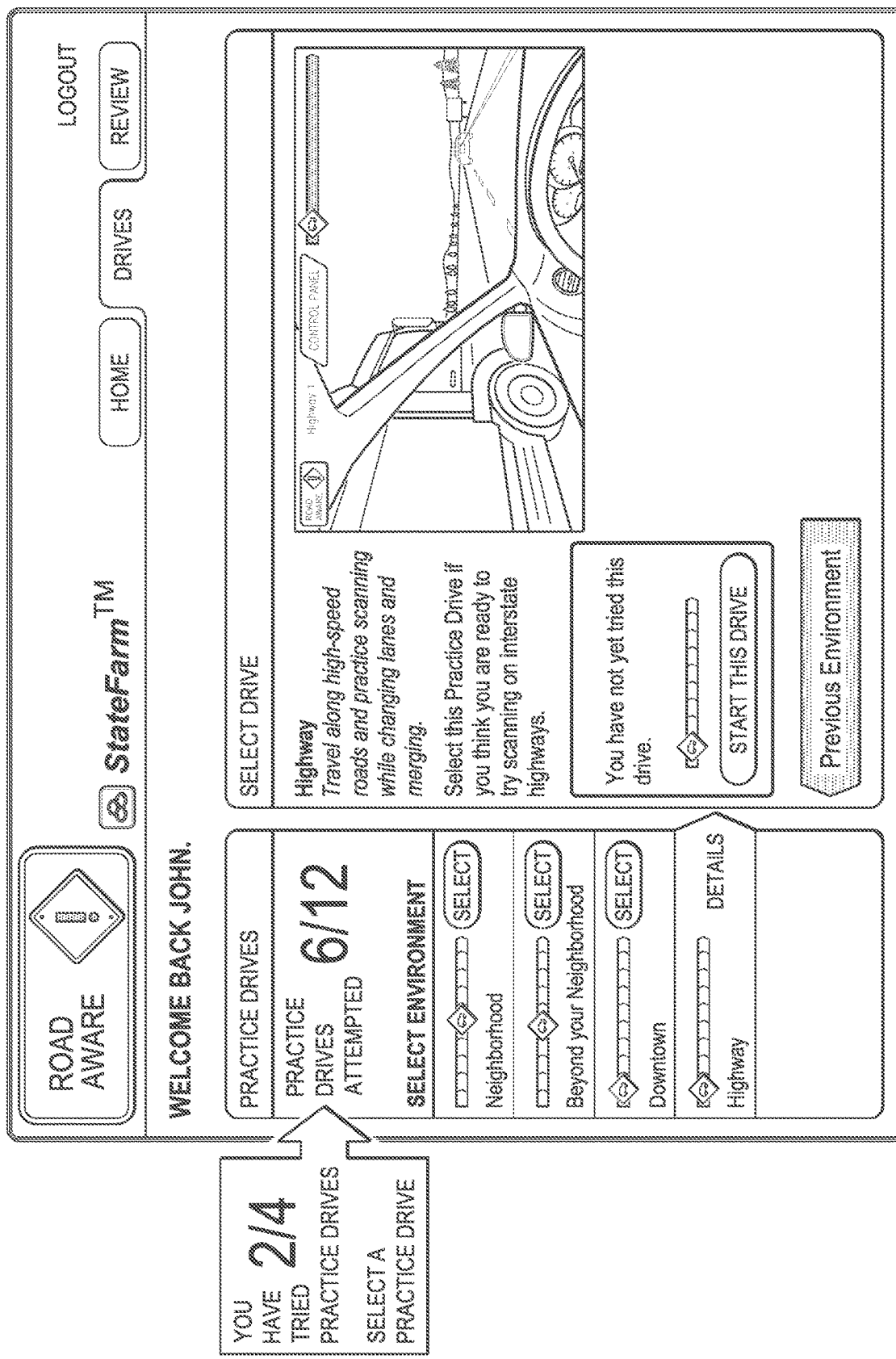
FIG. 15E is an example of a drives page for a web site through which a novice driver would be invited to review practice drives or select a drive, wherein a "Highway" drive is selected.

FIG. 15E illustrates a drive window under the drives tab. A practice drive pane 1503 is similar to that previously illustrated except that a highway environment is selected. Also the drives window of 15E illustrates a select drive pane 1504 wherein a highway environment is illustrated. In the highway environment, the novice driver may travel along high speed roads so as to practice scanning for hazards while changing lanes and merging. Icons are provided so as to allow the novice driver to select this drive or previous environments.

FIG. 15F illustrates a review window under a review tab of the graphic-user interface. A review log pane 1505 is provided, which indicates the number of drives completed, and the timed rating per environment for the up to five most recent drives. In particular, the review log pane 1505 provides sliding scale indicators for each of the environments. Icons are also provided for the novice driver to view drive information for each of the environments. FIG. 15F further provides a review pane 1506 that provides information regarding a selected drive or the most recent practice drives. The review pane 1506 provides the name of the drive, the date and time at which the drive was taken, the environment in which the drive was taken, and the percent of drive completion. The review pane 1506 further provides icons, which the novice driver may select to review particular drives. The review pane 1506 also provides a sliding scale indicator for the score that was obtained by the novice driver for completed or incomplete drives.

Figure 16A:
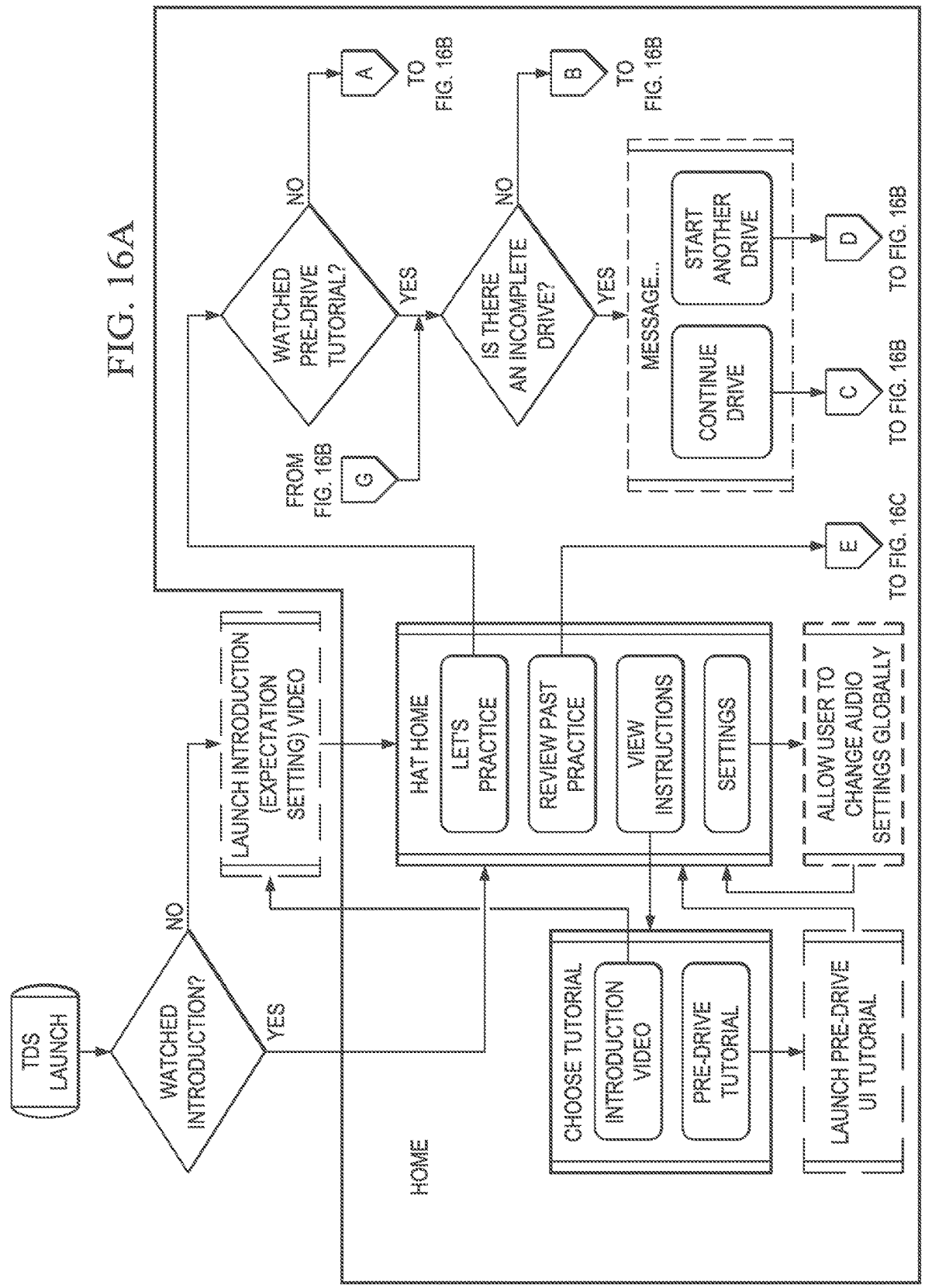
FIGS. 16A-16C show a flow chart illustrating a process for presenting practice drives to a novice driver through a web site interface.
Figure 16B:
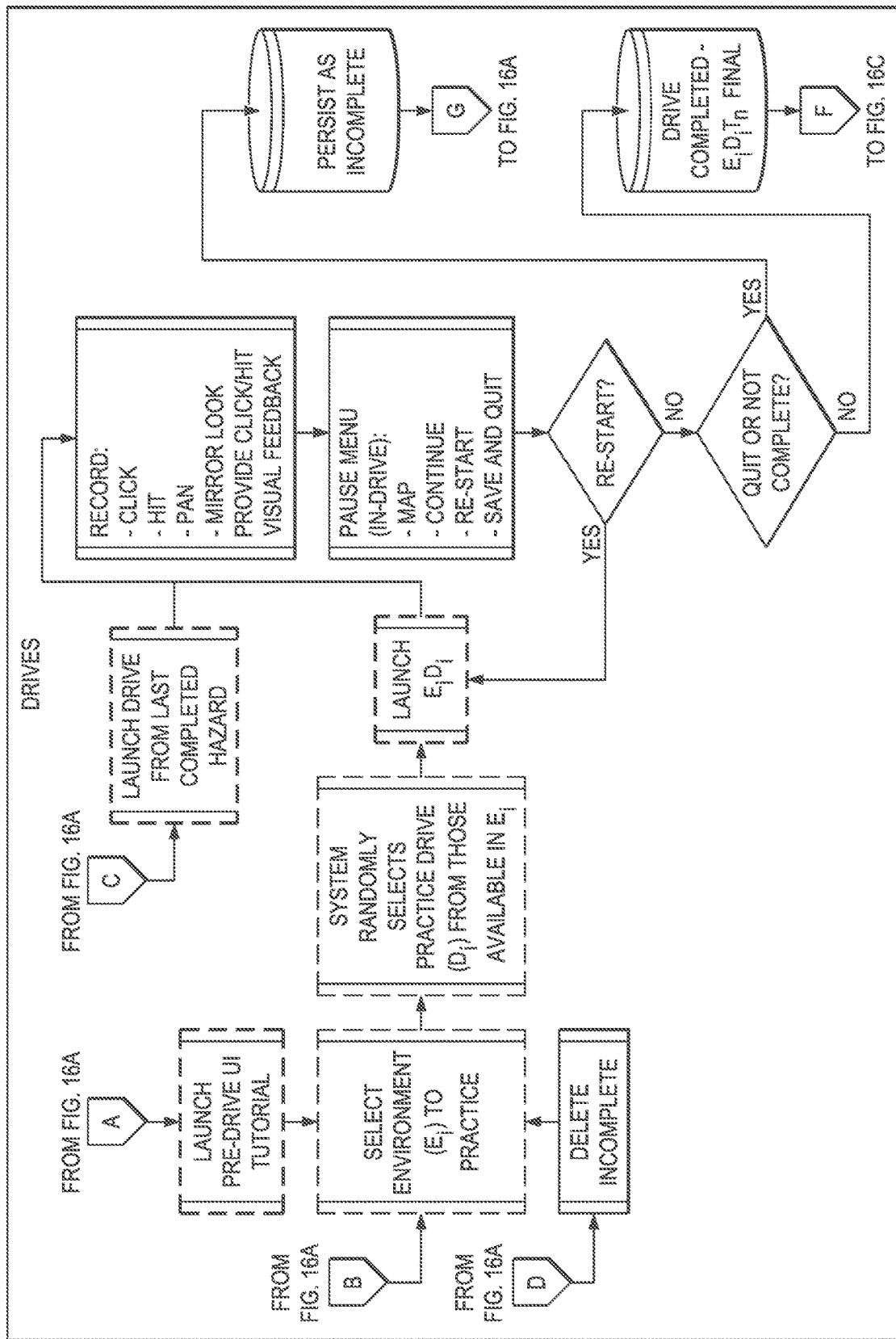
Figure 16C:
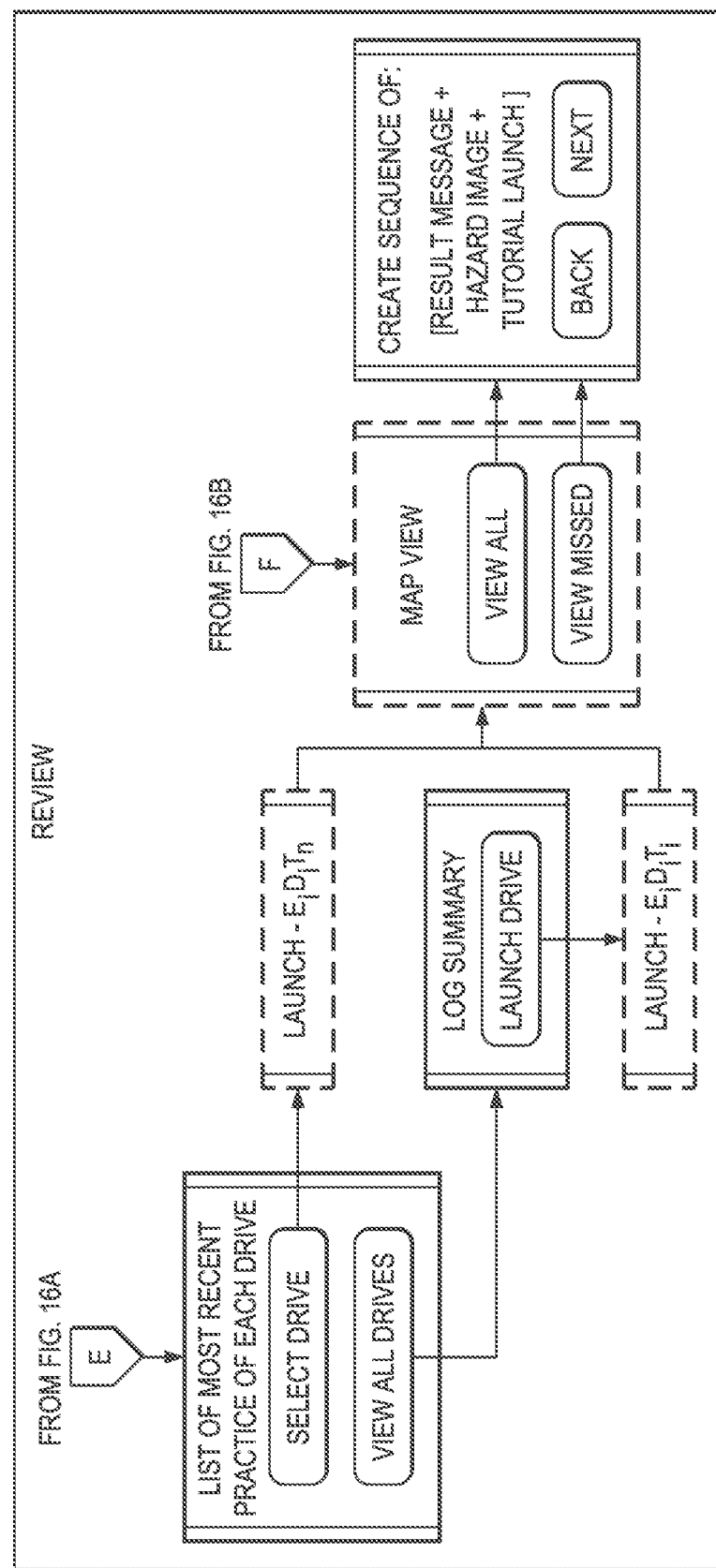

FIGS. 16A-16C illustrate a process flow diagram for navigation between the home, drives, and review windows of the graphic-user interface embodiment illustrated in FIGS. 15A-15F. A TDS is launched 1507 and an inquiry is made as to whether novice driver has watched an introductory video. If the driver has not watched the video, an introductory "expectations setting" video is launched 1508. If the novice driver has watched the introductory video, then control goes to the Road Aware home 1509. The Road Aware home 1509 comprises several options for the novice driver, including: let's practice, review past practice, view instructions, settings. If the novice driver selects the view instructions icon, control goes to "choose tutorial" menu 1510 that allows the novice driver to select an introductory video or a pre-drive tutorial. If the introductory video is selected then control goes to launch and introductory 1508. If the pre-drive tutorial is selected then control goes launch a pre-drive UI tutorial 1511. From the Road Aware home menu 1509, if the user selects the settings icon, the novice driver may then be allowed to change audio settings globally at 1512. If the novice driver selects "let's practice" from the Road Aware home menu, the novice driver may be asked whether he has watched a pre-drive tutorial. If not, a pre-drive tutorial UI may be launched 1508. If the drive has seen the tutorial, then the driver may be questioned as to whether there is an incomplete drive. If there are incomplete drives, then control will pass to a message menu 1513. From the message menu 1513, the novice driver may select a continue drive icon or a start another drive icon. If the continue drive icon is selected, then control launch a drive from the last completed hazard 1514. If the novice driver selects a "start another drive" icon from the message menu 1513, then control goes to delete incomplete drive 1515. If incomplete drives are deleted 1515 then control transfer to allow the novice drive to select an environment to practice 1516. If user selects an environment to practice 1516, then the system will randomly select practice drives 1517 from those that are available in $E_i$. The practice drives may be designated as $D_i$. After the system has selected practice drives 1517, then the practice drives in the particular environment "$E_iD_i$" are launched 1518. Whether the practice drives are launched from those randomly selected 1518 or from the last completed hazard 1514, the system records 1519 the clicks, hits, panes, mirror looks, and provides quick/hit visual feedback. During the drive, the novice driver may select a pause menu 1520 which provides options for map, continue, restart, save and quit. Within the drives navigation windows the novice driver may restart, which will launch randomly selected practice drive from within the environment 1518, or quit. If the drive is quit before the drive is complete then the incomplete drive will be saved 1521. Completed drives are saved as final 1522.

From the review window, illustrated at FIG. 15F, a novice driver may navigate to a list 1523 of the most recent practice of each drive. From this list 1523, the novice driver may select a drive, or view all drives. If the user selects a drive, then control goes to launch 1524 a drive from a particular environment "$E_iD_iT_a$." If the user selects "view all drives" from the list 1523 of the most recent practice of each drive, then a log summary 1525 should be provided. From the logs summary 1525, the novice driver may select or launch drives 1524. When the drives are launched 1524 in the review window, a map view menu 1526 is provided. The map view 1526 allows the novice drive to view all, or view missed. From the map view drive selection 1526, a sequence may be created 1527, which includes a results message plus a hazard image, plus a tutorial launch. The novice driver may go backward and forward in the sequence list to review different drives.

Figures 1, 17A:
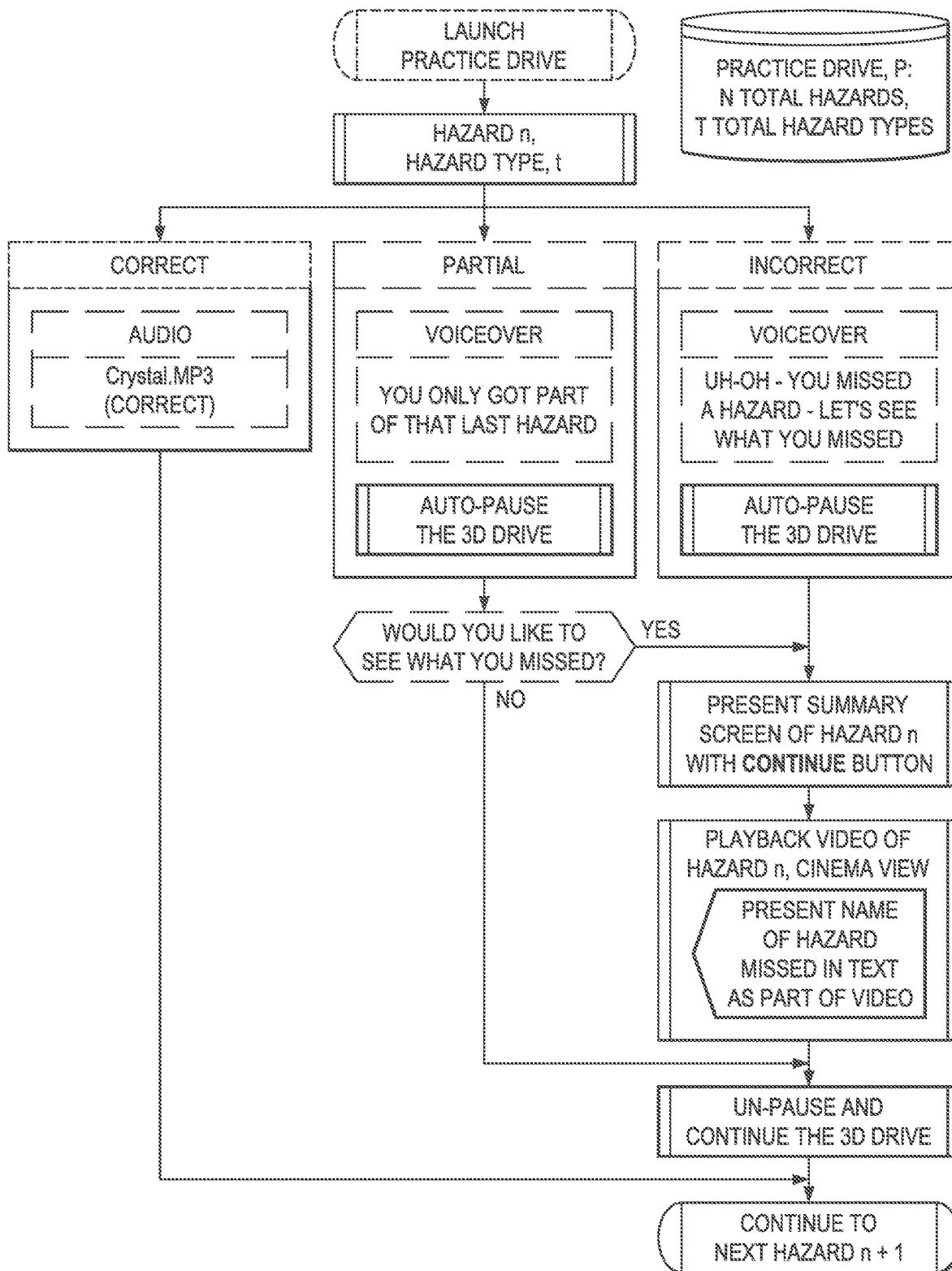
FIGS. 17A-1 through 17A-3 show a flow chart illustrating an example process for reviewing hazard modules of a practice drive.
Figures 2, 17A:
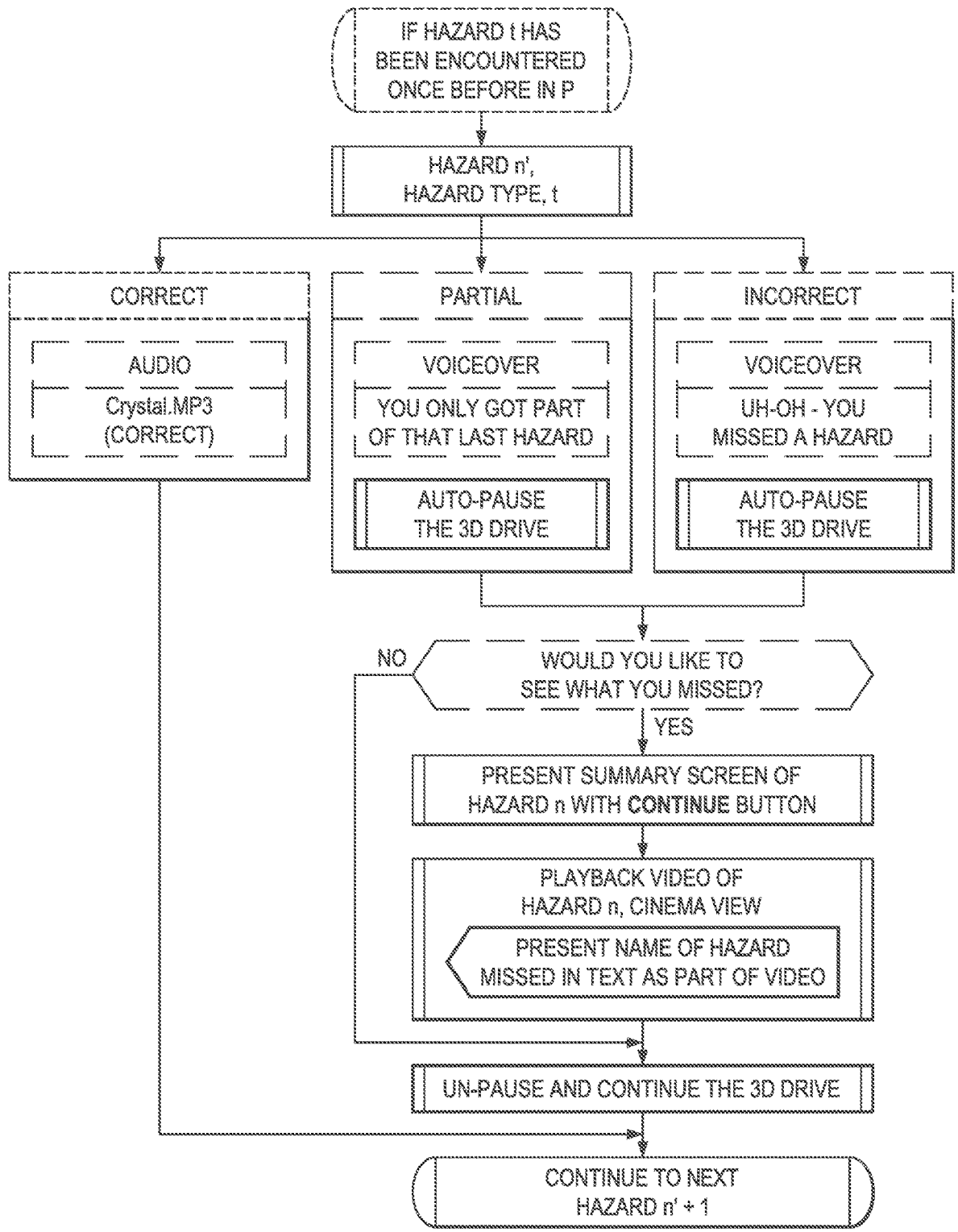
Figures 3, 17A:
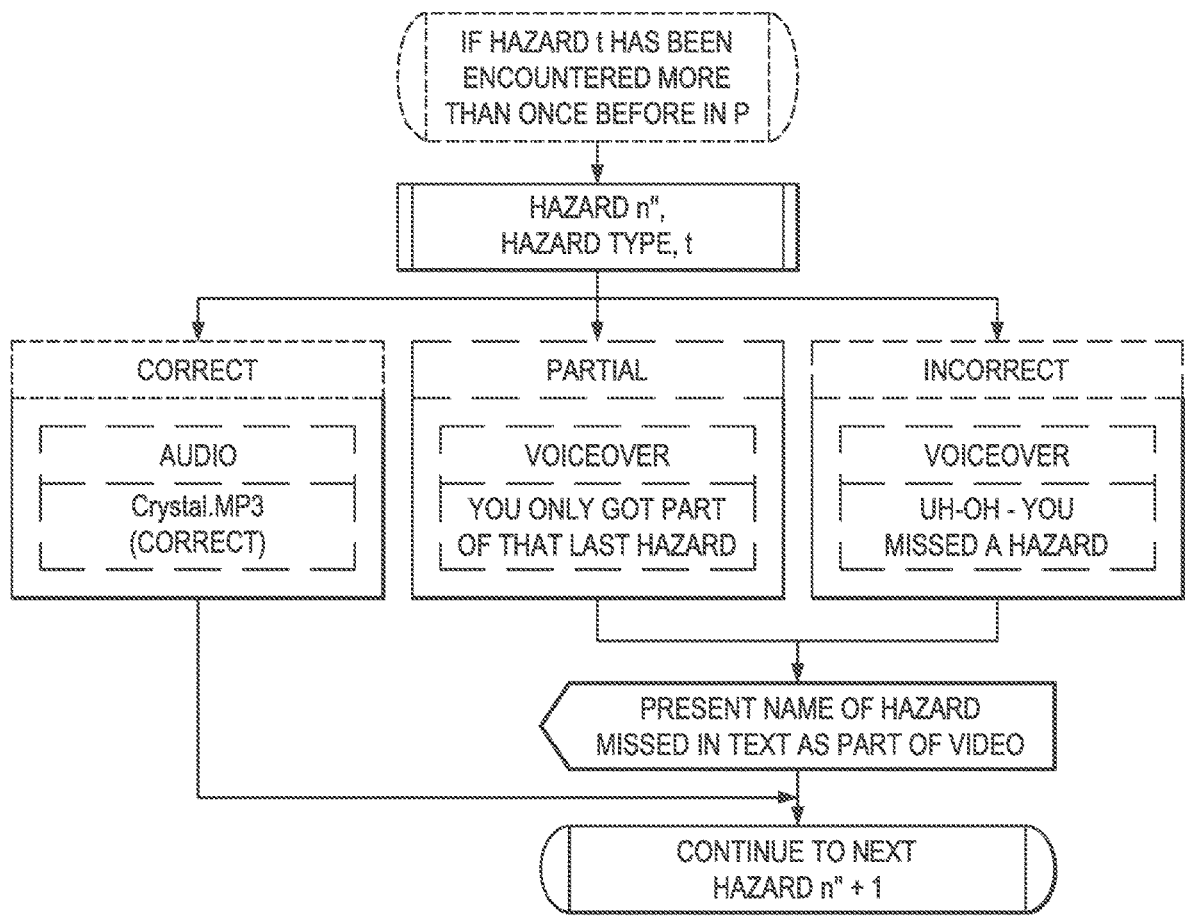

FIGS. 17A-1 through 17A-3 provide a process flow diagram for interactively interfacing with the novice drive during a practice drive. The program begins with the launch 1701 of a practice drive. The program may assign variables including Practice Drive (P), total Hazards (N), and total Hazard Types (T). A variable module 1702 is provided, wherein variables "n" and "t" represent the number of times a hazard of a particular type has been encountered and the types of hazards, respectively. As the novice driver encounters hazards during the practice drive, the program increments the variables "n" and "t" by one, so as to be able to track whether this is the first, second, or more times hazards of particular types have been encountered. If the program detects that it is the first type the novice driver has encountered a hazard of a particular type, the program follows the subroutine beginning with the launch 1701. If the program detects that a hazard of a particular type has been encountered once before, the program follows the subroutine beginning with the launch 1711. If the program detects that a hazard of a particular type has been encountered more than once within the practice drive, the program follows the subroutine beginning with the launch 1721.

The program determines how the novice drive has anticipated each hazard, for example, within the subroutine beginning with launch 1701, novice driver responses are categorized as: correct 1703, partial 1704, or incorrect 1705. If the response is correct, an audio output is provided. If the response is partially correct, the practice drive will automatically pause and a voiceover is output stating: "you only got part of that last hazard." If the response is incorrect, the practice drive will automatically pause and a voiceover is output stating: "Uh-oh—you missed a hazard—let's see what you missed." After the voiceover has been provided in response to a partially missed hazard, the novice driver is asked 1706 whether he would like to see what was missed. If the novice driver indicates "no", then the program unpauses and continues 1709 the practice drive. After the voiceover has been provided in response to an incorrect hazard response or if the novice driver indicates a "yes" after a partially missed hazard, a summary 1707 of the hazard is provided with a CONTINUE icon. Next, a video of the hazard is played back 1708 in a cinema view and the name of the hazard is provided as part of the video. After the playback, the program unpauses and continues 1709 the practice drive. The practice drive continues 1710 to the next hazard.

If the encountered hazard has been encountered once before 1711, the variables are incremented 1712 and novice driver responses are categorized as: correct 1713, partial 1714, or incorrect 1715. If the response is correct, an audio output is provided and the program continues 1720 to the next hazard. If the response is partially correct, the practice drive will automatically pause and a voiceover is output stating: "you only got part of that last hazard." If the response is incorrect, the practice drive will automatically pause and a voiceover is output stating: "Uh-oh—you missed a hazard." After either of the voiceovers have been provided in response to a partially missed or undetected hazard, the novice driver is asked 1716 whether he would like to see what was missed. If the novice driver indicates "no", then the program un-pauses and continues 1719 the practice drive. If the novice driver indicates "yes", a summary 1717 of the hazard is provided with a CONTINUE icon. Next, a video of the hazard is played back 1718 in a cinema view and the name of the hazard is provided as part of the video. After the playback, the program unpauses and continues 1719 the practice drive. The practice drive continues 1720 to the next hazard.

If the encountered hazard has been encountered more than once before 1721, the variables are incremented 1722 and novice driver responses are categorized as: correct 1723, partial 1724, or incorrect 1725. If the response is correct, an audio output is provided and the program continues 1730 to the next hazard. If the response is partially correct, a voiceover is output stating: "you only got part of that last hazard." If the response is incorrect, a voiceover is output stating: "Uh-oh—you missed a hazard." After either of the voiceovers have been provided in response to a partially missed or incorrect hazard, a video of the hazard is played back 1728 in a cinema view and the name of the hazard is provided as part of the video. After the playback, practice drive continues 1730 to the next hazard.

Figures 1, 17B:
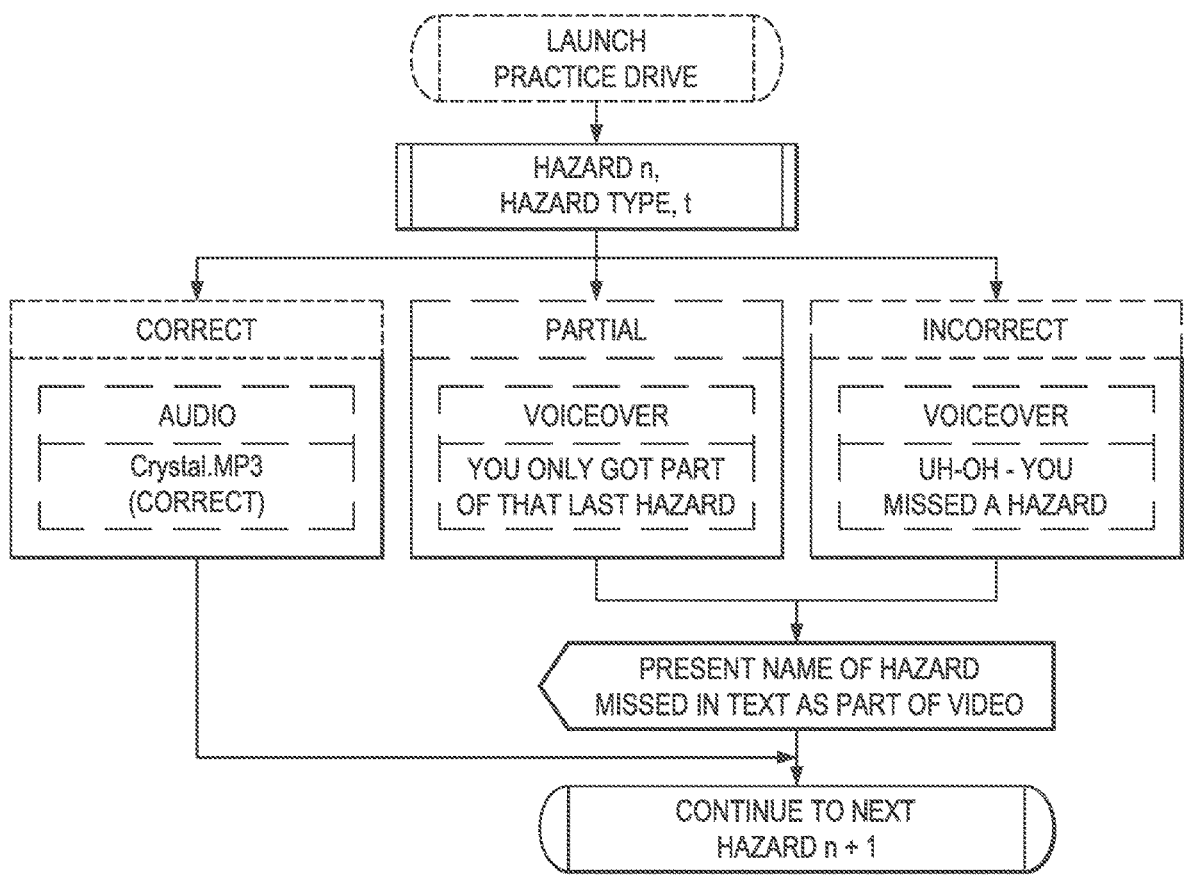
Figures 2, 17B:
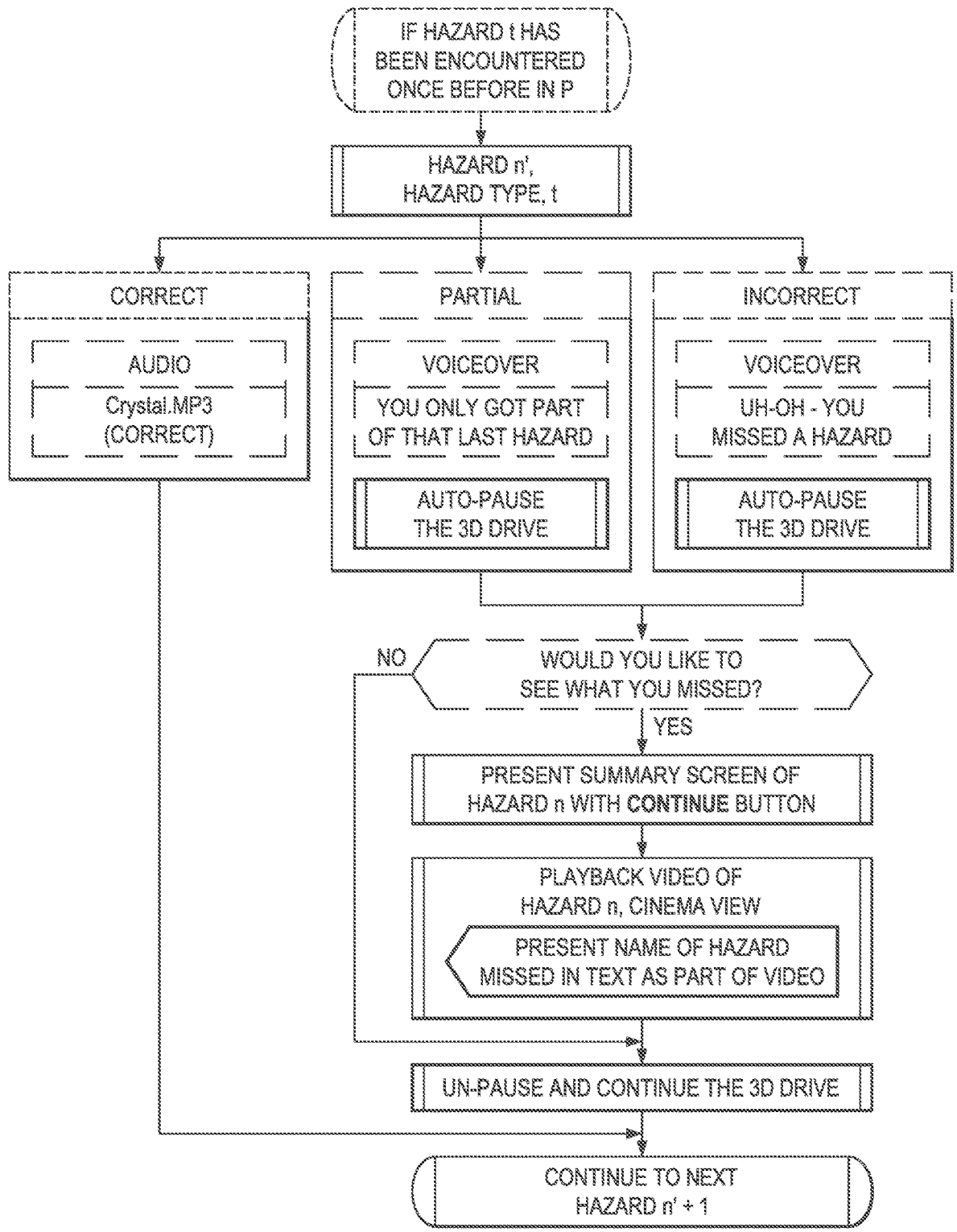
Figures 3, 17B:
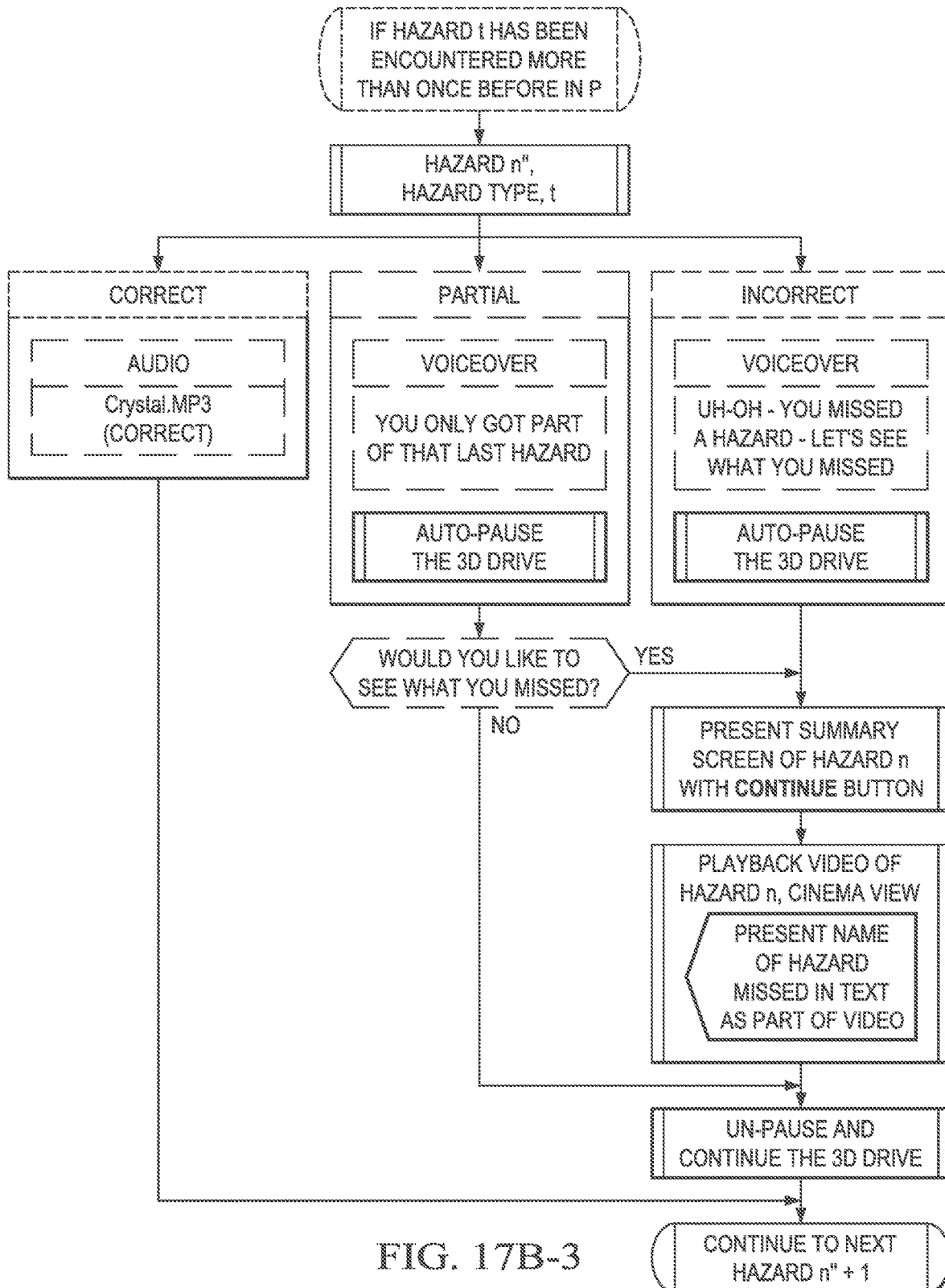

FIGS. 17B-1 through 17B-3 provide an alternative embodiment of a process flow diagram for interactively interfacing with the novice drive during a practice drive. The program begins with the launch 1701 of a practice drive. The variables are incremented 1702 and novice driver responses are categorized as: correct 1703, partial 1704, or incorrect 1705. If the response is correct, an audio output is provided and the program continues 1710 to the next hazard. If the response is partially correct, a voiceover is output stating: "you only got part of that last hazard." If the response is incorrect, a voiceover is output stating: "Uh-oh—you missed a hazard." After either of the voiceovers have been provided in response to a partially missed or incorrect hazard, a video of the hazard is played back 1708 in a cinema view and the name of the hazard is provided as part of the video. After the playback, practice drive continues 1710 to the next hazard.

If the encountered hazard has been encountered once before 1711, the variables are incremented 1712 and novice driver responses are categorized as: correct 1713, partial 1714, or incorrect 1715. The process for this subroutine shown in FIGS. 17B-1 through 17B-3 precede the same as described above relative to FIGS. 17A-1 through 17A-3.

If the encountered hazard has been encountered more than once before 1721, the variables are incremented 1722 and novice driver responses are categorized as: correct 1723, partial 1724, or incorrect 1725. The process for this subroutine shown in FIGS. 17B-1 through 17B-3 (1721-1730) steps then proceeds the same as described above relative to FIGS. 17B-1 through 17B-3 (steps 1701-1710).

Environment-based practice drives involve lengthy drives encountering multiple hazards through different environments, including: neighborhood, beyond your neighborhood, downtown, and highway. According to one embodiment of practice drives, each practice drive comprises a series of hazard modules that are presented in the same order each time the practice drive is replayed. According to a further embodiment of practice drives, each practice drive comprises a set of hazard modules that are presented in a different order each time the practice drive is replayed. By presenting the hazard modules in a different order, the novice driver is less likely to be able to merely memorize correct responses to individual hazards and more likely to develop hazard awareness skills. Further embodiments of the invention randomly present hazard modules in a variety of driving conditions, including: rain, dry, snow, icy, nighttime, daylight, etc. to give even more diverse looks to the different hazards.

One aspect of the invention is to use hazard awareness proficiency as a basis for automobile insurance premium valuation. If a novice driver is able to demonstrate proficiency in early identification of potential driving hazards, then the novice driver may be rewarded with an insurance premium discount.

Figure 18A:
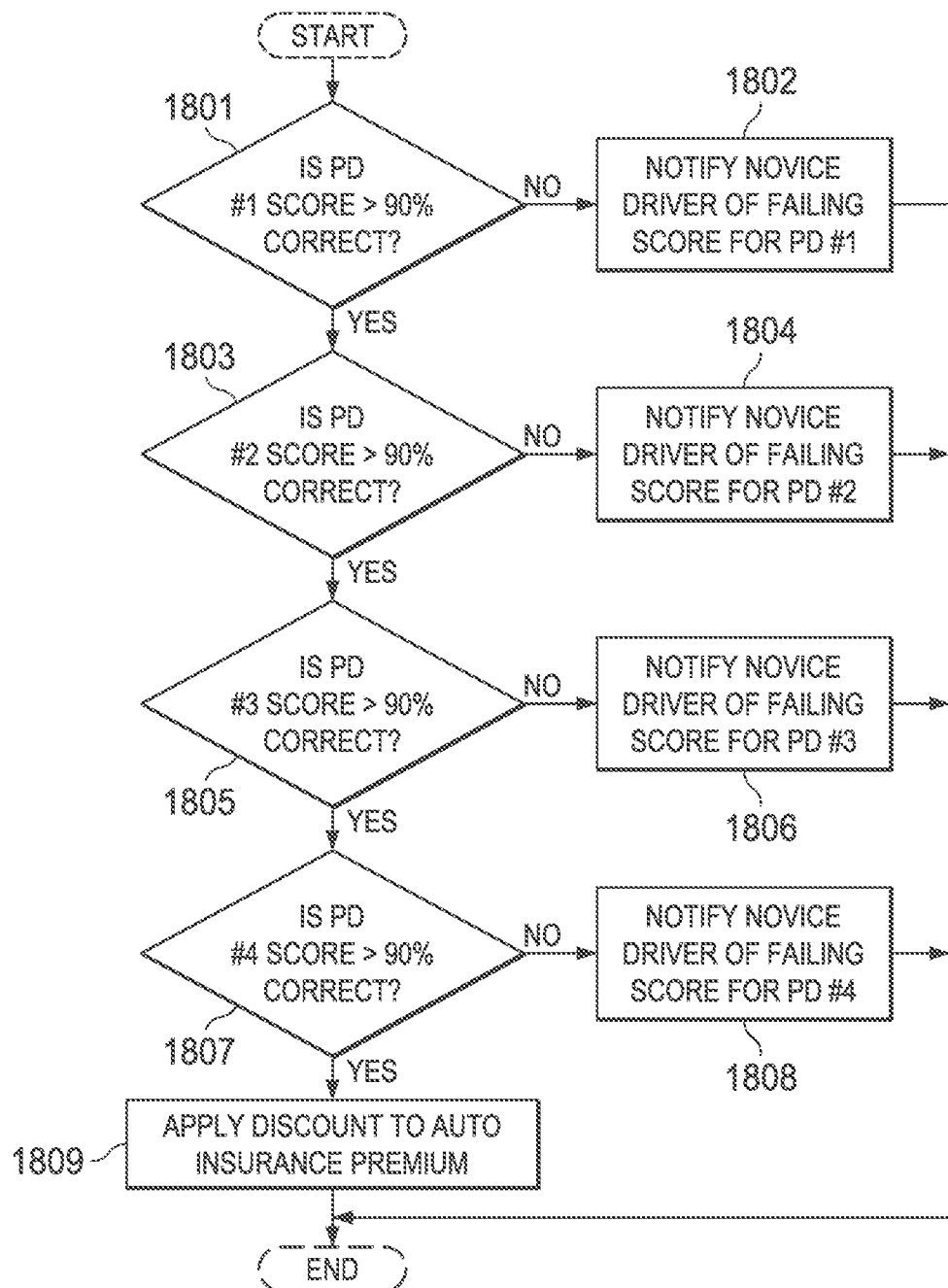
FIG. 18A is a flow chart showing a process for grading novice driver performance and applying discounts to an auto insurance premium based on performance, wherein an insurance premium discount may be applied if the novice driver has correctly identified more than a predetermined percentage of the hazards in each practice drive environment.

According to one embodiment of the invention, an insurance premium discount may be applied if the novice driver has correctly identified more than a predetermined percentage of the hazards in each practice drive environment. FIG. 18A illustrates an example. It is first determined 1801 whether the novice driver has correctly identified more than 90% of the hazards in a first practice drive (for example, neighborhood). If not, the novice driver is notified 1802 of a failing score for the first practice drive and that a discount of the insurance premium will not be applied. It is next determined 1803 whether the novice driver has correctly identified more than 90% of the hazards in a second practice drive (for example, beyond your neighborhood). If not, the novice driver is notified 1804 of a failing score for the second practice drive and that a discount of the insurance premium will not be applied. It is next determined 1805 whether the novice driver has correctly identified more than 90% of the hazards in a third practice drive (for example, downtown). If not, the novice driver is notified 1806 of a failing score for the third practice drive and that a discount of the insurance premium will not be applied. It is finally determined 1807 whether the novice driver has correctly identified more than 90% of the hazards in a fourth practice drive (for example, highway). If not, the novice driver is notified 1808 of a failing score for the fourth practice drive and that a discount of the insurance premium will not be applied. If the novice driver has a passing score for all four practice drives, then a discount is applied 1809 to the insurance premium and the novice driver is so notified.

Figure 18B:
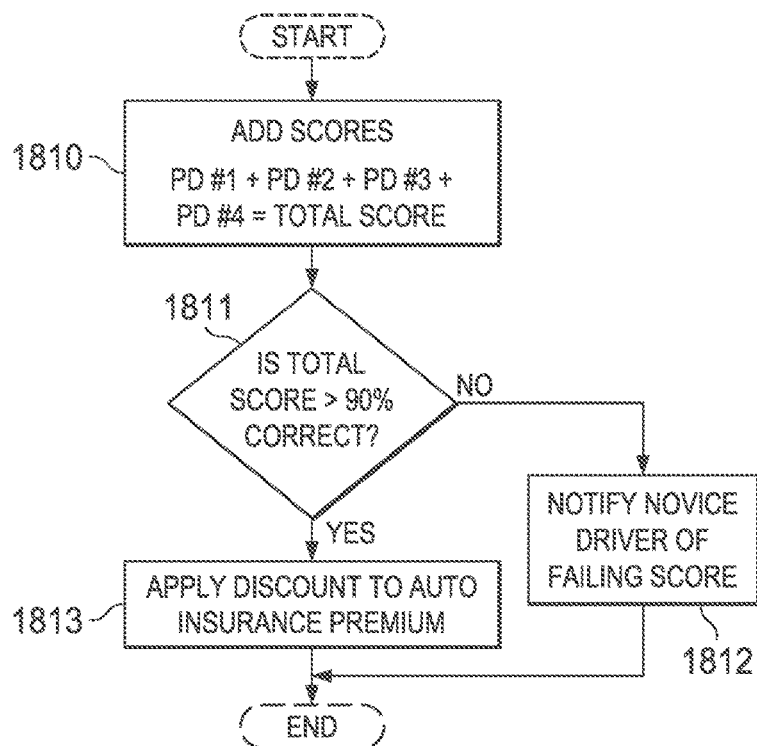
FIG. 18B shows a flow chart of a process, wherein an insurance discount may be applied if the novice driver has correctly identified more than a predetermined percentage of the total number of hazards in all practice drive environments.

In a further illustrative embodiment of the invention, an insurance discount may be applied if the novice driver has correctly identified more than a predetermined percentage of the total number of hazards in all practice drive environments. FIG. 18B shows this example. First, the total number of correctly identified hazards is obtained by adding 1810 together the number of correctly identified hazards from each practice drive. It is next determined 1811 whether more than 90% of the total number of hazards in all practice drives have been correctly identified. If not, then the novice driver is notified 1812 of a failing score and that the discount will not be applied. If yes, then a discount is applied 1813 to an auto insurance premium and the novice driver is so notified.

Figure 18C:
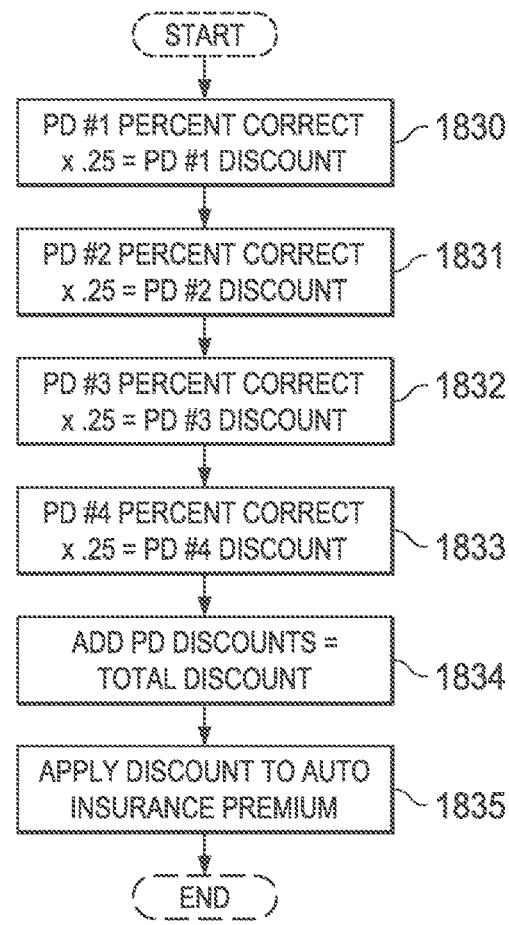
FIG. 18C is a flow chart showing an alternative process for determining a discount based upon a number of correctly identified hazards, so that at least a partial discount may be applied as long as the novice driver correctly identifies at least one hazard.

A further embodiment of the invention provides for a determination of discount to be based upon a number of correctly identified hazards, so that at least a partial discount may be applied as long as the novice driver correctly identifies at least one hazard. FIG. 18C illustrates this example. First, a percent of correctly identified hazards for the first practice drive (for example, neighborhood) is multiplied 1830 by 0.25 or 25% to provide a first drive discount. Next, a percent of correctly identified hazards for the second practice drive (for example, beyond your neighborhood) is multiplied 1831 by 0.25 or 25% to provide a second drive discount. Next, a percent of correctly identified hazards for the third practice drive (for example, downtown) is multiplied 1832 by 0.25 or 25% to provide a third drive discount. Finally, a percent of correctly identified hazards for a fourth practice drive (for example, highway) is multiplied 1833 by 0.25 or 25% to provide a fourth drive discount. The individual drive discounts are then added 1834 to obtain a total discount. The total discount is that applied 1835 to the auto insurance premium and the novice driver is so notified.

In alternative embodiments, a passing score may be based on both correctly identified hazards and partially identified hazards.

A further aspect of the invention is to compare Road Aware training scores with actual driving data to identify direct correlations between correctly identified Road Aware hazards and actual safe driving by novice drivers. When large numbers of novice drivers have completed Road Aware, the scores may be compiled and analyzed. Driving records for these novice drivers may also be compiled and analyzed. To the extent that the particular Road Aware hazard modules have failed to improve novice drivers proficiency to identify types of hazards in actual driving conditions (as evidenced by a relatively higher number of actual accidents), the Road Aware hazard modules may be improved or multiplied to enhance hazard identification. Comparisons may be drawn across driving environments as well as individual hazards. Thus, the Road Aware training modules may be improved over time as more novice driver data is compiled, such that the system may learn which simulated hazard modules best help to teach novice drivers how to avoid accidents in actual driving conditions.

For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. A method for training vehicle drivers to detect hazards, the method comprising:
    presenting to a user on a display device of an internet-connected device, by a processor of the internet-connected device, a visual presentation of a continuous drive through a driving environment comprising a hazard module that (a) presents to the user at least one driving scenario that comprises at least one hazard, and (b) defines, for particular driving situations occurring in the at least one driving scenario, one or more anticipatory viewing locations corresponding to each particular driving situation, the anticipatory viewing locations relating to hazards that are not currently displayed by the display device;
    detecting user viewing locations within the visual presentation of the driving environment;
    recording, by the processor of the internet-connected device, user viewing locations within the visual presentation, the user viewing locations corresponding to locations within the visual presentation that are viewed by the user during the visual presentation of the continuous drive;
    evaluating, by the processor of the internet-connected device, the recorded user viewing locations to analyze user anticipation of hazards that are not currently displayed by the display device, including comparing user viewing locations recorded during the visual presentation of each particular driving situation with the one or more predefined anticipatory viewing locations corresponding to that driving situation;
    determining, by the processor of the internet-connected device, a hazard detection proficiency of the user based at least on the analysis of user anticipation of not currently-displayed hazards;
    using GPS and accelerometers associated with the internet-connected device to document the locations and driving conditions of actual drives;
    comparing the determined hazard detection proficiency of the user to the documented locations and driving conditions of actual drives; and
    using the result of the comparison of the determined hazard detection proficiency and documented locations and driving conditions of actual drives to improve a proficiency of the hazard module.

2. The method of claim 1, further comprising:
    accessing, from a computer memory device, at least one hazard detection proficiency threshold value;
    comparing the determined hazard detection proficiency of the user with the at least one hazard detection proficiency threshold value;
    determining an insurance rate or discount for the user based at least on the results of the comparison.

3. The method of claim 1, wherein analyzing user anticipation of hazards that are not currently displayed by the display device comprises detection and analysis of lateral or vertical visual panning by the user.

4. The method of claim 1, wherein analyzing user anticipation of hazards that are not currently displayed by the display device comprises evaluating user viewing locations on the display device with respect to anticipated hazards not currently displayed by the display device.

5. The method of claim 1, wherein the at least one minimum hazard detection proficiency criteria comprises a minimum percentage of the total number of hazards in the visual presentation.

6. The method of claim 1, wherein the visual presentation comprises at least two continuous drives each through different driving environments, wherein the at least one minimum hazard detection proficiency criteria comprises a minimum percentage of hazards detected in each of the at least two continuous drives.

7. The method of claim 1, wherein at least one minimum hazard detection proficiency criteria comprises one detected hazard and the comparison of the determined hazard detection proficiency of the user with the minimum hazard detection proficiency criteria comprises multiplying a total insurance discount by the percent of detected hazards.

8. A method for training vehicle drivers to detect hazards, the method comprising:
    presenting to a user on a display device of an internet-connected device, by a processor of the internet-connected device, a visual presentation of a continuous drive through a driving environment comprising a hazard module that (a) presents to the user at least one driving scenario that comprises at least one hazard, and (b) defines, for particular driving situations occurring in the at least one driving scenario, one or more anticipatory viewing locations corresponding to each particular driving situation, the anticipatory viewing locations relating to hazards that are not currently displayed by the display device;
    detecting user viewing locations within the visual presentation of the driving environment;
    recording, by the processor of the internet-connected device, user viewing locations within the visual presentation, the user viewing locations corresponding to locations within the visual presentation that are viewed by the user during the visual presentation of the continuous drive;

evaluating, by the processor of the internet-connected device, the recorded user viewing locations to analyze user anticipation of hazards that are not currently displayed by the display device, including comparing user viewing locations recorded during the visual presentation of each particular driving situation with the one or more predefined anticipatory viewing locations corresponding to that driving situation;

comparing, by the processor of the internet-connected device, the recorded user viewing locations with defined locations of hazards that are currently displayed by the display device to analyze user recognition of the currently-displayed hazards; and determining, by the processor of the internet-connected device, a hazard detection proficiency of the user based at least on (a) the analysis of user anticipation of not currently displayed hazards and (b) the analysis of user recognition of currently-displayed hazards; using GPS and accelerometers associated with the internet-connected device to document the locations and driving conditions of actual drives;

comparing the determined hazard detection proficiency of the user to the documented locations and driving conditions of actual drives; and using the result of the comparison of the determined hazard detection proficiency and documented locations and driving conditions of actual drives to improve a proficiency of the hazard module.

9. The method of claim 8, further comprising:
accessing, from a computer memory device, at least one hazard detection proficiency threshold value;
comparing the determined hazard detection proficiency of the user with the at least one hazard detection proficiency threshold value;
determining an insurance rate or discount for the user based at least on the results of the comparison.

10. The method of claim 8, wherein analyzing user anticipation of hazards that are not currently displayed by the display device comprises detection and analysis of lateral or vertical visual panning by the user.

11. The method of claim 8, wherein analyzing user anticipation of hazards that are not currently displayed by the display device comprises evaluating user viewing locations on the display device with respect to anticipated hazards not currently displayed by the display device.

12. The method of claim 8, wherein the at least one minimum hazard detection proficiency criteria comprises a minimum percentage of the total number of hazards in the visual presentation.

13. The method of claim 8, wherein the visual presentation comprises at least two continuous drives each through different driving environments, wherein the at least one minimum hazard detection proficiency criteria comprises a minimum percentage of hazards detected in each of the at least two continuous drives.

14. The method of claim 8, wherein: the minimum hazard detection proficiency criteria comprises one detected hazard; and the comparison of the determined hazard detection proficiency of the user with the minimum hazard detection proficiency criteria comprises multiplying a total insurance discount by the percent of detected hazards.

15. A method for training vehicle drivers to detect hazards, the method comprising:
presenting to a user on a display device of an internet-connected device, by a processor of the internet-connected device, a visual presentation of a continuous drive through a driving environment comprising a hazard module that (a) presents to the user at least one driving scenario that comprises at least one hazard, and (b) defines, for particular driving situations occurring in the at least one driving scenario, one or more anticipatory viewing locations corresponding to each particular driving situation, the anticipatory viewing locations relating to hazards that are not currently displayed by the display device;

detecting user viewing locations within the visual presentation of the driving environment;

recording, by the processor of the internet-connected device, user viewing locations within the visual presentation, the user viewing locations corresponding to locations within the visual presentation that are viewed by the user during the visual presentation of the continuous drive;

evaluating, by the processor of the internet-connected device, the recorded user viewing locations to analyze user anticipation of hazards that are not currently displayed by the display device, including comparing user viewing locations recorded during the visual presentation of each particular driving situation with the one or more predefined anticipatory viewing locations corresponding to that driving situation;

determining, by the processor of the internet-connected device, a hazard detection proficiency of the user based at least on the analysis of user anticipation of not currently-displayed hazards;

using GPS and accelerometers associated with the internet-connected device to document the locations and driving conditions of actual drives;

comparing the determined hazard detection proficiency of the user to the documented locations and driving conditions of actual drives; and using the result of the comparison of the determined hazard detection proficiency and the documented locations and driving conditions of actual drives to improve a proficiency of the hazard module.

16. The method of claim 15, further comprising determining an insurance rate or discount for the user based at least on the hazard detection proficiency of the user by:
accessing, from a computer memory device, at least one hazard detection proficiency threshold value;
comparing the determined hazard detection proficiency of the user with the at least one hazard detection proficiency threshold value; and
determining an insurance rate or discount for the user based at least on the results of the comparison.

17. The method of claim 16, further comprising displaying to the user on the display device of the internet-connected device the determined insurance rate or discount.

* * * * *